United States Patent
Katz et al.

(10) Patent No.: US 11,496,874 B2
(45) Date of Patent: *Nov. 8, 2022

(54) MODULAR EMERGENCY COMMUNICATION FLOW MANAGEMENT SYSTEM

(71) Applicant: RapidSOS, Inc., New York, NY (US)

(72) Inventors: Henry Katz, Brookline, MA (US); Zvika Ferentz, Rye Brook, NY (US); Jeffrey Sternberg, New York, NY (US); Nicholas Edward Horelik, Long Island City, NY (US); Michael John Martin, Long Island City, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,281

(22) Filed: Mar. 26, 2019

(65) Prior Publication Data

US 2019/0327597 A1 Oct. 24, 2019

Related U.S. Application Data

(63) Continuation of application No. 15/960,384, filed on Apr. 23, 2018, now Pat. No. 10,375,558.

(Continued)

(51) Int. Cl.
*H04W 4/90* (2018.01)
*H04M 3/51* (2006.01)
(Continued)

(52) U.S. Cl.
CPC .......... *H04W 4/90* (2018.02); *H04M 3/4217* (2013.01); *H04M 3/5116* (2013.01); *H04W 4/50* (2018.02);
(Continued)

(58) Field of Classification Search
CPC ... H04L 51/046; H04L 67/18; H04L 12/1845; H04L 51/20; H04W 76/14; H04W 64/00;
(Continued)

(56) References Cited

U.S. PATENT DOCUMENTS 5,379,337 A 1/1995 Castillo et al.
5,479,482 A 12/1995 Grimes
(Continued)

FOREIGN PATENT DOCUMENTS

CA 2662606 A1 10/2009
CA 2697986 A1 9/2010
(Continued)

OTHER PUBLICATIONS

Abel et al. Semantics + Filtering + Search=Twitcident exploring information in social web streams. HT'12—Proceedings of 23rd ACM Conference on Hypertext and Social Media (10 pgs) (2012).
(Continued)

*Primary Examiner* — Dai Phuong
(74) *Attorney, Agent, or Firm* — Wilson Sonsini Goodrich & Rosati

(57) ABSTRACT

Disclosed are systems, methods, and media capable of generating and implementing emergency flows. The emergency flow is highly customizable and can connect with various stakeholders (user, emergency contacts, corporate representatives, emergency service provider personnel, etc.). The systems, methods, and media can be triggered in various ways including user input (e.g. voice command) or by sensors (e.g. by using sound detection capabilities).

20 Claims, 28 Drawing Sheets

Related U.S. Application Data

(60) Provisional application No. 62/614,027, filed on Jan. 5, 2018, provisional application No. 62/575,935, filed on Oct. 23, 2017, provisional application No. 62/489,373, filed on Apr. 24, 2017.

(51) Int. Cl.
*H04M 3/42* (2006.01)
*H04W 4/50* (2018.01)
H04L 67/306 (2022.01)

(52) U.S. Cl.
CPC ..... *H04L 67/306* (2013.01); *H04M 2203/355* (2013.01)

(58) Field of Classification Search
CPC ........ G06Q 50/26; G06Q 10/06; G06Q 50/01; G06Q 90/205
See application file for complete search history.

(56) References Cited

U.S. PATENT DOCUMENTS

| | | | |
|---|---|---|---|
| 5,563,931 A | 10/1996 | Bishop et al. | |
| 5,596,625 A | 1/1997 | Leblanc | |
| 5,710,803 A | 1/1998 | Kowal et al. | |
| 5,742,666 A | 4/1998 | Alpert | |
| 6,014,555 A | 1/2000 | Tendler | |
| 6,249,674 B1 | 6/2001 | Verdonk | |
| 6,252,943 B1 | 6/2001 | Johnson et al. | |
| 6,477,362 B1 | 11/2002 | Raith et al. | |
| 6,502,030 B2 | 12/2002 | Hilleary | |
| 6,510,315 B1 | 1/2003 | Arnson | |
| 6,556,816 B1 | 4/2003 | Gafrick et al. | |
| 6,571,092 B2 | 5/2003 | Faccin et al. | |
| 6,594,666 B1 | 7/2003 | Biswas et al. | |
| 6,600,812 B1 | 7/2003 | Gentillin et al. | |
| 6,628,933 B1 | 9/2003 | Humes | |
| 7,058,385 B2 | 6/2006 | Lauper | |
| 7,224,773 B2 | 5/2007 | Croak et al. | |
| 7,324,801 B2 | 1/2008 | Droste et al. | |
| 7,349,706 B2 | 3/2008 | Kim et al. | |
| 7,409,044 B2 | 8/2008 | Leduc | |
| 7,436,938 B2 | 10/2008 | Savaglio et al. | |
| 7,437,143 B1 | 10/2008 | Williams | |
| 7,469,138 B2 | 12/2008 | Dayar et al. | |
| 7,483,519 B2 | 1/2009 | Binning | |
| 7,519,351 B2 | 4/2009 | Malone | |
| 7,519,372 B2 | 4/2009 | MacDonald et al. | |
| 7,548,158 B2 | 6/2009 | Titus et al. | |
| 7,565,131 B2 | 7/2009 | Rollender | |
| 7,646,854 B2 | 1/2010 | Anderson | |
| 7,676,215 B2 | 3/2010 | Chin et al. | |
| 7,684,782 B2 | 3/2010 | Ashley, Jr. et al. | |
| 7,848,733 B2 | 12/2010 | Bull et al. | |
| 7,949,326 B2 | 5/2011 | Gallagher et al. | |
| 8,009,810 B2 | 8/2011 | Seidberg et al. | |
| 8,041,335 B2 | 10/2011 | Khetawat et al. | |
| 8,041,341 B1 | 10/2011 | Malackowski et al. | |
| 8,045,954 B2 | 10/2011 | Barbeau et al. | |
| 8,068,881 B2 | 11/2011 | Schrager | |
| 8,102,972 B2 | 1/2012 | Poremba | |
| 8,126,424 B2 | 2/2012 | Piett et al. | |
| 8,150,367 B1 | 4/2012 | Malladi et al. | |
| 8,165,560 B2 | 4/2012 | Stenquist | |
| 8,165,562 B2 | 4/2012 | Piett et al. | |
| 8,185,087 B2 | 5/2012 | Mitchell, Jr. et al. | |
| 8,195,121 B2 | 6/2012 | Dunn et al. | |
| 8,219,135 B2 | 7/2012 | De et al. | |
| 8,244,205 B2 | 8/2012 | Wu | |
| 8,249,546 B1 | 8/2012 | Shah et al. | |
| 8,249,547 B1 | 8/2012 | Fellner | |
| 8,289,953 B2 | 10/2012 | Ray et al. | |
| 8,306,501 B2 | 11/2012 | Moodbidri et al. | |
| 8,326,260 B1 | 12/2012 | Bradish et al. | |
| 8,369,488 B2 | 2/2013 | Sennett et al. | |
| 8,401,565 B2 | 3/2013 | Sandberg et al. | |
| 8,417,212 B2 | 4/2013 | Cepuran et al. | |
| 8,472,973 B2 | 6/2013 | Lin et al. | |
| 8,484,352 B2 | 7/2013 | Piett et al. | |
| 8,489,062 B2 | 7/2013 | Ray et al. | |
| 8,509,729 B2 | 8/2013 | Shaw | |
| 8,516,122 B2 | 8/2013 | Piett et al. | |
| 8,538,370 B2 | 9/2013 | Ray et al. | |
| 8,538,468 B2 | 9/2013 | Daly | |
| 8,594,015 B2 | 11/2013 | Dunn et al. | |
| 8,606,218 B2 | 12/2013 | Ray et al. | |
| 8,625,578 B2 | 1/2014 | Roy et al. | |
| 8,626,112 B2 | 1/2014 | Ray et al. | |
| 8,630,609 B2 | 1/2014 | Ray et al. | |
| 8,644,301 B2 | 2/2014 | Tamhankar et al. | |
| 8,682,279 B2 | 3/2014 | Rudolf et al. | |
| 8,682,281 B2 | 3/2014 | Dunn et al. | |
| 8,682,286 B2 | 3/2014 | Dickinson et al. | |
| 8,712,366 B2 | 4/2014 | Greene et al. | |
| 8,747,336 B2 | 6/2014 | Tran | |
| 8,751,265 B2 | 6/2014 | Piett et al. | |
| 8,760,290 B2 | 6/2014 | Piett et al. | |
| 8,811,935 B2 | 8/2014 | Faccin et al. | |
| 8,825,687 B2 | 9/2014 | Marceau et al. | |
| 8,848,877 B2 | 9/2014 | Seidberg et al. | |
| 8,866,606 B1 | 10/2014 | Will et al. | |
| 8,868,028 B1 | 10/2014 | Kaltsukis | |
| 8,880,021 B2 | 11/2014 | Hawkins | |
| 8,890,685 B1 * | 11/2014 | Sookman ................ H04W 4/90 340/539.13 |
| 8,948,732 B1 | 2/2015 | Negahban et al. | |
| 8,971,839 B2 | 3/2015 | Hong | |
| 8,984,143 B2 | 3/2015 | Serra et al. | |
| 9,008,078 B2 | 4/2015 | Kamdar et al. | |
| 9,014,657 B2 | 4/2015 | Rohde et al. | |
| 9,019,870 B2 | 4/2015 | Khan et al. | |
| 9,071,643 B2 | 6/2015 | Saito et al. | |
| 9,077,676 B2 | 7/2015 | Price et al. | |
| 9,078,092 B2 | 7/2015 | Piett et al. | |
| 9,094,816 B2 | 7/2015 | Maier et al. | |
| 9,167,379 B1 | 10/2015 | Hamilton et al. | |
| 9,232,040 B2 * | 1/2016 | Barash ................ H04W 4/023 |
| 9,244,922 B2 | 1/2016 | Marceau et al. | |
| 9,258,680 B2 | 2/2016 | Drucker | |
| 9,277,389 B2 | 3/2016 | Saito et al. | |
| 9,351,142 B2 | 5/2016 | Basore et al. | |
| 9,369,847 B2 | 6/2016 | Borghei | |
| 9,402,159 B1 | 7/2016 | Self et al. | |
| 9,408,051 B2 | 8/2016 | Finney et al. | |
| 9,503,876 B2 | 11/2016 | Saito et al. | |
| 9,544,750 B1 | 1/2017 | Self et al. | |
| 9,591,467 B2 | 3/2017 | Piett et al. | |
| 9,635,534 B2 | 4/2017 | Maier et al. | |
| 9,659,484 B1 | 5/2017 | Mehta et al. | |
| 9,693,213 B2 | 6/2017 | Self et al. | |
| 9,736,670 B2 | 8/2017 | Mehta et al. | |
| 9,756,169 B2 | 9/2017 | Mehta et al. | |
| 9,805,430 B2 | 10/2017 | Miasnik et al. | |
| 9,838,858 B2 | 12/2017 | Anand et al. | |
| 9,924,043 B2 | 3/2018 | Mehta et al. | |
| 9,942,739 B2 | 4/2018 | Bozik et al. | |
| 9,986,404 B2 | 5/2018 | Mehta et al. | |
| 9,992,655 B2 | 6/2018 | Anand et al. | |
| 9,998,507 B2 | 6/2018 | Mehta et al. | |
| 10,136,294 B2 | 11/2018 | Mehta et al. | |
| 10,140,482 B2 | 11/2018 | Mehta et al. | |
| 10,165,431 B2 | 12/2018 | Bozik et al. | |
| 2002/0001367 A1 | 1/2002 | Lee | |
| 2002/0057678 A1 | 5/2002 | Jiang et al. | |
| 2002/0120698 A1 | 8/2002 | Tamargo | |
| 2003/0069035 A1 | 4/2003 | Shurvinton | |
| 2004/0203572 A1 | 10/2004 | Aerrabotu et al. | |
| 2004/0212505 A1 * | 10/2004 | Dewing ................ G08B 25/005 340/573.1 |
| 2004/0266390 A1 | 12/2004 | Faucher et al. | |
| 2005/0085215 A1 | 4/2005 | Kokko et al. | |
| 2005/0104745 A1 | 5/2005 | Bachelder et al. | |
| 2005/0151642 A1 | 7/2005 | Tupler et al. | |

(56) References Cited

U.S. PATENT DOCUMENTS

| | | |
|---|---|---|
| 2006/0293024 A1 | 12/2006 | Benco et al. |
| 2007/0030144 A1 | 2/2007 | Titus et al. |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0294058 A1 | 11/2008 | Shklarski |
| 2009/0075703 A1 | 3/2009 | Furbeck et al. |
| 2009/0257345 A1 | 10/2009 | King |
| 2009/0322513 A1 | 12/2009 | Hwang et al. |
| 2010/0002846 A1 | 1/2010 | Ray et al. |
| 2010/0156626 A1 | 6/2010 | Story |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0215153 A1* | 8/2010 | Ray .................. H04M 3/5116 379/45 |
| 2010/0238018 A1 | 9/2010 | Kelly |
| 2011/0009086 A1 | 1/2011 | Poremba et al. |
| 2011/0071880 A1* | 3/2011 | Spector ................ H04W 4/90 340/573.1 |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2012/0002792 A1 | 1/2012 | Chang |
| 2012/0029970 A1 | 2/2012 | Stiles et al. |
| 2012/0092161 A1 | 4/2012 | West |
| 2012/0144019 A1 | 6/2012 | Zhu |
| 2012/0202428 A1 | 8/2012 | Mirbaha et al. |
| 2012/0210325 A1 | 8/2012 | De et al. |
| 2012/0218102 A1 | 8/2012 | Bivens et al. |
| 2012/0257729 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0084824 A1 | 4/2013 | Hursey |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0229282 A1* | 9/2013 | Brent .................... H04W 4/029 340/540 |
| 2013/0237175 A1 | 9/2013 | Piett |
| 2013/0237181 A1 | 9/2013 | Ray |
| 2013/0276143 A1* | 10/2013 | Okvist .................. G16H 40/63 726/28 |
| 2013/0331055 A1 | 12/2013 | McKown et al. |
| 2014/0051379 A1 | 2/2014 | Ganesh et al. |
| 2014/0057590 A1 | 2/2014 | Romero et al. |
| 2014/0086108 A1 | 3/2014 | Dunn et al. |
| 2014/0087680 A1 | 3/2014 | Luukkala et al. |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0155020 A1 | 6/2014 | Dickinson et al. |
| 2014/0199959 A1 | 7/2014 | Hassan et al. |
| 2014/0248848 A1 | 9/2014 | Mufti et al. |
| 2014/0253326 A1* | 9/2014 | Cho ...................... G08B 7/066 340/539.13 |
| 2014/0324351 A1 | 10/2014 | Dannevik et al. |
| 2015/0055453 A1 | 2/2015 | Chaki et al. |
| 2015/0081209 A1 | 3/2015 | Yeh et al. |
| 2015/0094016 A1 | 4/2015 | Crawford et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0140946 A1 | 5/2015 | Hursey et al. |
| 2015/0163352 A1* | 6/2015 | Ritter .................... H04M 11/04 455/404.1 |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0205524 A1* | 7/2016 | Wawrowski ............ H04W 4/50 455/404.1 |
| 2016/0219084 A1 | 7/2016 | Abiezzi |
| 2016/0219397 A1 | 7/2016 | Mayor et al. |
| 2016/0269535 A1 | 9/2016 | Balabhadruni et al. |
| 2016/0307436 A1 | 10/2016 | Nixon |
| 2016/0337831 A1 | 11/2016 | Piett et al. |
| 2016/0345171 A1 | 11/2016 | Kulkarni et al. |
| 2016/0363931 A1 | 12/2016 | Yang et al. |
| 2017/0004427 A1 | 1/2017 | Bruchal et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0325056 A1 | 11/2017 | Mehta et al. |
| 2018/0020091 A1 | 1/2018 | Self et al. |
| 2018/0039737 A1 | 2/2018 | Dempers et al. |
| 2018/0053401 A1 | 2/2018 | Martin et al. |
| 2018/0152563 A1 | 5/2018 | Mehta et al. |
| 2018/0176271 A1* | 6/2018 | Laurent ................ H04L 51/046 |
| 2018/0242133 A1 | 8/2018 | Anand et al. |
| 2018/0249315 A1 | 8/2018 | Mehta et al. |
| 2018/0262544 A1 | 9/2018 | Mehta et al. |
| 2018/0310159 A1 | 10/2018 | Katz et al. |
| 2019/0253865 A1* | 8/2019 | Winkler ................ H04W 12/33 |
| 2021/0037369 A1* | 2/2021 | Lesage .................... H04W 4/90 |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 101593293 A | 12/2009 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| WO | WO-0022593 A1 | 4/2000 |
| WO | WO-0167419 A2 | 9/2001 |
| WO | WO-2007109599 A2 | 12/2007 |

(56) References Cited

FOREIGN PATENT DOCUMENTS

| | | |
|---|---|---|
| WO | WO-2012129561 A1 | 9/2012 |
| WO | WO-2014025563 A1 | 2/2014 |
| WO | WO-2014074420 A1 | 5/2014 |
| WO | WO-2014176646 A1 | 11/2014 |
| WO | WO-2015127867 A1 | 9/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Chowdhury et al. Tweet4act: Using incident-specific profiles for classifying crisis-related messages. Proceedings of the 10th International ISCRAM Conference (pp. 834-839) (2013).

Homeland Security Science and Technology. Using Social Media for Enhanced Situational Awareness and Decision Support. Virtual Social Medial Working Group and DHS First Responders Group. (44 pgs.) (Jun. 2014).

Marcus et al. Twitinfo: Aggregating and Visualizing Microblogs for Event Exploration. ACM CHI Conference 2011 (10 pgs).

Meier. MatchApp: Next Generation Disaster Response App? iRevolution (12 pgs.) (Feb. 27, 2013).

National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).

National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vI_Functional_Interface_Standards_NG911_i3.pdf [retrieved on Feb. 5, 2018] (121 pgs).

PCT/US2015/050609 International Preliminary Report on Patentability dated Mar. 30, 2017.

PCT/US2015/050609 International Search Report and Written Opinion dated Dec. 16, 2015.

PCT/US2016/060189 International Search Report and Written Opinion dated Feb. 24, 2017.

PCT/US2016/065212 International Search Report and Written Opinion dated Feb. 20, 2017.

PCT/US2016/067366 International Search Report and Written Opinion dated Mar. 31, 2017.

PCT/US2016/068134 International Search Report and Written Opinion dated Apr. 21, 2017.

PCT/US2017/029465 International Search Report and Written Opinion dated Aug. 9, 2017.

PCT/US2017/031605 International Search Report and Written Opinion dated Jul. 31, 2017.

PCT/US2017/047854 International Search Report and Written Opinion dated Nov. 28, 2017.

PCT/US2018/028951 International Search Report and Written Opinion dated Aug. 10, 2018.

Seattle Real Time Fire 911 Calls. Available at https://catalog.data.gov/dataset/seattle-real-time-fire-911-calls-6cdf3 (3 pgs.) (Accessed Sep. 2017).

Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).

U.S. Census Bureau. Developers: Population Estimates APIs. Available at https://www.census.gov/data/developers/data-sets/popest-popproj/popest.html (2 pgs.) (Accessed Sep. 2017).

U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/667,531 Office Action dated Apr. 5, 2018.
U.S. Appl. No. 15/667,531 Office Action dated Nov. 8, 2017.
U.S. Appl. No. 15/960,384 Office Action dated Jul. 12, 2018.

Weather Company Data For IBM Bluemix APIs. Available at https://twcservice.mybluemix.net/rest-api/ (100 pgs) (Accessed Sep. 2017).

* cited by examiner

```
PSAP DISPLAY SIMULATOR

7/25/2017 9:21:07 PM

15555551234 OMBL ID = 162

BEINHARD AKL – COMPANY

COMPANY OPS CENTER

GOLDEN GATE BRIDGE, SAN
FRANCISCO, CA, USA

CO = RSOS    P# (850) 580-8367

X = 37.817858
Y = -122.47896

COF = 20 METERS
```

FIG. 22

| DOCUMENT | Call Flow | | CODE EXAMPLE | API REQUEST | ALI DISPLAY |
|---|---|---|---|---|---|
| OVERVIEW | company_contacts | | | | |
| CUSTOMIZATIONS | Company | | ```public static void main(String[] args) {``` | | |
| AUTHENTICATION | RapidSOS | | ```try {``` | | |
| API | User | | ```    OkHttpClient client = new OkHttpClient();``` | | |
| | M. M. | 555-5555 | ```    MediaType tokenMediaType = MediaType.parse("application/x-www-form-urlencoded");``` | | |
| MANAGE | Contacts | | ```    RequestBody tokenBody = RequestBody.create(tokenMediaType, "client_id=ab3IKpmeVfDGHHIPrsNmh uSa5ReEwcPd&client_secret=Fa5Jzx CB2psSOrvs&grant_type=client_cred entials");``` | | |
| | N. H. | 666-6666 | | | |
| | + Add Contacts | | | | |
| TEST | Location | | ```    Request tokenRequest = new Request.Builder()``` | | |
| | 40.7128 | -74.0060 | | | |
| | INITIATE CALL FLOW | | | | |

FIG. 23A

| DOCUMENT | Call Flow | | |
|---|---|---|---|
| OVERVIEW | company_contacts | | |
| CUSTOMIZATIONS | Company | | CODE EXAMPLE \| API REQUEST \| ALI DISPLAY |
| AUTHENTICATION | RapidSOS | | |
| | User | | PSAP DISPLAY SIMULATOR |
| API | M. M. | 555-5555 | 7/25/2017 9:21:07 PM |
| | Contacts | | 15555551234 OMBL ID = 162 |
| MANAGE | N. H. | 666-6666 | BEINHARD AKL – COMPANY |
| | | + Add Contacts | COMPANY OPS CENTER |
| TEST | Location | | GOLDEN GATE BRIDGE, SAN FRANCISCO, CA, USA |
| | 40.7128 | -74.0060 | CO = RSOS  P# (850) 580-8367 |
| | INITIATE CALL FLOW | | |

FIG. 23B

MODULAR EMERGENCY COMMUNICATION FLOW MANAGEMENT SYSTEM

CROSS-REFERENCE

This application is a continuation of U.S. application Ser. No. 15/960,834, filed Apr. 23, 2018, which claims the benefit of U.S. Provisional Application No. 62/489,373, filed Apr. 24, 2017, U.S. Provisional Application No. 62/575,935, filed Oct. 23, 2017, and U.S. Provisional Application No. 62/614,027, filed Jan. 5, 2018, which applications are incorporated herein by reference.

BACKGROUND OF THE INVENTION

A person in an emergency may request help using a mobile communication device such as a cell phone to dial a designated emergency number like 9-1-1 or a direct access phone number for the local emergency service provider (e.g. an emergency dispatch center). This call is assigned to one or more first responders by the emergency service provider. However, these communications are typically limited to audio calls with narrow functionality since most emergency service providers that receive emergency calls currently lack the capacity for more sophisticated communications.

SUMMARY OF THE INVENTION

One advantage provided by the systems, servers, devices, methods, and media of the instant application is the ability to easily and efficiently make customized emergency flow scripts for handling emergency alerts. In some embodiments, emergency flows scripts are assembled into custom emergency flows using various emergency flow building blocks. These blocks provide a modular structure that allows authorized users to select specific building blocks as desired to create unique emergency flows that are tailored to the needs of the users. In some embodiments, the blocks are depicted on a graphic user interface that allows users to drag and drop building blocks to generate emergency flows with ease.

Another advantage provided by the systems, servers, devices, methods, and media of the instant application are emergency response management processes that execute customized emergency flow scripts based on the emergency alert. In some embodiments, an emergency alert comprises an emergency flow identifier that is used to determine the emergency flow script to execute in response to receiving the alert. Thus, a single call management system may provide multiple customized emergency flow scripts based on various parameters (e.g. type of device sending the emergency alert, device functionality, type of emergency, etc.).

Another advantage provided by the systems, servers, devices, methods, and media of the instant application is the facilitation of emergency response communications. Many companies and institutions provide devices and services for monitoring potential emergencies, such as wearable devices that monitor heart rates or intelligent vehicular systems that can detect when a vehicle has been in an accident. However, due to the regulatory requirements for emergency communications (e.g. calling 9-1-1 in the United States), few of the aforementioned services and devices are capable of connecting end users directly to emergency responders. The management systems provided herein provide these services and devices with the infrastructure necessary to connect their end users with emergency responders through a simple and customizable integration.

One advantage provided by the systems, servers, devices, methods, and media of the instant application is the ability to easily and efficiently make customized emergency flow scripts for handling emergency alerts. In some embodiments, emergency flows scripts are assembled into custom emergency flows using various emergency flow building blocks. These blocks provide a modular structure that allows authorized users to select specific building blocks as desired to create unique emergency flows that are tailored to the needs of the users. In some embodiments, the blocks are depicted on a graphic user interface that allows users to drag and drop building blocks to generate emergency flows with ease.

Another advantage provided by the systems, servers, devices, methods, and media of the instant application are emergency response management processes that execute customized emergency flow scripts based on the emergency alert. In some embodiments, an emergency alert comprises an emergency flow identifier that is used to determine the emergency flow script to execute in response to receiving the alert. Thus, a single call management system may provide multiple customized emergency flow scripts based on various parameters (e.g. type of device sending the emergency alert, device functionality, type of emergency, etc.).

Another advantage provided by the systems, servers, devices, methods, and media of the instant application is the facilitation of emergency response communications. Many companies and institutions provide devices and services for monitoring potential emergencies, such as wearable devices that monitor heart rates or intelligent vehicular systems that can detect when a vehicle has been in an accident. However, due to the regulatory requirements for emergency communications (e.g. calling 9-1-1 in the United States), few of the aforementioned services and devices are capable of connecting end users directly to emergency responders. The management systems provided herein provide these services and devices with the infrastructure necessary to connect their end users with emergency responders through a simple and customizable integration.

Another advantage provided by the systems, servers, devices, methods, and media of the instant application is that an emergency alert can be sent with by voice command. In many situations, a user may find it easier to communicate verbally (as opposed to unlocking a smart phone and dialing an emergency number). For example, the user may be driving and unable to take their hands of the wheel. The user may be hijacked and not be free to dial for emergency help, but able to shout out a voice command.

Another advantage provided by the systems, servers, devices, methods, and media of the instant application is that sensors can be activated by sound triggers (e.g. gun shots, breaking glass, etc.) and an emergency alert can be sent without user input. A highly customizable emergency flow may be initiated to deal with the emergency (e.g. contacting the user, contacting emergency contacts, etc.) and make an emergency call, as needed.

In one aspect, provided herein are emergency flow management systems comprising: (a) an emergency flow editor and b) an emergency response server. In some embodiments, the emergency flow editor is configured to perform steps comprising: (i) providing a plurality of emergency flow building blocks available for selection, each of the plurality of emergency flow building blocks comprising instructions to perform an emergency response function; and (ii) providing an interactive environment within which emergency flow building blocks are visually assembled into a customized emergency flow script that is associated with at least one of an emergency flow identifier and an organizational identifier. In some embodiments, the emergency response server is configured to perform steps comprising: (i) receiving an emergency alert from an electronic device, the emergency alert comprising at least one of the emergency flow identifier and the organizational identifier; (ii) identifying the emergency flow script associated with at least one of the emergency flow identifier and the organizational identifier; and (ii) executing the emergency flow script to establish and manage a communication session associated with the emergency alert. In some embodiments, the emergency flow script comprises an emergency flow building block configured with instructions prompting the emergency response server to call an emergency dispatch center (EDC), add the EDC to the communication session, and generate an output based on a response by the EDC. In some embodiments, the emergency flow script comprises at least one emergency flow building block having instructions prompting the emergency response server to perform steps comprising: (a) transmitting an interactive message to an account associated with the user; (b) receiving confirmation of receipt of the interactive message; and (c) establishing a communication link between an emergency responder and the account associated with the user in response to receiving the confirmation of receipt. In some embodiments, the account comprises a phone number, email address, messaging ID, device ID, or social media profile of the user or an emergency contact of the user. In some embodiments, the emergency flow script comprises at least one emergency flow building block having instructions prompting the emergency response server to establish the communication session as an audio call with at least three participants selected from the group consisting of a user of the electronic device, an emergency contact, an emergency service provider personnel, a customer service representative, an organizational representative, and a first responder. In some embodiments, the emergency flow script comprises at least one emergency flow building block having instructions prompting the emergency response server to perform steps comprising: (a) accessing a prioritized list of accounts associated with the user; (b) attempting to connect with an account on the prioritized list in order of priority; and (c) attempting to connect to a next account on the prioritized list in order of priority when a connection with a preceding associated device is unsuccessful. In some embodiments, adjacent emergency flow building blocks in the emergency flow script are connected such that an output of a preceding building block forms an input for a succeeding building block. In some embodiments, the emergency flow script comprises a building block configured with instructions for calling at least one emergency contact of a user of the electronic device in response to an input that is call timeout or call not answered. In some embodiments, the emergency alert is triggered by detection of at least one trigger sound or voice command. In some embodiments, the electronic device is a computer, a tablet, a mobile phone, a panic button, a smartphone, a laptop, a vehicle emergency system, a server, a wearable device, a sensor, an IoT device, a smart device, or a home security device.

In one aspect, provided herein are computer-implemented methods for managing emergency flows comprising: (a) providing, by an emergency flow management system (EFMS), a plurality of emergency flow building blocks available for selection, each of the plurality of emergency flow building blocks comprising instructions to perform an emergency response function; (b) providing, by the EFMS, an interactive environment within which emergency flow building blocks are visually assembled into a customized emergency flow script that is associated with at least one of an emergency flow identifier and an organizational identifier; (c) receiving, by the EFMS, an emergency alert from an electronic device, the emergency alert comprising at least one of the emergency flow identifier and the organizational identifier; (d) identifying, by the EFMS, the emergency flow script associated with at least one of the emergency flow identifier and the organizational identifier; and (e) executing, by the EFMS, the emergency flow script to establish and manage a communication session associated with the emergency alert. In some embodiments, the emergency flow script comprises an emergency flow building block configured with instructions to call an emergency dispatch center (EDC), add the EDC to the communication session, and generate an output based on a response by the EDC. In some embodiments, the emergency flow script comprises at least one emergency flow building block having instructions to perform steps comprising: (a) transmitting an interactive message to an account associated with the user; (b) receiving confirmation of receipt of the interactive message; and (c) establishing a communication link between an emergency responder and the account associated with the user in response to receiving the confirmation of receipt. In some embodiments, the account comprises a phone number, email address, messaging ID, device ID, or social media profile of the user or an emergency contact of the user. In some embodiments, the emergency flow script comprises at least one emergency flow building block having instructions to establish the communication session with at least three participants selected from the group consisting of a user of the electronic device, an associated contact of the user, an emergency contact, an emergency service provider personnel, a customer service representative, an organizational representative, and a first responder. In some embodiments, the emergency flow script comprises at least one emergency flow building block having instructions to perform steps comprising: (a) accessing a prioritized list of accounts associated with the user; (b) attempting to connect with an account on the prioritized list in order of priority; and (c) attempting to connect to a next account on the prioritized list in order of priority when a connection with a preceding associated device is unsuccessful. In some embodiments, adjacent emergency flow building blocks in the emergency flow script are connected such that an output of a preceding building block forms an input for a succeeding building block. In some embodiments, the emergency flow script comprises a building block configured with instructions for calling at least one emergency contact of a user of the electronic device in response to an input that is call timeout or call not answered. In some embodiments, the emergency alert is triggered by detection of at least one trigger sound or voice command. In some embodiments, the electronic device is a computer, a tablet, a mobile phone, a panic button, a smartphone, a laptop, a vehicle emergency system, a server, a wearable device, a sensor, an IoT device, a smart device, or a home security device.

In one aspect, provided herein are non-transitory computer readable storage media encoded with at least one computer program including instructions executable by at least one processor to perform steps comprising: (a) providing a plurality of emergency flow building blocks available for selection, each of the plurality of emergency flow building blocks comprising instructions to perform an emergency response function; (b) providing an interactive environment within which emergency flow building blocks are visually assembled into a customized emergency flow script that is associated with at least one of an emergency flow identifier and an organizational identifier; (c) receiving an emergency alert from an electronic device, the emergency alert comprising at least one of the emergency flow identifier and the organizational identifier; (d) identifying the emergency flow script associated with at least one of the emergency flow identifier and the organizational identifier; and (e) executing the emergency flow script to establish and manage a communication session associated with the emergency alert. In some embodiments, the emergency flow script comprises an emergency flow building block configured with instructions to call an emergency dispatch center (EDC), add the EDC to the communication session, and generate an output based on a response by the EDC. In some embodiments, the emergency flow script comprises at least one emergency flow building block having instructions to perform steps comprising: (a) transmitting an interactive message to an account associated with the user; (b) receiving confirmation of receipt of the interactive message; and (c) establishing a communication link between an emergency responder and the account associated with the user in response to receiving the confirmation of receipt. In some embodiments, the account comprises a phone number, email address, messaging ID, device ID, or social media profile of the user or an emergency contact of the user. In some embodiments, the emergency flow script comprises at least one emergency flow building block having instructions to establish a communication session with at least three participants selected from the group consisting of a user of the electronic device, an associated contact of the user, an emergency contact, an emergency service provider personnel, a customer service representative, an organizational representative, and a first responder. In some embodiments, the emergency flow script comprises at least one emergency flow building block having instructions to perform steps comprising: (a) accessing a prioritized list of accounts associated with the user; (b) attempting to connect with an account on the prioritized list in order of priority; and (c) attempting to connect to a next account on the prioritized list in order of priority when a connection with a preceding associated device is unsuccessful. In some embodiments, adjacent emergency flow building blocks in the emergency flow script are connected such that an output of a preceding building block forms an input for a succeeding building block. In some embodiments, emergency flow script comprises a building block configured with instructions for calling at least one emergency contact of a user of the electronic device in response to an input that is call timeout or call not answered. In some embodiments, the emergency alert is triggered by detection of at least one trigger sound or voice command. In some embodiments, the electronic device is a computer, a tablet, a mobile phone, a panic button, a smartphone, a laptop, a vehicle emergency system, a server, a wearable device, a sensor, an IoT device, a smart device, or a home security device.

In one aspect, provided herein are systems for emergency communications comprising: a) a triggering device of the user transmitting an emergency alert when an emergency is triggered; and b) at least one server providing an emergency management system server application, wherein the application: i) maintains at least one database comprising a list of at least one associated device of the triggering device; ii) receives the emergency alert from the triggering device; iii) establishes a connection with the triggering device upon determining that the triggering device is able to host a connection with the server; and iv) connects to at least one associated device in the list; wherein the at least one associated device in the list is authorized by the user to be connected to the at least one dispatch center for requesting emergency assistance. In some embodiments, the server application connects to at least two associated devices concurrently. In some embodiments, the server application connects with the triggering device before connecting with the at least one associated device. In some embodiments, the list is a prioritized list having a plurality of associated devices. In some embodiments, the server application connects to a next associated device in the prioritized list in order of priority when a connection with a preceding associated device is unsuccessful. In some embodiments, the server application looks up an associated device by querying the at least one database using a telephone number associated with the triggering device. In some embodiments, the server application looks up an associated device by querying the at least one database using one of an email address, physical address, x-y coordinate, BSSID, SSID, and MAC address of the associated device. In some embodiments, the user is connected to a dispatch center by an audio call. In some embodiments, the server application establishes an audio call with the triggering device upon determining the triggering device is able to host an audio call. In some embodiments, the user is presented with an option to connect to or disconnect from a dispatch center. In some embodiments, the user receives a notification when the emergency alert has been triggered and the server application was unable to connect to a user. In some embodiments, the emergency alert is triggered autonomously based on sensor data. In some embodiments, the emergency alert is triggered when sensor values exceed a threshold. In some embodiments, the emergency alert is triggered by detection of at least one trigger sound. In some embodiments, the at least one trigger sound comprises at least one of a gunshot, explosion, breaking glass, person falling, baby crying, police siren, ambulance siren, fire truck siren, outdoor warning siren, and a crash. In some embodiments, the emergency alert is triggered by detection of at least one trigger sound that exceeds a decibel threshold. In some embodiments, the emergency is triggered by user interaction with the triggering device. In some embodiments, the user interaction comprises at least one of pressing a soft or hard button, a gesture, or a voice command. In some embodiments, the emergency is triggered by the user giving a voice command, wherein the triggering device recognizes the voice command to detect one or more trigger phrases. In some embodiments, the triggering device confirms user identity using voice recognition.

In another aspect, provided herein are emergency management systems comprising at least one processor, a memory, a network element, and a computer program including instructions executable by the at least one processor to create a server software application for connecting a user to at least one dispatch center for facilitating emergency assistance, the application comprising: a) a software module maintaining at least one database comprising a list of at least one associated device of the triggering device; b) a software module receiving an emergency alert from the triggering device; c) a software module establishing a connection with the triggering device upon determining that the triggering device is able to host a connection with the emergency management system; and d) a software module connecting to at least one associated device in the list; wherein the at least one associated device in the list is authorized by the user to be connected to the at least one dispatch center for requesting emergency assistance.

In another aspect, provided herein are non-transitory computer readable storage media encoded with a computer program including instructions executable by at least one processor to create a server application for connecting a user to at least one dispatch center for facilitating emergency assistance, the application comprising: a) a software module receiving an emergency alert from the triggering device; b) a software module maintaining at least one database comprising a list of at least one associated device of the triggering device; c) a software module establishing a connection with the triggering device upon determining that the triggering device is able to host a connection with the EMS; and d) a software module connecting to at least one associated device in the list; wherein the at least one associated device in the list is authorized by the user to be connected to the at least one dispatch center for requesting emergency assistance. In some embodiments, the server application connects to at least two associated devices concurrently.

In another aspect, provided herein are methods for an emergency management system to connect to a user for providing emergency assistance comprising: a) maintaining, by the emergency management system, at least one database for lookup of triggering devices and a list of at least one associated device for each triggering device; b) receiving, by the emergency management system, an emergency alert from a triggering device; c) determining, by the emergency management system, whether the triggering device is able to host a connection with the user; and d) connecting, by the emergency management system, to the triggering device if the triggering device is able to host the connection; e) connecting, by the emergency management system, to at least one associated device; and f) communicating, by the emergency management system, with the user via the at least one associated device for requesting emergency assistance from at least one dispatch center.

In another aspect, provided herein are methods for providing the location of an emergency, by an emergency management system, comprising: a) receiving, by the emergency management system, an emergency alert from a triggering device, wherein the emergency alert does not include location data; b) searching, by the emergency management system, one or more databases for the location data for the triggering device; c) requesting, by the emergency management system, current location data from the triggering device or at least one associated device; and d) making, by the emergency management system, the location data available to one or more dispatch centers for providing emergency assistance. In some embodiments, the location data is a physical address or x-y coordinates. In some embodiments, the method further comprises calculating an accuracy for the location data. In some embodiments, the accuracy of the location data is made available to the one or more dispatch centers. In some embodiments, the method further comprises converting the location data into converted location data, wherein the converted location data is in compatible format for the one or more dispatch centers. In some embodiments, an accuracy of the converted location data is evaluated. In some embodiments, the emergency management system queries one or more databases for location data for the triggering device. In some embodiments, the emergency management system queries one or more databases for location data for one or more users associated with the triggering device. In some embodiments, the triggering device is installed within a building and the location data associated with the triggering device is saved in one or more databases in the emergency management system. In some embodiments, the triggering device is an IoT device. In some embodiments, the triggering device is a mobile device or hosted within a mobile vehicle and the emergency management system obtains the current location data from the triggering device. In some embodiments, the triggering device is a vehicle console or a vehicle computer. In some embodiments, the triggering device is assigned a token, wherein the emergency alert from the triggering device is tagged with the token and the location of the triggering device is provisioned with the user's phone number.

In another aspect, provided herein are emergency management systems comprising at least one processor, a memory, a network element, and a computer program including instructions executable by the at least one processor to create a server software application for connecting a user to at least one dispatch center for facilitating emergency assistance, the application comprising: a) a software module receiving an emergency alert from a triggering device, wherein the emergency alert does not include location data; and b) a software module: i) searching one or more databases for the location data for the triggering device ii) requesting current location data from the triggering device or at least one associated device; and iii) making the location data available to one or more dispatch centers for providing emergency assistance. In some embodiments, the location data is a physical address or x-y coordinates. In some embodiments, the emergency management system calculates an accuracy for the location data.

In another aspect, provided herein are non-transitory computer readable storage media encoded with a computer program including instructions executable by at least one processor to create a server application for connecting a user to at least one dispatch center for facilitating emergency assistance, the application comprising: a) a software module receiving an emergency alert from a triggering device, wherein the emergency alert does not include location data; and b) a software module: i) searching one or more databases for the location data for the triggering device ii) requesting current location data from the triggering device or at least one associated device; and iii) making the location data available to one or more dispatch centers for providing emergency assistance.

In another aspect, provided herein are triggering devices comprising at least one processor, a memory, a network element, and a computer program including instructions executable by the at least one processor to create an emergency trigger application comprising: a) a software module detecting an emergency; b) a software module triggering an emergency alert upon detecting an emergency; c) a software module transmitting the emergency alert to an emergency management system when the emergency alert is triggered, wherein the emergency alert comprises information for at least one associated device capable of communicating with the emergency management system; and d) a software module providing data from at least one of the triggering device and the at least one associated device to the emergency management system, wherein the data comprises to host an audio call. In some embodiments, a user of the triggering device is presented with an option to connect to or disconnect from a dispatch center.

In another aspect, systems for connecting a user to one or more dispatch centers for the purpose of providing emergency assistance are disclosed comprising: (a) a triggering device, wherein the triggering device transmits an emergency alert when an emergency is triggered; (b) an emergency management system for receiving the emergency alert from the triggering device, wherein the emergency management system: (i) maintains one or more databases for lookup of the triggering device for a list of associated devices, (ii) evaluates whether the triggering device has a capability to host a connection with a user and attempts to connect to the triggering device if the triggering device has the capability, and (iii) the emergency managements system attempts to connect to one or more associated devices in the list; and (c) one or more associated devices where a user may agree to be connected to the dispatch centers for requesting emergency assistance. In some embodiments, the emergency management system connects to each associated device simultaneously and connects the user who agrees to be connected first. In some embodiments, the list is a prioritized list with more than one associated devices and the emergency management system connects to the next associated device only when the connection with the preceding associated device has been unsuccessful. In some embodiments, associated devices can be looked up in one or more databases using telephone numbers. In some embodiments, associated devices can be looked up in one or more databases using email addresses, physical address, x-y coordinates, BSSID, SSID or MAC address. In some embodiments, the user is connected to a dispatch center by an audio call. In some embodiments, the emergency management system evaluates whether the triggering device has a capability to host an audio call and calls the triggering device if the triggering device has the capability. In some embodiments, the user may choose to connect to the dispatch center or disconnect. In some embodiments, the user may get notifications when the emergency alert has been triggered and the emergency management system was unable to connect to a user. In some embodiments, the emergency is triggered autonomously based on sensor data. In some embodiments, the emergency is triggered by detection of trigger sounds. In some embodiments, the trigger sounds comprises sounds of gunshots, explosions, breaking glass, person falling, baby crying, etc. In some embodiments, the emergency is triggered by user interaction with the triggering device.

In another aspect, disclosed herein are methods for an emergency management system to connect to a user for providing emergency assistance comprising: (a) receiving the emergency alert from a triggering device; wherein the emergency management system maintains one or more databases for lookup of the triggering device for a list of associated devices; (b) evaluating whether the triggering device has a capability to host a connection with a user and attempts to connect to the triggering device if the triggering device has the capability; (c) attempting to connect to one or more associated devices in the list; and (d) communicating with the user on one or more associated devices for requesting emergency assistance from one or more dispatch centers.

In another aspect, disclosed herein are systems, methods, devices and media for providing the location of an emergency, by an emergency management system, comprising: (a) receiving an emergency alert from a triggering device, wherein the emergency alert does not include location data; (b) searching one or more databases for the location data for the triggering device; (c) request current location data from the triggering device or associated devices; and (d) making the location data available to one or more dispatch centers for providing emergency assistance. In some embodiments, the location data is a physical address or x-y coordinates. In some embodiments, the method comprising the step of calculating an accuracy for the location data. In some embodiments, the accuracy of the location data is made available to one or more dispatch centers.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 22 illustrates a detailed exemplary embodiment of an emergency display;

FIG. 23A depicts an exemplary embodiment of a dashboard for testing emergency flows; and FIG. 23B depicts another exemplary embodiment of a dashboard for testing emergency flows.

DETAILED DESCRIPTION OF THE INVENTION

Figure 1A:
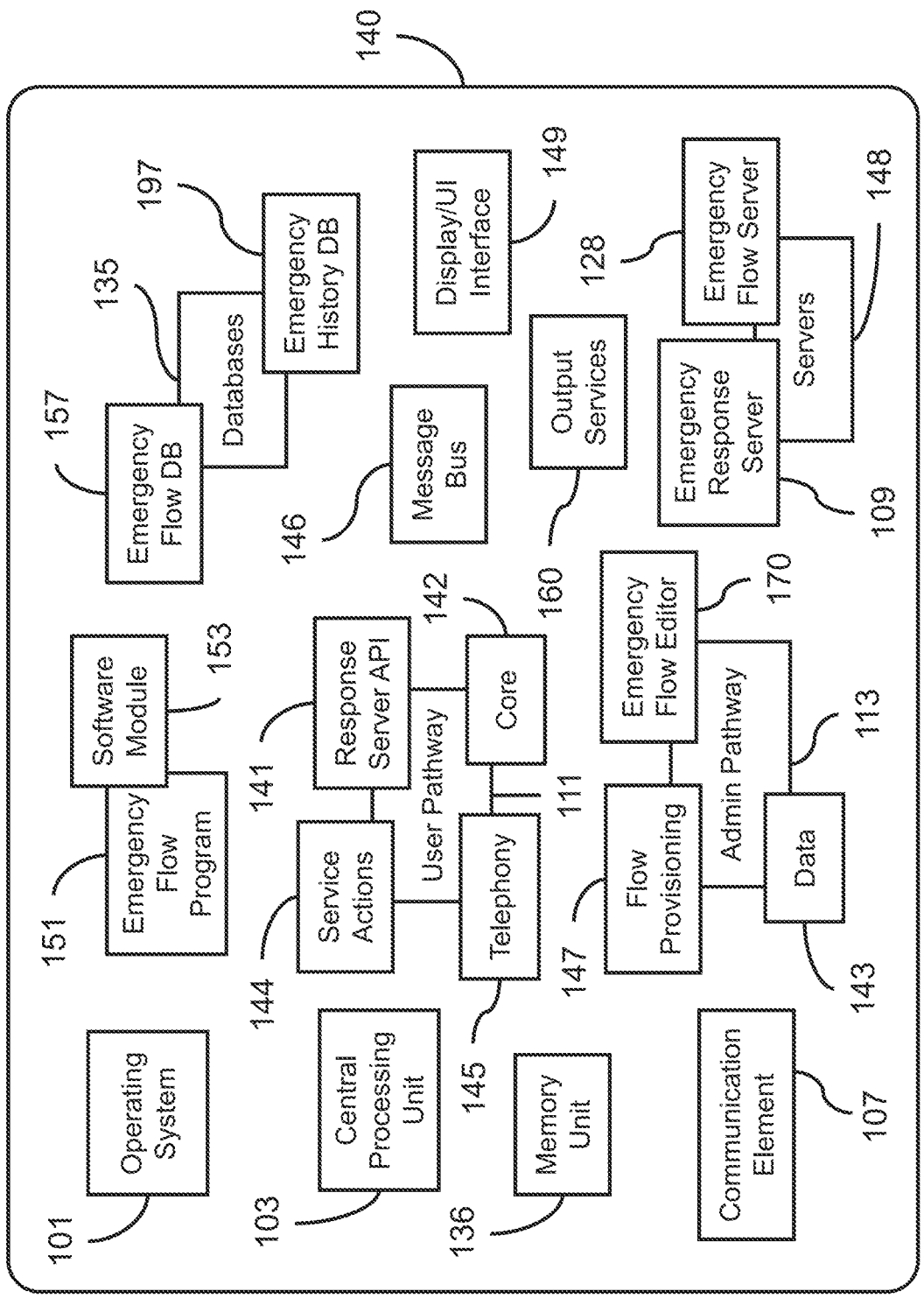
FIG. 1A depicts an exemplary embodiment of an emergency flow management system (EFMS).

In various embodiments, disclosed herein are systems and methods for emergency flow management. In one aspect, disclosed herein is an emergency flow management system comprising: a) an emergency flow configuration editor application comprising: i) a software module providing a plurality of emergency flow building blocks available for selection, each of the plurality of emergency flow building blocks comprising instructions to perform an emergency response function; ii) a software module providing an interactive space within which emergency flow building blocks are visually assembled into a customized emergency flow script that is associated with an emergency flow identifier; b) an emergency response server application comprising: i) a software module receiving an emergency alert from an electronic device, the emergency alert comprising the emergency flow identifier; ii) a software module identifying the emergency flow script associated with the emergency flow identifier; and iii) a software module executing the emergency flow script to establish and manage a communication session associated with the emergency alert.

In another aspect, disclosed herein is a system for emergency flow development and deployment, the system comprising: a) an electronic device associated with a user; b) a server communicatively coupled to the electronic device and configured to provide an emergency flow management system; and c) an emergency dispatch center; wherein the emergency flow management system is configured to: a) receive, from the electronic device, an emergency alert, the emergency alert including an emergency indication, sensor data from at least one sensor coupled to the electronic device, location information, and an emergency flow identification number; and b) in response to the emergency alert, execute an emergency flow script associated with the emergency flow identification number; wherein the emergency flow script instructs the emergency flow management system to: a) transmit an emergency response message to the electronic device; b) receive confirmation of receipt of the emergency response message; and c) in response to receiving confirmation of receipt of the emergency response message: d) establish a communicative link between the emergency dispatch center and the electronic device; and e) transmit the sensor data to the emergency dispatch center.

In another aspect, disclosed herein is a system for emergency call flow development and deployment, the system comprising: a) an electronic device associated with a user; b) a server communicatively coupled to the electronic device and configured to provide an emergency flow management system; and c) an emergency responder; wherein the emergency flow management system is configured to: a) receive, from the electronic device, an emergency alert, the emergency alert including an emergency indication and an emergency flow identification number; and b) in response to receiving the emergency alert, execute an emergency flow script associated with the emergency flow identification number; wherein the emergency flow script instructs the emergency flow management system to: a) transmit an emergency response message to the electronic device; b) receive confirmation of the emergency response message; and c) in response to receiving confirmation of receipt of the emergency response message, establish a communicative link between the emergency responder and the electronic device.

In another aspect, disclosed herein is a method for emergency flow development and deployment, the method comprising: a) receiving, from an electronic device associated with a user, an emergency alert, the emergency alert including an emergency indication, location information, and an emergency flow identification number; b) in response to receiving the emergency alert, executing an emergency flow script associated with the emergency flow identification number; wherein the emergency flow script includes instructions for: a) transmitting an emergency response message to the electronic device; b) receiving confirmation of receipt of the emergency response message; and c) in response to receiving confirmation of receipt of the emergency response message, establishing a communicative link between the emergency responder and the electronic device.

In certain embodiments, disclosed herein are systems for emergency communications comprising: a) a triggering device of the user transmitting an emergency alert when an emergency is triggered; and b) at least one server providing an emergency management system server application, wherein the application: i) maintains at least one database comprising a list of at least one associated device of the triggering device; ii) receives the emergency alert from the triggering device; iii) establishes a connection with the triggering device upon determining that the triggering device is able to host a connection with the server; and iv) connects to at least one associated device in the list; wherein the at least one associated device in the list is authorized by the user to be connected to the at least one dispatch center for requesting emergency assistance. In certain embodiments, disclosed herein are triggering devices comprising at least one processor, a memory, a network element, and a computer program including instructions executable by the at least one processor to create an emergency assistance program.

In certain embodiments, disclosed herein are emergency management systems comprising at least one processor, a memory, a network element, and a computer program including instructions executable by the at least one processor to create a server software application for connecting a user to at least one dispatch center for facilitating emergency assistance, the application comprising: a) a software module maintaining at least one database comprising a list of at least one associated device of the triggering device; b) a software module receiving an emergency alert from the triggering device; c) a software module establishing a connection with the triggering device upon determining that the triggering device is able to host a connection with the emergency management system; and d) a software module connecting to at least one associated device in the list; wherein the at least one associated device in the list is authorized by the user to be connected to the at least one dispatch center for requesting emergency assistance.

In certain embodiments, disclosed herein are non-transitory computer readable storage media encoded with a computer program including instructions executable by at least one processor to create a server application for connecting a user to at least one dispatch center for facilitating emergency assistance, the application comprising: a) a software module receiving an emergency alert from the triggering device; b) a software module maintaining at least one database comprising a list of at least one associated device of the triggering device; c) a software module establishing a connection with the triggering device upon determining that the triggering device is able to host a connection with the EMS; and d) a software module connecting to at least one associated device in the list; wherein the at least one associated device in the list is authorized by the user to be connected to the at least one dispatch center for requesting emergency assistance.

In certain embodiments, disclosed herein are methods for an emergency management system to connect to a user for providing emergency assistance comprising: a) maintaining, by the emergency management system, at least one database for lookup of triggering devices and a list of at least one associated device for each triggering device; b) receiving, by the emergency management system, an emergency alert from a triggering device; c) determining, by the emergency management system, whether the triggering device is able to host a connection with the user; and d) connecting, by the emergency management system, to the triggering device if the triggering device is able to host the connection; e) connecting, by the emergency management system, to at least one associated device; and f) communicating, by the emergency management system, with the user via the at least one associated device for requesting emergency assistance from at least one dispatch center.

In certain embodiments, disclosed herein are methods for providing the location of an emergency, by an emergency management system, comprising: a) receiving, by the emergency management system, an emergency alert from a triggering device, wherein the emergency alert does not include location data; b) searching, by the emergency management system, one or more databases for the location data for the triggering device; c) requesting, by the emergency management system, current location data from the triggering device or at least one associated device; and d) making, by the emergency management system, the location data available to one or more dispatch centers for providing emergency assistance.

In certain embodiments, disclosed herein are emergency management systems comprising at least one processor, a memory, a network element, and a computer program including instructions executable by the at least one processor to create a server software application for connecting a user to at least one dispatch center for facilitating emergency assistance, the application comprising: a) a software module receiving an emergency alert from a triggering device, wherein the emergency alert does not include location data; and b) a software module: i) searching one or more databases for the location data for the triggering device ii) requesting current location data from the triggering device or at least one associated device; and iii) making the location data available to one or more dispatch centers for providing emergency assistance.

In certain embodiments, disclosed herein are non-transitory computer readable storage media encoded with a computer program including instructions executable by at least one processor to create a server application for connecting a user to at least one dispatch center for facilitating emergency assistance, the application comprising: a) a software module receiving an emergency alert from a triggering device, wherein the emergency alert does not include location data; and b) a software module: i) searching one or more databases for the location data for the triggering device ii) requesting current location data from the triggering device or at least one associated device; and iii) making the location data available to one or more dispatch centers for providing emergency assistance.

In certain embodiments, disclosed herein are methods of transmitting an emergency alert and providing data to an emergency management system, comprising: a) detecting, by a triggering device, an emergency; b) triggering, by the triggering device, an emergency alert upon detecting the emergency; c) transmitting, by the triggering device, the emergency alert to an emergency management system when the emergency alert is triggered, wherein the emergency alert comprises information for at least one associated device capable of communicating with the emergency management system; and d) providing, by the triggering device, data from at least one of the triggering device and the at least one associated device to the emergency management system, wherein the data comprises location information.

In certain embodiments, disclosed herein are triggering devices comprising at least one processor, a memory, a network element, and a computer program including instructions executable by the at least one processor to create an emergency trigger application comprising: a) a software module detecting an emergency; b) a software module triggering an emergency alert upon detecting an emergency; c) a software module transmitting the emergency alert to an emergency management system when the emergency alert is triggered, wherein the emergency alert comprises information for at least one associated device capable of communicating with the emergency management system; and d) a software module providing data from at least one of the triggering device and the at least one associated device to the emergency management system, wherein the data comprises location information.

In certain embodiments, disclosed herein are non-transitory computer readable storage media encoded with a computer program including instructions executable by at least one processor to create a software application for a triggering device to transmit an emergency alert and providing data to an emergency management system, the application comprising: a) a software module detecting an emergency; b) a software module triggering an emergency alert upon detecting an emergency; c) a software module transmitting the emergency alert to an emergency management system when the emergency alert is triggered, wherein the emergency alert comprises information for at least one associated device capable of communicating with the emergency management system; and d) a software module providing data from at least one of the triggering device and the at least one associated device to the emergency management system, wherein the data comprises location information.

In certain embodiments, disclosed herein are method for an emergency management system to connect to a user for providing emergency assistance comprising: (a) receiving the emergency alert from a triggering device; wherein the emergency management system maintains one or more databases for lookup of the triggering device for a list of associated devices; (b) evaluating whether the triggering device has a capability to host a connection with a user and attempts to connect to the triggering device if the triggering device has the capability; (c) attempting to connect to one or more associated devices in the list; and (d) communicating with the user on one or more associated devices for requesting emergency assistance from one or more dispatch centers.

In certain embodiments, disclosed herein are systems for connecting a user to one or more dispatch centers for the purpose of providing emergency assistance comprising: (a) a triggering device, wherein the triggering device transmits an emergency alert when an emergency is triggered; (b) an emergency management system for receiving the emergency alert from the triggering device, wherein the emergency management system: (i) maintains one or more databases for lookup of the triggering device for a list of associated devices, (ii) evaluates whether the triggering device has a capability to host a connection with a user and attempts to connect to the triggering device if the triggering device has the capability, and (iii) the emergency managements system attempts to connect to one or more associated devices in the list; and (c) one or more associated devices where a user may agree to be connected to the dispatch centers for requesting emergency assistance.

In certain embodiments, disclosed herein are non-transitory computer-readable storage media encoded with a computer program including instructions executable by a processor to create an emergency application comprising: (a) receiving the emergency alert from a triggering device; wherein the emergency management system maintains one or more databases for lookup of the triggering device for a list of associated devices; (b) evaluating whether the triggering device has a capability to host a connection with a user and attempts to connect to the triggering device if the triggering device has the capability; (c) attempting to connect to one or more associated devices in the list; and (d) communicating with the user on one or more associated devices for requesting emergency assistance from one or more dispatch centers.

In certain embodiments, disclosed herein are non-transitory computer-readable storage media encoded with a computer program including instructions executable by a processor to create a device client application for triggering and sending an emergency alert. In certain embodiments, voice or speech and/or sounds may be detected to trigger the emergency alert. In certain embodiments, disclosed herein are emergency management systems comprising at least one processor, a memory, a network element, and a computer program including instructions executable by the at least one processor to create server software application for managing emergency communications.

In certain embodiments, disclosed herein are methods for providing the location of an emergency, by an emergency management system, comprising: (a) receiving an emergency alert from a triggering device, wherein the emergency alert does not include location data; (b) searching one or more databases for the location data for the triggering device; (c) request current location data from the triggering device or associated devices; and (d) making the location data available to one or more dispatch centers for providing emergency assistance.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device configured to send an emergency alert or communication (e.g. a 911 call) in response to a trigger (e.g. a voice command to call 911 or sensor data indicative of an emergency). In some embodiments, the triggering device comprises a communication component, which allow the sending and receiving of information over a wireless channel, a wired channel, or any combination thereof (e.g. sending/receiving information over the Internet). Exemplary triggering devices include a mobile phone (e.g. a smartphone), a laptop, a desktop, a tablet, a radio (e.g. a two-way radio), and a vehicular communication system. In some embodiments, a triggering device is part of a car security system (e.g. OnStar®), a home security system, or a home control system (e.g. a networked control system for providing network controlled and/or smart temperature control such as a Wi-Fi smart thermostat, lighting, entertainment, and/or door control, such as Nest®). In some embodiments, the triggering device is a smart speaker. In some embodiments, the triggering device responds to voice command(s) such as a spoken command to call emergency services (e.g. call 911). In some embodiments, the triggering device comprises a sensor for sensing environmental or health/physiological indicators. In some embodiments, the sensor comprises a sensing component and a communication component. In some embodiments, the triggering device is a sensor in a sensor network or a device that controls a sensor network.

In some embodiments, a triggering device is a wearable device (e.g. a communication device worn by a user). In some embodiments, a triggering device (e.g. a wearable device) comprises one or more sensors. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g. Smart watch, fitness tracker, wearable sensor, smart glasses, etc.).

As used herein, Internet of Things (IoT) refers to a network of physical devices, buildings, vehicles, and other objects that feature an IP address for internet network connectivity for exchanging data. In many cases, IoT devices are embedded with electronics, software, one or more sensors, and network connectivity. As used herein, a IoT device can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, IoT devices feature an IP address for internet connectivity. In addition to an IP address, the IoT device can be associated with a MAC address or an SSID. In some embodiments, IoT devices connect with other devices through Wi-Fi, Blue-Tooth®, a Zigbee™ transceiver radio or interface, an Ultra- Wideband (UWB) transceiver radio or interface, a WiFi-Direct transceiver radio or interface, a Bluetooth™ Low Energy (BLE) transceiver radio or interface, or other technologies which allow for transfer of data. In some embodiments, IoT devices form a mesh network allowing information to be efficiently routed between the devices. Examples of IoT devices include a home thermostat, intelligent home monitors, baby monitors, smoke or carbon monoxide detectors, home security camera systems, and other network-enabled devices. In some embodiments, a triggering device is an IoT device (e.g. a Nest® device).

As an example, an exemplary vehicular on-board console is triggered upon detection of an emergency. In some embodiments, the console contains a built-in microphone and uses the car speakers. In some embodiments, the console is connected to a Device Communication & Interface Module (DCIM), which uses an antenna to connect to the cellular network. When the car is in a crash, sensors can transmit information to the Sensing Diagnostic Module (SDM). In some embodiments, the SDM comprises an accelerometer, which measures the severity of the event based on gravitational force. The SDM sends this information to the DCIM, which uses the cellular antenna to send the emergency alert.

As used herein, an "account" refers to contact information for a user, including emergency contacts of the user. In some embodiments, the account is registered by the user to include a list of contact information for the user such as, for example, a list of associated devices. Examples of contact information on an account include phone number, email address, home address, work address, emergency contacts (e.g. name, phone number, email, etc), and associated devices (e.g. other communication devices of the user aside from the device or triggering device sending an emergency alert). In some embodiments, the account includes contact information for organizational representatives. For example, in some cases, a social media application installed on the user's electronic device is used to send an emergency alert. The communication session can be established with the user/user device, emergency service provider personnel, and an organizational representative for the social media entity. This scenario can occur when analysis of the user's social media activity indicates a possible emergency situation such as, for example, a suicide attempt by the user. In response, the social media application on the user device sends an emergency alert to an emergency management system. Since the user did not choose to request help, a representative of the social media entity is connected to the 3-way communication session to help explain the emergency situation to the emergency service provider.

As used herein, an "associated device" refers to a communication device that is associated with the triggering device. As an example, a user uses several communication devices such as a mobile phone, a wearable, a home security system, a car computer. In this example, the user has registered these devices with his or her account and linked these devices with a user name, user number(s), email address(es), home or other physical address(es). In some embodiments, associated devices include communication device(s) of a second user who is associated with user (e.g. a husband and wife, a father and son, a patient and doctor, friends, work colleagues, or other individuals). In some cases, the user has added the second user as an emergency contact or a member of a group. In some cases, user agreed to share location and other data with the second user. In some embodiments, the second user is someone who is frequently contacted by the user and the communication device identifies the second user from the "Recently called" or "Frequently called" list. In some embodiments, the associated devices are devices that are proximal or near-by to the triggering device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g. a second resident in a smart home). In some embodiments, the list of associated devices is listed by user name, phone number, email address, physical address, coordinates etc. In some embodiments, the device entry in the list includes phone number, email address, physical address, coordinates, BSSID, SSID or MAC address, or any combination thereof. In some embodiments, the list is user defined or generated by the device or the EMS.

As used herein, a "request for assistance" refers to a request or message sent to a recipient asking for help. In some embodiments, a request for assistance is an emergency request for assistance (e.g. the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In some embodiments, an emergency indication is selected from one or more of the group consisting of traffic accident, police emergency, medical emergency, and fire emergency. In some embodiments, a request for assistance is associated with a non-emergency situation (e.g. request for a tow truck after car breaks down). In some embodiments, a request for assistance is associated with a device sending the request. In other embodiments, a request for assistance is associated with a device not sending the request (e.g. a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, an emergency responder refers to government personnel responsible for addressing an emergency situation. In some embodiments, a emergency responder is responsible for a particular jurisdiction (e.g. a municipality, a township, a county, etc.). In some embodiments, an emergency responder is assigned to an emergency by an emergency dispatch center. In some embodiments, an emergency responder responds to a request for emergency assistance placed by a user via a user communication device. In some embodiments, an emergency responder includes one or more fire fighters, police officers, emergency medical personnel, community volunteers, private security, security personnel at a university, or other persons employed to protect and serve the public and/or certain subsets of the population.

As used herein, a "recipient" refers to one or more persons, services, or systems that receive a request for assistance (e.g. an emergency alert). The recipient varies depending on the type of request. In some embodiments, a recipient is an emergency service. In some embodiments, a recipient is an emergency service when he request for assistance pertains to an emergency (e.g. a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g. request is sent to the EMS, but ultimately is sent to an EDC). In some embodiments, a recipient is a emergency responder (e.g. a communication device of a emergency responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, "communication link" refers to a communication pathway from a device (e.g. communication device) to another device or to an intermediate device (e.g. a router) on a network. In some embodiments, the communication device establishes a communication link with another device or an intermediate device to transfer information (e.g. a location of the device) or to obtain information from a recipient such as, for example, location of a emergency responder assigned to a request for assistance associated with the communication device (e.g. device of emergency responder). A communication link refers to the point-to-point communication channels, point-to-point and end-to-end data sessions, and the physical hardware facilitating the communication channel(s) (e.g. antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g. a previously agreed upon protocol). In some embodiments, the data session is routed through an EMS, which stores the multi-media, voice, and/or other data from any of the devices that are part of the data session. In some embodiments, the EMS shares the data from the data session with the other device (e.g. device of a emergency responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g. power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g. iListen, Voice Navigator, Google Now, LilySpeech, etc.). In some embodiments, the software may be able to recognize the identity of the speaker. As used herein, "voice command" refers to words or phrases that a user may use to give command to the triggering device.

As used herein, "sound detection software" refers to computer programs for detecting trigger sounds in and around the triggering device. In some embodiments, the trigger sounds are user-defined or obtained from a library of phrases on the trigger device or at a remote server. Examples of trigger sounds include sounds (alarms, breakage, gunshots, explosion, fire, car crash, etc.). In some embodiments, a trigger is an absence of sound (e.g. no heartbeat, etc). As an example, a glass break detector software uses the microphone in the trigger device to monitor any noise or vibrations to detect burglaries in a smart home. In some embodiments, vibrations exceeding a baseline threshold are analyzed by the software. In some embodiments, the software analyzes frequencies typical of glass shattering and trigger an emergency alert if the sound is above a trigger threshold. In some cases, the software compares detected sounds with glass-break profiles analysis and triggers an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels, including increments therein. In some embodiments, a trigger sound threshold is at least about 50, 55, 60, 65, 70, 75, 80, 85, 90, 95, 100, 110, 120, 130, 140, 150, 160, 170, 180, 190, or 200 decibels, including increments therein. In some embodiments, a trigger sound threshold is no more than about 50, 55, 60, 65, 70, 75, 80, 85, 90, 95, 100, 110, 120, 130, 140, 150, 160, 170, 180, 190, or 200 decibels, including increments therein.

In some embodiments, voice recognition and speech recognition use recordings of the human voice, but differ in approach. Speech recognition strips out the personal differences between speakers to detect the words. Voice recognition typically disregards the language and meaning to detect the physical person behind the speech. Speech recognition is language dependent, while voice recognition is independent of language. In essence, voice biometrics provides speaker recognition rather than speech recognition. In some embodiments, speech recognition is the inter-disciplinary sub-field of computational linguistics that develops methodologies and technologies that enables the recognition and translation of spoken language into text by computers. It is also known as "automatic speech recognition" (ASR), "computer speech recognition", or "speech to text" (STT). In some embodiments, some speech recognition systems require "training" (also called "enrollment") where an individual speaker reads a text or isolated vocabulary into the system. The system analyzes the person's specific voice and uses it to fine-tune the recognition of that person's speech, resulting in increased accuracy. Systems that do not use training are called "speaker independent" systems. Systems that use training are called "speaker dependent". In some embodiments, speech recognition applications include voice user interfaces such as voice dialing (e.g. "Call home"), call routing (e.g. "I would like to make a collect call"), domotic appliance control, search (e.g. find a podcast where particular words were spoken), simple data entry (e.g. entering a credit card number), preparation of structured documents (e.g. a radiology report), speech-to-text processing (e.g. word processors or emails), and aircraft (usually termed direct voice input).

As used herein, the term "voice recognition" or "speaker identification" refers to identifying the speaker, rather than what they are saying. Recognizing the speaker can simplify the task of translating speech in systems that have been trained on a specific person's voice or it can be used to authenticate or verify the identity of a speaker as part of a security process. In some embodiments, to convert speech to on-screen text or a computer command, a computer or device has to go through several complex steps.

An exemplary speech detection program may work in the following way. The analog-to-digital converter (ADC) translates the analog wave (vibrations from speech or sound) into digital data that the computer can understand. To do this, the program samples, or digitizes, the sound by taking precise measurements of the wave at frequent intervals. The program filters the digitized sound to remove unwanted noise, and sometimes to separate it into different bands of frequency. The program also normalizes the sound, or adjusts it to a constant volume level. In some embodiments, the program is temporally aligned. Users speak at different speeds, so the sound may be adjusted to match the speed of the template sound samples already stored in the system's memory. Next, the signal is divided into small segments as short as a few hundredths of a second, or even thousandths in the case of plosive consonant sounds—consonant stops produced by obstructing airflow in the vocal tract—like "p" or "t." The program then matches these segments to known phonemes in the appropriate language. A phoneme is the smallest element of a language—a representation of the sounds we make and put together to form meaningful expressions. There are roughly 40 phonemes in the English language, while other languages have more or fewer phonemes. The program examines phonemes in the context of the other phonemes around them. The contextual phoneme plot is run through a complex statistical model and compared with a large library of known words, phrases and sentences. The program then determines what the user was probably saying and either outputs it as text or issues a computer command.

In some embodiments, speech recognition systems use powerful and complicated statistical modeling systems. These systems use probability and mathematical functions (e.g. Hidden Markov Model and neural networks) to determine the most likely outcome.

As used herein, an "audio detector" refers to a device that can detect audio inputs (e.g. voice commands, trigger sounds). In some cases, the audio detector is a separate device (e.g. a smart speaker). In some cases, the audio detector is a component of another device (e.g. microphone inside of a smart phone). In some embodiments, sound may be detected "sound sensors", "sound detectors" or microphones. For example, a sound is a board that combines a microphone and some processing circuitry. The sound detector provides an audio output, but also a binary indication of the presence of sound, and an analog representation of its amplitude. In some embodiments, the microphone turns sound energy into electrical energy. When a user speaks, sound waves created by a user's voice carry energy toward the microphone. Inside the microphone, the diaphragm and coil move back and forth upon contact with the sound waves. A permanent magnet produces a magnetic field that cuts through the coil and an electric current is produced. The electric current flows out from the microphone to an amplifier on the sound recording device.

In some embodiments, the microphone in a phone or smart device turns the user's voice into a stream of instantaneous waveform samples (e.g. at a rate of 16000 per second). A spectrum analysis stage converts the waveform sample stream to a sequence of frames, each describing the sound spectrum of approximately 0.01 sec. About twenty of these frames at a time (0.2 sec of audio) are fed to the acoustic model, a Deep Neural Network (DNN) which converts each of these acoustic patterns into a probability distribution over a set of speech sound classes (e.g. 20 sound classes). Each "hidden" layer is an intermediate representation discovered by the DNN during its training to convert the filter bank inputs to sound classes. The system chooses the number of units in each hidden layer of the DNN to fit the computational resources available. On smart phones or smart devices, two neural networks may be used—one for initial detection and another as a secondary checker. The output of the acoustic model provides a distribution of scores over phonetic classes for every frame.

In some embodiments, sound detection or voice activity detection (VAD) is accomplished by identifying a unique sound algorithm or pattern. In some embodiments, the sound waves are sliced using a technology called analog to digital conversion (ADC). Once this sound is in digital form, powerful and economical application specific integrated circuits (ASIC) along with digital signal processor (DSP) programming allows the sound detection software to identify trigger sounds and voice commands.

In some embodiments, voice activity detection (VAD), also known as "speech activity detection" or "speech detection," is a technique used in speech processing in which the presence or absence of human speech is detected. In some embodiments, VAD facilitates speech processing, and is also used to deactivate some processes during non-speech section of an audio session by avoiding unnecessary coding and transmission of silence packets in Voice over Internet Protocol applications, saving on computation and on network bandwidth. In some embodiments, VAD is the processes of discrimination of speech from silence or other background noise. The VAD algorithms are based on any combination of general speech properties such as temporal energy variations, periodicity, and spectrum.

In some embodiments, to minimize power consumption of a voice-controlled devices, speech recognition is handled after "keyword spotting" is completed (e.g. by keeping the voice ADC and the DSP on). In some embodiments, a VAD detector can continuously monitor surrounding sounds to identify voice activity so as to awaken the voice processing blocks (audio ADC and DSP) through a trigger signal as soon as, but not sooner than, when a voice is detected.

Emergency Communications

Modern communication devices, for example, smart phones, tablet computers, wearable communication devices, smart sensor devices, and/or systems are often equipped with a variety of features for determining location information of the communication device using, for example, GPS, or triangulation with cellular phone towers or device-based hybrid location from location services. Modern communication devices also often include functionality to store data regarding a user of the communication device, for example, health information about the user.

In some embodiments, the communication device (or communication module of the device) communicates with a recipient through a communication link comprising one or more data channels. In some embodiments, the recipient is an emergency management system (EMS). In some embodiments, the EMS routes communications to an EDC. In some embodiments, the EMS establishes a first data communication link with the communication device and a second data communication link between the EMS and the EDC, wherein the EMS bridges the first and second data channels to enable the communication device and the EDC to communicate. In some embodiments, the EMS converts data (e.g. data set) from the communication device into a format suitable for the EDC (e.g. analog or digital, audio, SMS, data, etc.) before sending or routing the formatted data to the EDC. In some embodiments, the EMS routes communications to a device associated with a first responder or responder device. In some embodiments, the communication device relays additional communications, updated or supplemental information, and/or data sent or shared between member devices in the group of devices to the EMS or EDC after a request for assistance has been sent. In some embodiments, the additional information is relayed to the EMS or EDC after the request for assistance has been sent in order to provide current information that is relevant to the request. For example, in some instances, communications between member devices contain information relevant to the emergency (e.g. information that the user of member device who is experiencing a medical emergency suffers from diabetes). Accordingly, in some embodiments, the information is sent autonomously, at request of a user of the communication device, or at request of the recipient (e.g. EMS, EDC, first responder, etc.).

FIG. 1A shows a schematic diagram of one embodiment of an emergency flow management system 140 as described herein. In some embodiments, the emergency flow management system 140 is a standalone system that can interact with devices, the emergency management system, and/or dispatch centers. In other embodiments, the emergency flow management system is distributed in various devices and systems.

In some embodiments, the emergency flow management system (EFMS) 140 comprises one or more of an operating system 101, a central processing unit 103, a memory unit 136, a communication element 107, a display or user interface 149 (for an EFMS administrator to maintain and update the system) and an emergency flow program 151 (e.g. server application) including at least one software module 153.

In some embodiments, the emergency flow management system 140 comprises one or more databases 135. In some embodiments, the emergency flow management system 140 comprises an emergency flow database 157 from which emergency flows may be called when there is an emergency trigger. In some embodiments, the emergency flow management system 140 comprises an emergency history database, which enters and maintains a log of emergency incidents, emergencies triggered, and/or emergency flows that have been implemented. In some embodiments, emergency flow management system 140 includes a message bus 146, one or more servers 148 implementing instructions form the emergency flow program 151 (e.g. emergency flow server 128 for generating emergency flows and emergency response server 109 for executing emergency flows) and output services 160.

Figure 1B:
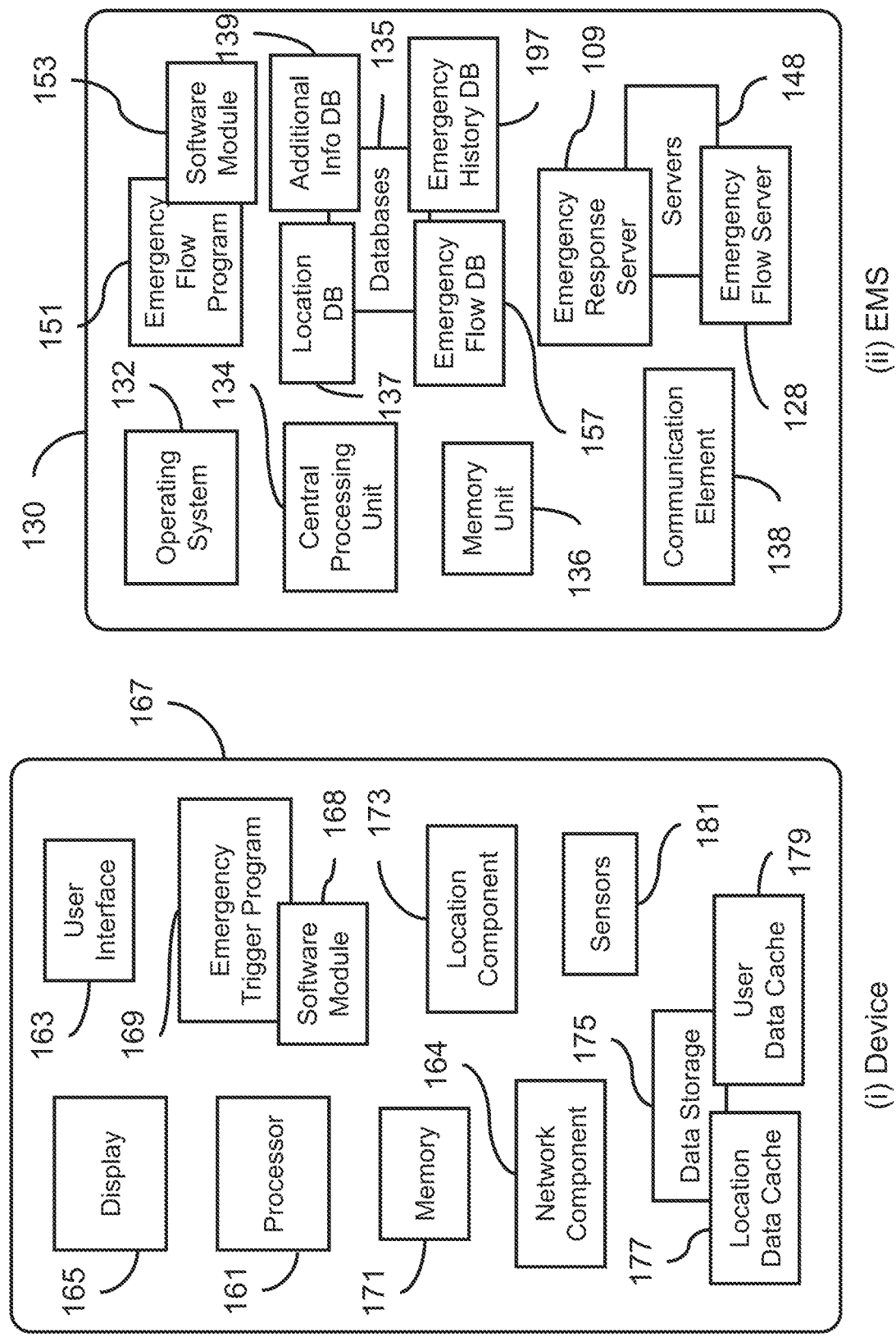
FIG. 1B, depicts exemplary embodiments of (i) an electronic device (e.g. a communication device) and (ii) an emergency management system.

FIG. 1B shows a schematic diagram of one embodiment of a device described herein. In some embodiments, the device 167 is an electronic device such as a triggering device which may be a communication device (e.g. wearable, mobile or cellular phone, computer, laptop, vehicular console, smart car, personal digital assistant, IoT devices, smart home, smart TV, etc.). In some embodiments, the triggering device is a wearable device. In some embodiments, the triggering device is a wireless mobile device or a smartphone. In some embodiments, the triggering device is a combination of devices (e.g. a wearable device communicatively connected to a mobile phone). In some embodiments, the triggering device is a walkie-talkie or a two-way radio. In some embodiments, a user 102 (not shown) is selected from one or more persons who are the primary users of the device 167. When the user 102 is in an emergency situation, the device 167 can be triggered.

In some embodiments, the device 167 comprises at least one processor 161, a memory 171 (e.g. an EPROM memory, a RAM, a solid-state memory), a display 165, a user interface 163, a network component 164 (e.g. an antenna and associated components, Wi-Fi adapters, Bluetooth® adapters, etc.), sensors 181, and an emergency trigger program 169 (e.g. mobile application, server application, computer program, application). In some embodiments, the device is equipped with a location component 173, for example, a global positioning system (GPS), location services, etc. In some embodiments, the device comprises data storage 175. In some embodiments, the device comprises a location data cache 177 and a user data cache 179.

In some embodiments, the device 167 has several components including a display 165 and user interface 173, which allow the user 102 (not shown) to interact with the device 167. In some embodiments, the display 165 is a part of the user interface 163 (e.g. a touchscreen is both a display and provides an interface to accept user interactions). In some embodiments, the user interface 163 includes physical buttons such as the on/off and volume buttons. In some embodiments, the display 165 and/or the user interface 163 comprises a touch screen (e.g. a capacitive touch screen), which is capable of displaying information and receiving user input. In some embodiments, the device 167 comprises hardware components not including a display 165 and a user interface 163, wherein the device functions autonomously without requiring active user guidance or interaction.

In some embodiments, a device 167 includes various accessories that allow additional functionality. In some embodiments, the accessories (not shown) include one or more of the following: microphone (e.g. for user voice interaction), a camera (e.g. for input of gestures commands or pictures from the user), speakers, one or more sensors 181, such as a fingerprint reader or scanner/health or environmental sensors, USB/micro-USB port, headphone jack, a card reader, SIM card slot, and any combination thereof.

In some embodiments, a device 167 autonomously detects emergencies based on data from various sources such as the sensors 181 (sensor data) or sound detection picked up from the microphone or another accessory (e.g. smoke detector). For example, in some embodiments, a device autonomously detects an emergency based on sensor data when sensor readings or values exceed a threshold (e.g. a predefined threshold set by the device software by default, by a user, or by an EMS). In some embodiments, the device 167 obtains relevant data from associated device to trigger the emergency.

In some embodiments, the emergency management system 130 houses components of the emergency flow management system (EFMS). In some embodiments, the emergency management system 130 comprises an application for assembling and/or configuring emergency flow scripts. In some embodiments, the emergency management system 130 comprises an application for managing an emergency response to an emergency alert including execution of an emergency flow script. In some embodiments, the emergency management system 130 comprises one or more of an operating system 132, at least one central processing unit or processor 134, a memory unit 136, a communication element 138, and a server application 151 (e.g. an emergency flow program). In some embodiments, the emergency management system 130 comprises one or more databases 135 (e.g. location database 137, an additional information database 139, emergency flow database 157, and/or emergency history database 197). In some embodiments, the emergency management system 130 may include one or more servers 148. In some embodiments, an emergency response server 109 executes an emergency flow when an emergency or emergency-like situation is triggered via a user pathway 111). In some embodiments, an emergency flow server 128 allows an administrator to generate and modify emergency flows via an admin pathway 113. In some embodiments, the emergency management system 130 comprises at least one of a location database 137 and an additional information database 139. In some embodiments, the emergency flow program 151 comprises at least one software module 153 for carrying out one or more instructions.

Figure 1C:
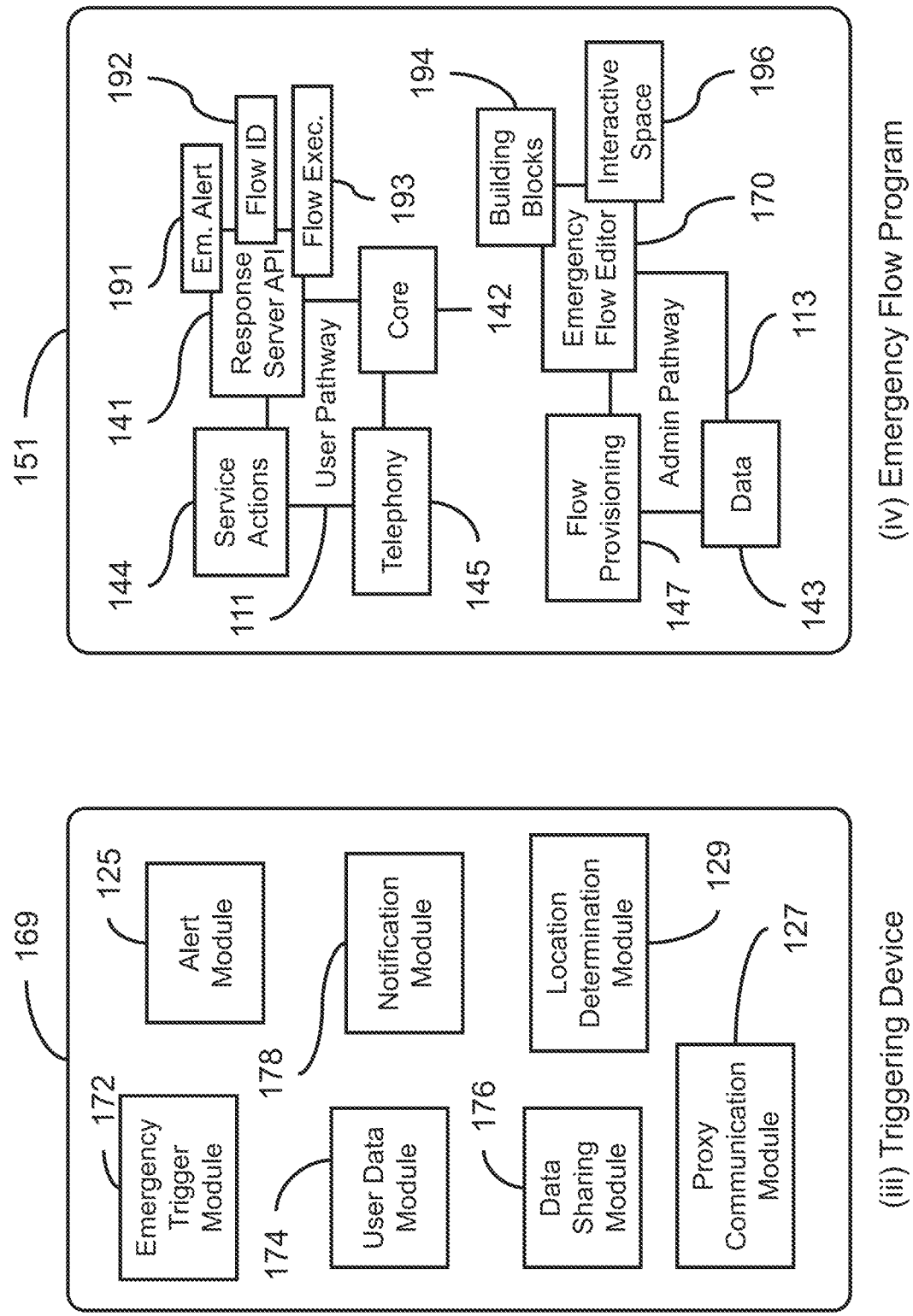
FIG. 1C depicts exemplary embodiments of (iii) a triggering device and (iv) an emergency flow program.

FIG. 1C shows a schematic diagram of one embodiment of an emergency trigger program 169 installed on a device, such as a triggering device 167. In some embodiments, the emergency trigger program 169 comprises one or more device software modules selected from an emergency trigger module 172 (for saving conditions for triggering an emergency alert), an alert module 125 (for sending the emergency alert), a user data module 174 (for entering and storing user contacts and other preferences and user data), a location determination module 129 (for determining device-based location through GPS, location services, or other methods), a data sharing module 176 (for sharing data from the device with EMS, EFMS, EDC or responders, etc.), a proxy communication module 127 (for making a proxy call on behalf of another), a notification module 178 (for displaying communications from the EFMS to the user), or any combination thereof.

FIG. 1C also shows a schematic diagram of one embodiment of an emergency flow program 151 installed on a server (e.g. a server in an EMS). In some embodiments, the emergency flow program 151 comprises one or more server software modules selected from an administrator's (admin) pathway 113 comprising an emergency flow editor module 170, a flow provisioning module 147, a data module 143, or any combination thereof. In some embodiments, the emergency flow editor module 170 comprises a building blocks module 194, an interactive space module 196, or any combination thereof.

In some embodiments, the emergency flow program 151 comprises one or more server software modules selected from a user pathway 111 comprising a response server API module 141, a core module 142, a service actions module 144, a telephony module 145, or any combination thereof. In some embodiments, the response server API module 141 comprises an emergency alert module 191, a flow identification module 192, a flow execution module 193, or any combination thereof.

Figure 1D:
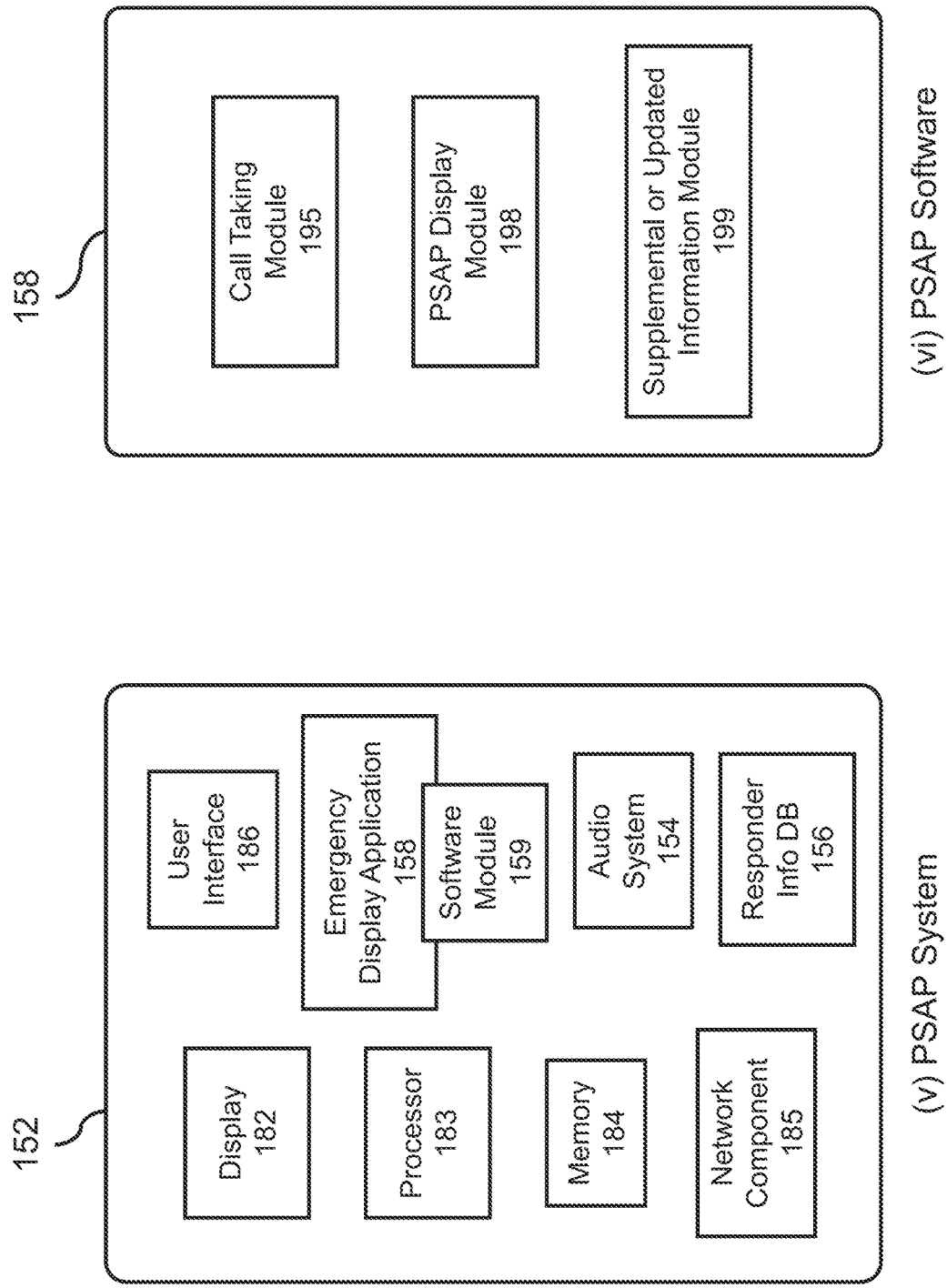
FIG. 1D depicts exemplary embodiments of (v) a public safety answering point (PSAP) system and (vi) PSAP software.

FIG. 1D shows a schematic diagram of one embodiment of a Public Safety Answering Point (PSAP) system 152 as described herein. In some embodiments, the PSAP system 152 comprises one or more of a display 182, a user interface 186, at least one central processing unit or processor 183, a memory unit 184, a network component 185, an audio system 154 (e.g. microphone, speaker and/or a call-taking headset) and a computer program such as a PSAP Emergency Display Application 158. In some embodiments, the PSAP application 158 comprises one or more software modules 159. In some embodiments, the PSAP system 152 comprises a database of responders 156, such as medical assets, police assets, fire response assets, rescue assets, safety assets, etc.

FIG. 1D also shows a schematic diagram of one embodiment of a PSAP application 158 installed on a PSAP system 152 (e.g. a server in the PSAP system). In some embodiments, the PSAP application 158 comprises one or more software modules. In some embodiments, a software module is a call taking module 195, a PSAP display module 198, a supplemental or updated information module 199 or a combination thereof. In some embodiments, the PSAP application 158 displays the information as depicted in FIG. 22. In some embodiments, the PSAP application 158 displays the information on a map.

In some embodiments, location and supplemental information may be displayed for emergency service providers (e.g. police, fire, medical, etc.) and/or responders on their devices. It is contemplated that responder devices may be installed a responder device program (not shown) similar to PSAP display module 198 as depicted in FIG. 22. In some embodiments, the responder device program displays the emergency location on a map.

Figure 2:
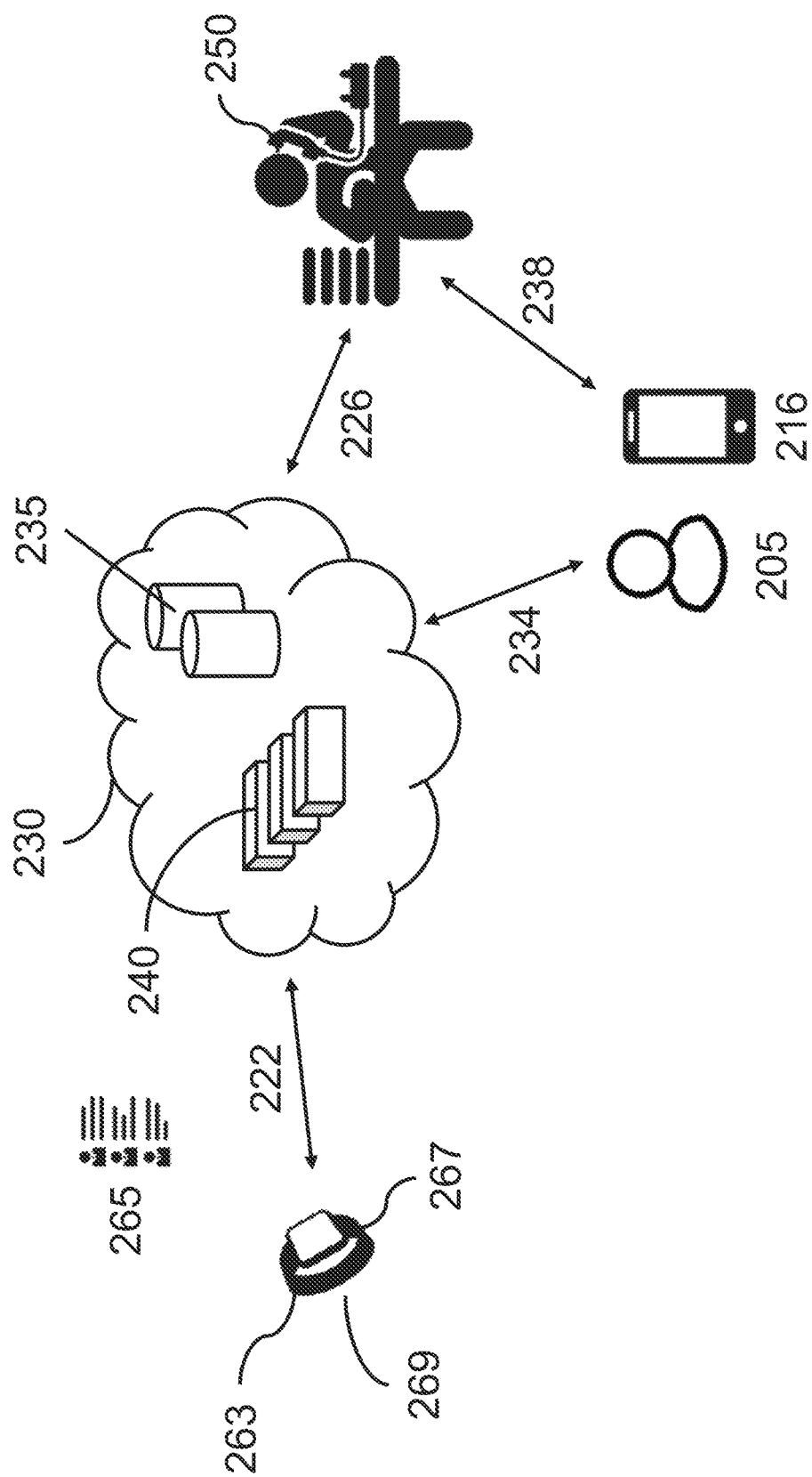
FIG. 2 depicts a first exemplary embodiment of a system for managing emergency flows.

FIG. 2 also depicts an embodiment of a system for connecting with other devices after an emergency alert has been triggered. As shown, a triggering device 267 sends the emergency alert, which is a request for assistance to respond to an emergency, to the EFMS 240, which is housed in the EMS 230.

In some embodiments, the triggering device 267 includes a network component (e.g. a Wi-Fi antenna) which sends the emergency alert. In some embodiments, the emergency alert is sent via the internet, cellular network, or landline network. For example, the emergency alert may be sent via an API call (such as through the alert module in FIG. 1B) over the internet to the EMS, or to a third-party system (e.g. a home security device could contact the security company's system), which is able to contact the EMS via an API call. In some embodiments, the alert is an SMS notification to the EMS or to the third-party system, which will contact the EMS. In some embodiments, when the data signal is strong, data API calls are used because of good data transfer rates for sending the alert quickly. In some embodiments, when the data signal is not good (e.g. low signal-to-noise ratio, high latency), SMS and/or other methods are used as a fallback option for sending the emergency alert.

In some embodiments, the emergency alert is transmitted via a land mobile radio system (LMRS) using custom signals to a third-party system, which optionally connects to the EMS. As an example, the triggering device is a two-way radio in a vehicle, which connects to another two-way radio in its vicinity to send the emergency alert. In certain embodiments, whenever a device or user is able to connect to the EMS (e.g. via an API call), the alert is optionally sent to the EMS.

In some cases, the connectivity (e.g. Wi-Fi signals) is weak or the pathways are not secure and the emergency alert is transmitted using another communication device (e.g. a mobile phone) or a routing device (e.g. Wi-Fi router). In some embodiments, the triggering device 267 is not Internet-enabled and sends the alert through designated pathways or to designated devices (e.g. via a mobile phone connected by Bluetooth to device 267). In some embodiments, an IoT device sends the alert to a controlling or master device (e.g. a home console that connects to smoke alarms). In another example of this embodiment, the triggering device 267 is a physical "panic" button (e.g. a button under the desk of a bank teller) that is discreetly pressed in the event of a possible emergency situation and sends an emergency alert to a controlling or master device (e.g. a bank's central communication system). In some embodiments, the controlling or master device forwards the alert to an emergency service such as an EMS or EDC such as according to an emergency flow script. In some embodiments, an IoT device includes sensors that detect environmental conditions, and another device (e.g. a digital assistant, wearable, phone, etc.) evaluates if the sensed value indicates an emergency situation or likely emergency situation and sends an emergency alert. In some embodiments, the IoT devices or digital assistants on the ground detect a voice command or sense data, and the processing is done at a remote location, such as on the cloud.

In some embodiments, an emergency is detected when sensor values exceed a certain threshold or fall outside an acceptable range. In some embodiments, an emergency is detected when sensor values exceed a certain threshold (that is optionally user configurable or preset) such as for a temperature sensor, a smoke detector, a carbon dioxide detector, or a carbon monoxide detector.

In some embodiments, the triggering device 267 includes a computer program 269 for triggering the emergency flow and sending the alert. The computer program 269 pre-installed on the device or has been loaded and installed by the user (e.g. user 202, not shown). In some embodiments, the user 202 went through a setup or registration process for the device 267, where he or she has provided user data such as emergency contacts (e.g. phone numbers, email addresses, messaging IDs), user information, location (e.g. a physical address of the location of the device 267), etc. In some embodiments, user data, location data, emergency data, etc., is saved in data cache or storage in the device 267. In other embodiments, the data is saved in one or more databases 235 in the EMS, in third-party servers or in cloud-based systems. In some embodiments, the data is protected by password protection, authentication protocols for transmission, encryption, use of secured pathways, and other methods for limiting the risk of security breaches.

In some embodiments, the emergency is triggered by user input such as the user interacting with the user interface 263 of the triggering device 267. In some embodiments, the user presses one or more hard or soft buttons on the user interface 263. However, other types of user interactions such as touch, tap, pattern of touches, gesture, and voice-activation are also contemplated. For example, a user in a taxicab who suspects that the cab driver does not know where he or she is going, or is intoxicated, or is attempting to abduct the user, the user may select a hard or soft button (e.g. a panic button) or a pattern of presses on the user's cell phone to discreetly trigger an emergency alert.

In some embodiments, the triggering device 267 autonomously detects emergency situations or likely emergency situations. In some embodiments, the triggering device 267 sends an alert based on autonomously detected emergencies using one or more sensors (not shown) such as from a smoke alarm in a building. In some embodiments, the sensors sense one or more environmental or health parameters. In some embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, health parameters include heart rate, pulse, electric signals from the heart, blood oxygen levels, blood pressure, blood sugar level, and other health parameters. In some embodiments, the triggering device 267 is an Internet of Things (IoT) device such as a home thermostat, vehicle console, a pacemaker implant, etc. As used herein, IoT refers to the ever-growing network of physical devices, buildings, vehicles, and other objects that feature an IP address for internet network connectivity for exchanging data. In many cases, IoT devices are embedded with electronics, software, sensors, network connectivity, or a combination thereof. In some embodiments, IoT devices feature an IP address for internet connectivity. In addition to an IP address, an IoT device is optionally associated with a MAC address or an SSID. It is understood that, IoT devices are connected with one or more other devices through Bluetooth®, Wi-Fi, or other wired and/or wireless technologies which allow for transfer of data.

In some embodiments, the IoT device is in a network of sensors. As an example, IoT networks, wireless sensor networks (WSN) or wireless sensor and actuator networks (WSAN) monitor environmental parameters such as temperature, pressure, sound, etc., using a network of sensors or devices. When one sensor or device detects a sensed value outside of the identified range indicating a likely emergency, it will pass the data to other devices in the network. In some embodiments, the sensor network is a Wi-Fi, WiMAX, or LTE MESH network. In some embodiments, the sensor or IoT devices form nodes in the sensor network. In some embodiments, the sensor network includes a central node for controlling the network. In some embodiments, the sensor network has a distributed architecture to reduce the impact of a failed node.

In some embodiments, an IoT device comprises at least one of the following components including a sensing component (e.g. thermocouple), a networking component (a radio transceiver with an antenna or connection for an external antenna), a microcontroller, an electronic circuit connected to the sensing component, and an energy source. In some embodiments, the sensor network is controlled by a center console (e.g. a smart home console).

In some embodiments, the triggering device 267 is a communication device such as a mobile phone, a computer, a wearable device (e.g. a smart watch), a digital assistant, etc. In some embodiments, when the triggering device 267 is a mobile phone, the emergency alert is sent via a cellular connection, if it is available. In some embodiments, after the alert is sent to the EFMS 240 via communication link 222, the EFMS 230 initiates an emergency flow script. As a part of the emergency flow, an emergency call along two-way communication link 226 may be established (e.g. via path 702, 704A, 708 shown in FIG. 7). In some cases, communication link 222 is a data link, which optionally supports a data call such as VoIP. In some embodiments, link 222 is used for sending data such as user data, location data, emergency data, text, images, and video from the triggering device 267. In some embodiments, communication link 222 is established via landline, cellular network or the Internet. In some embodiments, the communication link 222 is through VoIP with both voice and data transmitted in the same path (e.g. in the SIP signaling, as headers or in multi-part messages). In some embodiments, the communication link 222 is an analog voice call over landline or cellular network and a data link for transferring data via Wi-Fi, cellular data, etc. Generally, data links are preferred for transmission of both voice and data whenever they are available, and the signal strength is good. In certain cases, the communication link is sent through NG911 systems, where the data is optionally sent through SIP signaling. In some embodiments, updated data (e.g. current location data) may be transmitted via link 222 and provided to the EDC 250 via link 226.

In some embodiments, the EMS 230 includes one or more databases 235 housed in one or more servers in the same or in a remote location. In some embodiments, location database 237 houses location data regarding the location of the emergency. In some embodiments, user database 239 houses user data and/or emergency data (such as an emergency contact list 265). In other embodiments, the location, user, and/or emergency data (such as an emergency contact list 265) are saved on a data cache 215 (not shown) in the triggering device 267 or in data storage in other devices such as mobile phone 206, computer 246, or mobile phone 216, etc. In other embodiments, the data is saved online in one or more remote servers or cloud-based systems. The location data and additional data (user data and emergency data) may be provisioned in the databases 235, 239, or a third-party server, etc. and sent to the EDC 250 after a query has been received. In some embodiments with a standalone EFMS 240 (as depicted in FIG. 1A), databases 135 may be housed within the EFMS 240.

In some embodiments, the emergency contact list 265 is entered by the user 202 at the time of registration or installation of the computer program 269 or at another time. In some embodiments, the emergency contact list 265 is a list of phone numbers, email addresses, IP addresses, MAC addresses, or any combination thereof. In some embodiments, computing devices which are not associated with a phone number (such as computer 246, not shown) are identified by an IP address, MAC address, URLs or SSIDs.

In some embodiments, the EFMS 240 attempts to connect to a user using one or more communication links (e.g. 234) when the user has not answered the call (NA response). In some emergency flows, the EFMS 240 sends the alert indirectly to an EDC 250 (e.g. a PSAP). In some emergency flows, the EFMS 240 sends the alert to a third-party (not associated with user 202 (e.g. a corporate representative of an organization, etc.). In some emergency flows, the EFMS 240 attempts to connect to user 202 via devices associated with user 202's account such as communication device 206 (not shown) or computer 246 (not shown). In some emergency flows, the EFMS 240 optionally connects to user 205 (and other users designated as emergency contacts or frequently called contacts, etc.) via communication device 216.

Figure 14:
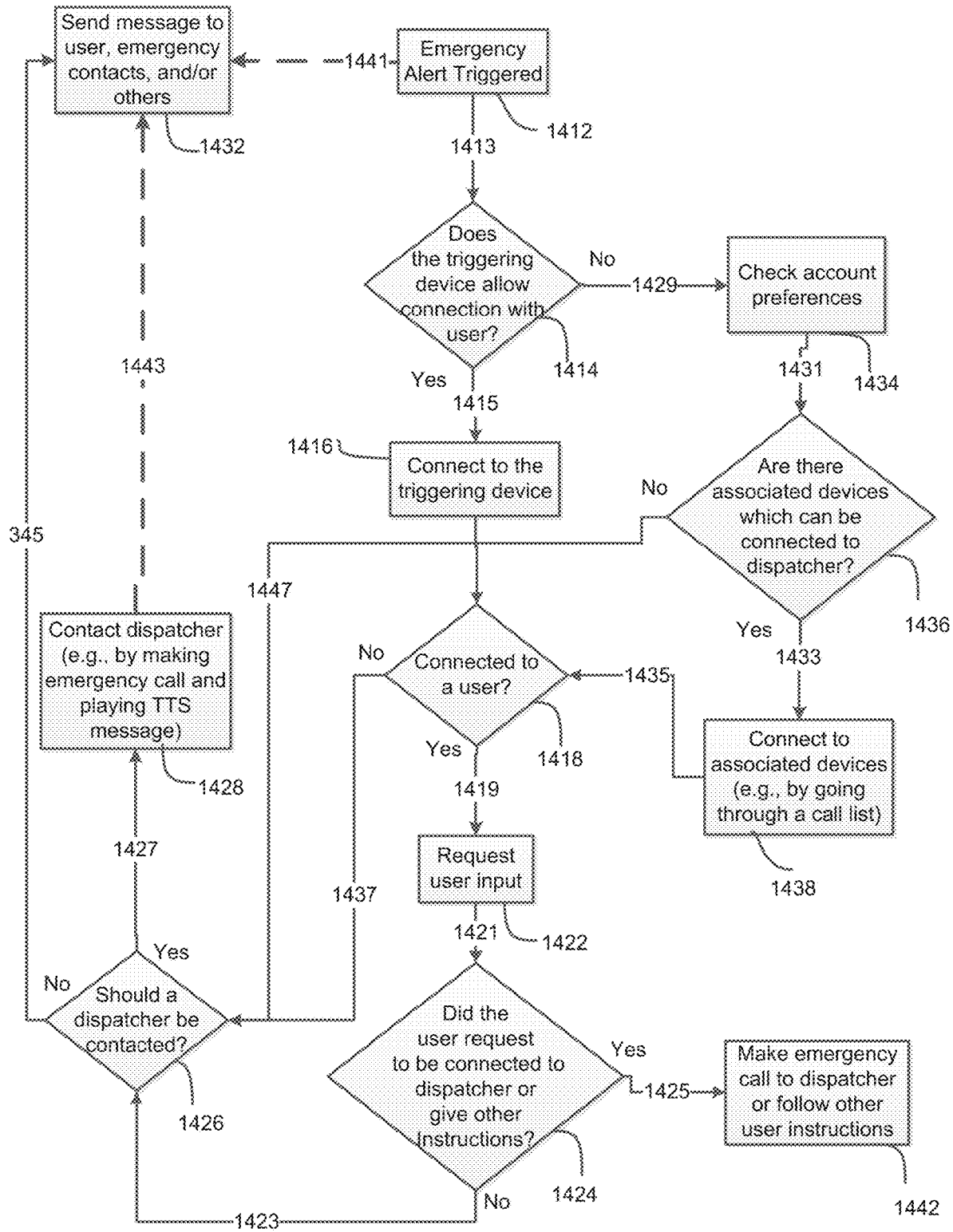
FIG. 14 illustrates an exemplary method for an emergency management system to communicate with dispatchers for assistance after an emergency alert has been triggered.
Figure 15:
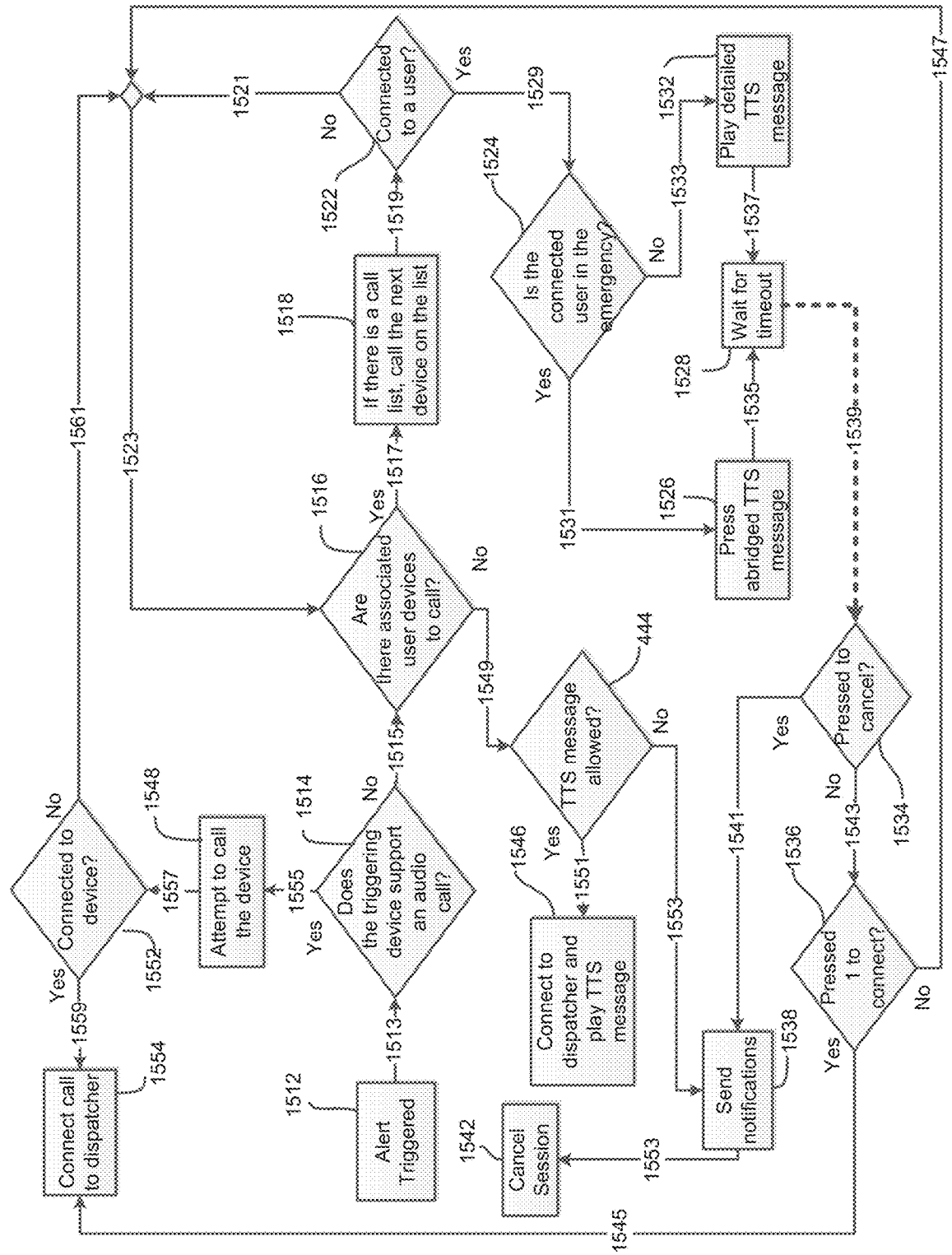
FIG. 15 illustrates an exemplary method for an emergency management system to call dispatchers for assistance after an emergency has been triggered.

In some embodiments, a direct connection 238 between device 216 and dispatcher 250 is established or the user 205 is connected via the EFMS 240 via links 222 and 226. However, the EFMS 240 may send the alert to any number of recipients, separately or simultaneously, in any order (e.g. according to any emergency flow). Exemplary flows are depicted in FIGS. 14 and 15.

Wearable Device Communicatively Connected to a Communication Device

In another exemplary configuration of an emergency flow, a mobile device (e.g. a wearable 267) is communicatively connected to a communication device (e.g. a mobile phone 206, not shown) via Bluetooth®, Wi-Fi, or other wireless communication methods. In some embodiments, the communication device 206 provides location and/or communication capabilities (e.g. whether the device is SMS, email, and/or data enabled). In some embodiments, the mobile device is Internet-enabled & Location-enabled, allowing the user to send the emergency alert triggering an emergency flow in the EFMS 240. Subsequently, the wearable device 267 optionally participates in an emergency session with EDC 250 via the communication device 206 through an indirect connection.

In some emergency flows, the communication device 206 comprises an application 208, which may include some modules from emergency trigger program 269 on wearable 267. In some embodiments, the emergency trigger program 269 on wearable 267 is distributed between the two devices (wearable 267 & communication device 206). This provides an advantage in allowing the wearable device that is lightweight with limited functions to be used in combination with the information and capabilities of the communication device 206 for responding to an emergency. Various hardware and software capabilities of the wearable devices are contemplated.

In some scenarios, a user 202 configures emergency contacts (name, phone number), validates phone numbers, and enables the emergency flow from the communication device 206 while only sensor readings are obtained from the wearable 267 to trigger the emergency. In other embodiments, the application 208 receives an emergency alert from a device over Bluetooth. In some embodiments, the application 208 sends an emergency alert with a list of two contacts and emergency location (as reported by the phone) to the EFMS 240. The EFMS 240 may then execute an emergency flow comprising: first call contact and prompt contact to confirm emergency by pressing 1; if the call is not answered or confirmed, repeat with second contact; if someone answered and confirmed emergency, connect call to appropriate PSAP based on the provided location; and wherein each contact hears a descriptive TTS message upon answering the call.

Figure 3:
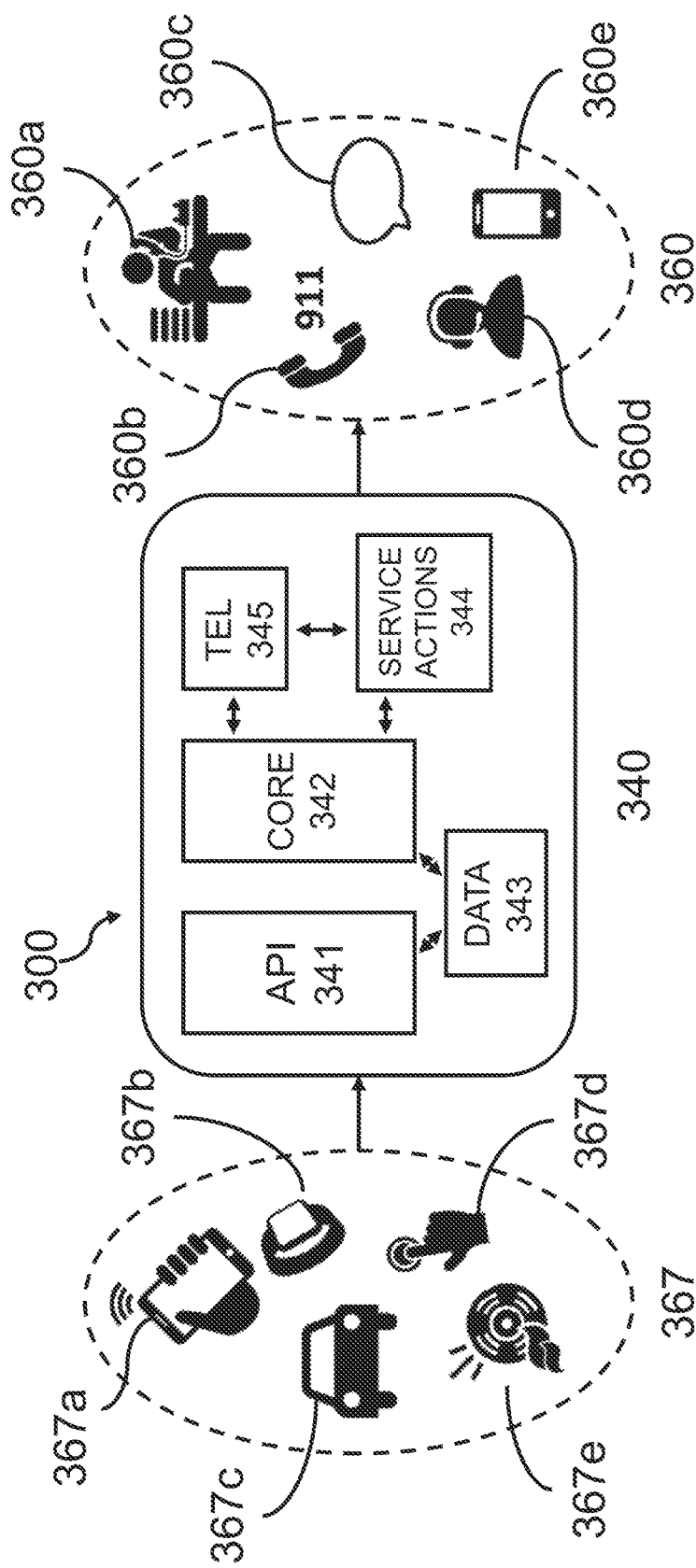
FIG. 3 depicts a second exemplary embodiment of a system for managing emergency flows.

FIG. 3 depicts an exemplary embodiment of a system 300 including triggering devices 367, an Emergency Flow Management System (EFMS) 340, & output services 360. As previously mentioned, one advantage provided by the systems, servers, devices, and methods described herein is the ability to facilitate emergency response communications across devices, services, and systems managed by different parties. As will be discussed in further detail, in some embodiments, the EFMS 340 is capable of being reconfigured and customized by any individual or organization (e.g. a smartphone application developer or a wearable device manufacturer) such that the EFMS 340 is seamlessly integrated into the devices, services, and/or systems provided by the individual or organization (hereinafter, "administrator") according to the individual or organization's specific needs.

Accordingly, as shown in this exemplary embodiment, the system 300 is implemented with a variety of triggering devices 367 and a variety of output services 360.

In some embodiments, a triggering device 367 is activated and delivers an emergency alert to the EFMS 340. In some embodiments, the triggering device 367 is an electronic device associated with a user, such as a smartphone 367*a* (e.g. an iPhone), a wearable device 367*b* (e.g. an Apple Watch or FitBit tracker), or a smart home IoT device 367*e* (e.g. an Amazon Echo or a Nest smoke and carbon monoxide alarm). In some embodiments, the triggering device is a vehicle 367*c* such as a car or truck. In one example of this embodiment, the vehicle 367*c* includes an intelligent vehicle system capable of detecting when a component of the vehicle 367*c* has failed or when the vehicle 367*c* has been in an accident or otherwise compromised. In another example of this embodiment, the vehicle 367*c* includes or is otherwise communicatively coupled to a vehicle safety service that can connect the passengers of a vehicle that has been compromised with a first responder or a customer service agent (e.g. OnStar or AAA). In this example, when the vehicle 367*c* becomes compromised, the intelligent vehicle system can deliver an emergency alert to the vehicle safety service, which may in turn attempt to contact passengers of the vehicle 367*c* or send a corresponding emergency alert to another recipient (e.g. to the EFMS 340). In some embodiments, the triggering device comprises a software or hardware panic button 367*d*. As an example, the triggering device 367 is a physical button installed under the steering wheel of a taxi cab, so that a taxi driver who feels threatened by a passenger (e.g. a passenger with a weapon or a passenger who is being verbally abusive) may discreetly call for help. Similarly, in another example, the triggering device 367 is a digital button found in a graphical user interface of a ride sharing smartphone application (e.g. the Uber app) that a passenger may select to discreetly call for help if the passenger feels threatened by a driver of a ride sharing vehicle.

In some embodiments, the triggering device 367 is triggered via user input or automatic detection. For example, in embodiments in which the triggering device is a wearable device 367*b* (e.g. an Apple Watch), the wearable device 367*b* comprises at least one sensor such as a gyroscope, an accelerometer, and/or a heart rate monitor. In this example, if the heart rate monitor detects that the heartrate of the user is abnormal (e.g. higher or lower than average for the user, or arrhythmic), and the gyroscope and/or accelerometer detect a sudden, downward motion of the wearable device 367*b* (e.g. acceleration exceeds a threshold), the wearable device 367*b* determines that the user has potentially fallen due to a cardiac emergency and may need assistance. In response to such a determination, the wearable device 367*b* automatically delivers an emergency alert to the EFMS 340 without input from the user. Alternatively, in some embodiments, if a user of a wearable device 367*b* feels that they are experiencing or soon to experience a medical emergency, the user optionally selects a button on the wearable device 367*b* to manually deliver an emergency alert to the EFMS 340. Similarly, in some embodiments, a user of a smartphone 367*a* or wearable device 367*b* who is under assault or feels they will soon be under assault is able to select a button on the smartphone 367*a* or wearable device 367*b* to manually deliver an emergency alert to the EFMS 340. In some embodiments, the emergency alert is delivered to the EFMS by an electronic device communicatively coupled to the triggering device. For example, in some embodiments, a wearable device coupled to a cell phone via Bluetooth generates an emergency alert that is then delivered to the EFMS by the cell phone via Wi-Fi or cellular data.

In another example, in an embodiment in which the triggering device 367 is a smart home device 367*e*, the smart home device optionally includes at least one sensor such as a smoke detector or carbon monoxide detector. In this example, when the smart home device 367*e* detects a concentration of carbon monoxide that exceeds a threshold concentration, the smart home device 367*e* determines that the user and or house of the user is in a state of emergency, and automatically deliver an emergency alert to the EFMS 340. In another example, when a user is experiencing an emergency, the user optionally manually prompts the smart home device 367*e* to deliver an emergency alert to the EFMS 340 by pressing a button on the smart home device 367*e* or by interacting with the smart home device 367*e* non-physically, such as by verbally communicating with the smart home device 367*e* (e.g. by saying aloud, "[name of smart home device 367*e*], call 9-1-1"). In another example of this embodiment, the smart home device 367*b* includes a video camera or optical sensor. When the video camera (and accompanying software and/or processor) or optical sensor determines the presence of an unauthorized person inside or otherwise proximal to the house of the user, in some embodiments, the smart home device 367*e* automatically delivers an emergency alert to the EFMS 340. Alternatively, the triggering device 367 is a non-optical device or application and is activated manually or automatically in any fashion.

In some embodiments, the EFMS 340 is configured to receive an emergency alert from a triggering device 367 and execute an emergency flow, as will be discussed in further detail. In some embodiments, as depicted in FIG. 3, the EFMS 340 includes an API module 341, a core module 342, a data module 343, a service actions module 344, and a telephony module 345. In some embodiments, these modules interact to execute customized emergency flows according to various configurations of emergency flow building blocks, wherein the emergency flow building blocks each represent an emergency flow script that performs at least one function. In some embodiments, the various configurations of emergency flow building blocks are labeled and identified with unique emergency flow identification numbers (hereinafter, "emergency flow ID"). In some embodiments, an emergency alert delivered to the EFMS 340 from a triggering device 367 is accompanied by an emergency flow ID, which is recognized by the API module 341 to point to an associated emergency flow for execution by the EFMS 340.

In some embodiments, the EFMS 340 is configured to receive an emergency alert delivered from a triggering device 367 at the API module 341. In some embodiments, the emergency alert delivered from the triggering device 367 includes an emergency flow ID. In some embodiments, the emergency alert delivered from the triggering device 367 includes additional data. For example, in some embodiments, the emergency alert delivered from the triggering device 367 includes location data, such as a longitude and latitude coordinate pair, or a street address. In some embodiments, the location data includes information obtained from one or more sources such as, for example, a location component (such as a GPS, not shown), Wi-Fi access points information using a Wi-Fi antenna (not shown), Bluetooth beacon data using a Bluetooth antenna (not shown), cellular trilateration using a cellular transmitter capable of supporting various technologies such as CDMA, LTE, or WiMAX, and barometric pressure using a pressure sensor to estimate altitude. In some embodiments, the emergency alert delivered from the triggering device 367 includes user data associated with a user of the triggering device 367. For example, the emergency alert delivered from the triggering device 367 is optionally accompanied by medical history data associated with a user that the user has stored on a smartphone 367a. In another example, the emergency alert delivered from the triggering device 367 is accompanied by heart rate data obtained by a wearable device 367b before or during the time that the emergency alert was delivered. In another example, the emergency alert delivered by the triggering device 367 is accompanied by driving data determined by an intelligent vehicle system integrated into a vehicle 367c, such as the speed at which the vehicle was moving before or during the time that the emergency alert was delivered.

In some embodiments, the API module 341 processes the emergency alert and accompanying data (e.g. emergency flow ID, location data, and user data) and activates the core module 342. In some embodiments, the API module 341 determines which emergency flow for the EFMS 340 to execute based on an emergency flow ID included with the emergency alert delivered from the triggering device 367. In some embodiments, the API module 341 determines which emergency flow for the EFMS 340 to execute based on an emergency flow ID (also referred to as an emergency call flow identifier) and additional data included with the emergency alert. For example, in some embodiments, an emergency flow ID corresponds to multiple emergency flows (e.g. emergency flow A, emergency flow B, emergency flow C, etc.) which are optionally executed preferentially based on the assessed situation of a user. In one example of this embodiment, an emergency alert is delivered to the EFMS 340 from a wearable device 367b. In this example, the emergency alert includes emergency flow ID #123 and additional data gathered by a heart rate monitor, a gyroscope, and an accelerometer. In this example, emergency flow ID #123 corresponds to two emergency flows, emergency flow A, which includes contacting a nurse and calling 9-1-1, and emergency flow B, which includes contacting a nurse but does not include calling 9-1-1. When the additional data included in the emergency alert indicates that a user of the wearable device has merely fallen, the API module 341 optionally executes emergency flow B. However, if the additional data included in the emergency alert indicates that the user has fallen due to a cardiac emergency, the API module 341 optionally executes emergency flow A instead. In some embodiments, emergency flow A and emergency flow B are considered and/or referred to as complete definitions of an emergency flow (e.g. emergency flow ID #123 represents a template of an emergency flow that requires one or more additional inputs to complete the definition of the emergency flow; emergency flow A and emergency flow B represent complete definitions of the emergency flow corresponding to emergency flow ID #123). In some embodiments, a particular emergency flow ID only corresponds to one particular emergency flow. In some embodiments, the triggering device 367 selects between multiple emergency flow IDs based on data collected by the triggering device 367 or provided by a user. In some other embodiments, in which an emergency alert does not include an emergency flow ID, the API module 341 selects an emergency flow to execute based on alternative factors, such as the type or brand of triggering device 367, a location of the triggering device, a weather forecast at the location of the triggering device 367, or other parameters. In some embodiments, the flow identifier is a flow identification number included in the emergency alert. In some embodiments, the flow identifier is included in the header, footer, message, metadata, or a combination thereof in the emergency alert. In some embodiments, the flow identifier is not a flow identification number and takes another form (e.g. device type, device name, application name, application publisher, etc.). In some embodiments, an emergency alert includes an emergency flow ID and/or an identifier of the organization (hereinafter "organization ID" or "organization identifier") that created the associated emergency flow. For example, in some embodiments, the emergency alert is an HTTP POST that includes an emergency flow ID in the payload of the HTTP POST and an administer ID associated with the organization that created the associated emergency flow in the header of the HTTP POST, as shown below. In some embodiments, after receiving an emergency alert, the API module 341 first identifies an organization using an organization ID included in the emergency alert and then references the emergency flow database (e.g. data module 343) to determine one or more emergency flows created by the organization. In some embodiments, the API module 341 then uses an emergency flow ID included in the emergency alert to select a corresponding emergency flow from the one or more emergency flows created by the organization to execute. In some embodiments, the emergency flow ID is a name of the corresponding emergency flow selected by the organization that created the emergency flow. In some embodiments, the API module 341 selects an emergency flow in response to an emergency alert from a triggering device 367 through any appropriate means regardless of the form of the flow identifier. In some embodiments, the emergency alert does not include a flow identifier. In some embodiments, the API module 341 selects a default emergency flow in response to an emergency alert that includes no additional data (e.g. no flow identifier, device location, sensor data, etc).

An exemplary template of an emergency alert is shown below in the form of an HTTP POST:

```
url = "https://api-sandbox.rapidsos.com/v1/rem/trigger"
payload = [
        "callflow": "company_contacts",
        "variables": [
            "location": [
                "latitude": "",
                "longitude": "",
                "uncertainty": ""
            ],
            "user": [
                "full_name": "",
                "phone_number": ""
            ],
            "contacts": [
                [
                    "full_name": "",
                    "phone_number": ""                    ]
        ],
            "company": ""
        ]
```

In the foregoing exemplary template of an emergency alert, "company_contacts" is both the emergency flow ID and the name of the associated emergency flow as selected or inputted by the administrator that created the emergency flow. In this example, "location"; "user"; "contacts"; and "company" are variables required by the "company_contacts" emergency call flow. "Latitude"; "longitude"; and "uncertainty" are components of the "location" variable; "full_name"; and "phone_number" are components of the "user" variable; and "full_name" and "phone_number" are components of the "contacts" variable. In some embodiments, a value is provided in the emergency alert for each of the variables or components of a variable. In some embodiments, as described above, all variables, and components therein, defined or required by an emergency call flow are necessary for the emergency call flow to be executed by the API module 341.

In some embodiments, emergency flows are stored within a data module 343 located within or otherwise communicatively coupled to the EFMS 340. In some embodiments, the API module 341 consults the data module to determine an emergency flow to execute in response to the emergency alert. For example, in some embodiments, the emergency alert includes an emergency flow ID that corresponds to one or more emergency flows stored within the data module 343. The API module 341 then optionally references the data module 343 for an emergency flow corresponding to the emergency flow ID. In some embodiments, after receiving an emergency alert including an emergency flow ID and any accompanying additional data, the API module 341 references the data module 343 to find an emergency flow corresponding to the emergency flow ID. In some embodiments, the API module 341 then processes the emergency flow, determines any necessary inputs for the emergency flow, and verifies that the additional information included in the emergency alert includes the necessary inputs for the emergency flow. For example, a particular emergency flow may additionally require a measurement of a user's heart rate as a necessary input for the emergency flow. In this example, if the emergency alert does not include a user's heart rate (e.g. the emergency alert includes an emergency flow ID corresponding to the particular emergency flow and a location, but is missing a user's heart rate), the EFMS 340 may not be able to execute the particular emergency flow. In response, the EFMS 340 optionally declines the emergency alert or delivers a notification to the triggering device 367 informing the user that the emergency alert was incomplete. In this embodiment, when the API module 341 determines that the emergency alert does include the necessary inputs for the emergency flow, the API module 341 compiles the necessary inputs received from the emergency alert with the emergency flow to create a complete definition of the emergency flow (as discussed above), and delivers the complete definition of the emergency flow to the core module 342.

In some embodiments, the data module 343 additionally includes an emergency flow history database that records individual instances of particular emergency flow sessions. For example, in some embodiments, after the API module 341 receives an emergency alert including an emergency flow ID and activates the core module 342, the core module 342 records an entry in the emergency flow history database for the particular emergency flow session of the particular emergency flow being executed. In some embodiments, the core module 342 records an entry in the emergency flow history database for every emergency flow session. In some embodiments, the core module 342 records an entry in the emergency flow history database for each emergency alert received by the API module 341. In some embodiments, the core module 342 records an entry in the emergency flow history database for each emergency alert received by the API module 341 that includes an emergency flow ID. In some embodiments, the core module 342 records an entry in the emergency flow history database for a particular emergency flow session of a particular emergency flow after the particular emergency flow has been fully executed. In some embodiments, the core module 342 updates an entry in the emergency flow history database for a particular emergency flow session of a particular emergency flow after each step (e.g. after each individual emergency flow building block) of the execution of the particular emergency flow, or after some steps of the execution of the particular emergency flow.

In some embodiments, after an emergency flow is executed by the EFMS 340, the core module 342 updates an entry in the emergency flow history database for a particular emergency flow session of a particular emergency flow to include additional data about the particular emergency flow session. For example, in some embodiments, the core module 342 records in the emergency flow history database data including, but not limited to: which emergency contacts were contacted and/or which emergency contacts responded, if an EDC was contacted, if contacting an EDC was successful or unsuccessful, if a party opted to contact an EDC, or which party opted to contact an EDC. In some embodiments, after the execution of a particular emergency flow, the core module 342 updates an entry in the emergency flow history database for the particular emergency flow session of the particular emergency flow to reflect that the particular emergency flow session was successful or unsuccessful. In some embodiments, the criteria for success of a particular emergency flow are predetermined by the administrator that created the particular emergency flow. In some embodiments, the criteria for success of a particular emergency flow are predetermined by the EFMS 340.

The EFMS 340 is capable of executing many different permutations of emergency flows as disclosed herein. In some embodiments, emergency flows are defined by various emergency flow building blocks, each emergency flow building block defined by a script, written in a programming language, which contains instructions for executing various functions relating to an emergency flow. In some embodiments, the various functions are executed by the telephony module 345 and the service actions module 344, as depicted in FIG. 3.

In some embodiments, the EFMS 340 employs the service actions module 344 to execute various emergency flow building blocks that require transmitting data and communications to and from various users and output services 360 using various mediums and communication modes. For example, in some embodiments, an emergency flow includes an emergency flow building block with instructions for delivering a text message through short message service (SMS) or multimedia messaging service (MMS) or text message 360c to an account associated with a user, which is optionally executed by the service actions module 344. In another example, in some embodiments, an emergency call block requires the EFMS 340 to deliver a message to an account associated with a user through an internet enabled communication service 360e (e.g. WhatsApp, Slack, or Facebook Messenger) via an API call or HTTP post, which is optionally executed by the service actions module 344. In some embodiments, associated contacts are also contacted by a voice call (PSTN or data or VoIP call). In some embodiments, associated contacts are called and a TTS message is played. In yet another example, in some embodiments, an emergency flow includes an emergency flow building block with instructions for delivering an audio adaptation of a text message (e.g. text-to-speech message) to an account associated with a user, which is optionally executed by the service action module 344. In yet another example, an emergency flow may include an emergency flow building block with instructions for querying a triggering device 367 or an electronic device associated with a user for a location associated with a user, which is optionally executed by the service actions module 344.

In some embodiments, the service actions module 344 includes a location service (e.g. a location API) that can be employed by the API module 341 to send or retrieve locations to and from a location database. In some embodiments, the location database is external to the EFMS. For example, in some embodiments, an emergency alert includes a location (e.g. a location generated by the triggering device or an electronic device associated with the triggering device). After receiving the emergency alert, the API module 341 can employ the location service to transmit the location included in the emergency alert to an external location database. In some embodiments, the service actions module 344 includes a voice command service that the API module 341 can employ during emergency flows to receive oral input from users. For example, in some embodiments, an emergency flow building block, such as an interactive call block, as described below, may accept voice inputs using the voice command service.

In some embodiments, the telephony module 345 is constructed using hardware components such as voice over internet protocol (VoIP) gateways and open source communication software. In some embodiments, the EFMS 340 employs the telephony module 345 to execute various emergency flow building blocks requiring communication links. For example, in some embodiments, an emergency flow includes a building block with instructions for delivering an interactive phone call to a user (e.g. an automated phone call that accepts inputs from the recipient of the call). In some embodiments, while executing the emergency flow, the core module 342 employs the telephony module 345 to execute the interactive call. In another example, in some embodiments, an emergency flow includes a building block with instructions for delivering a call to an output service 360 (e.g. an emergency dispatch center 360a, specifically a 911 call center or PSAP 360b, or a customer service representative 360d), which is optionally executed by the telephony module 345.

Figure 4:
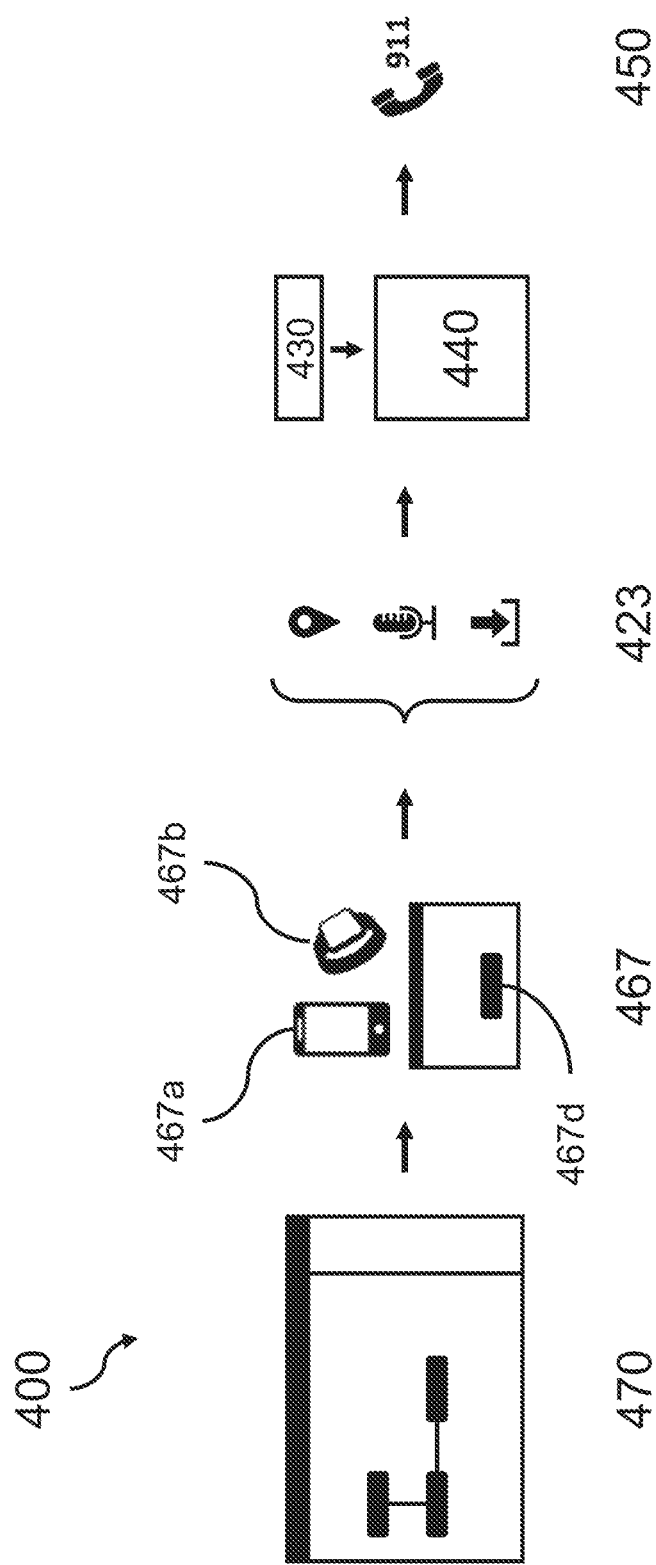
FIG. 4 depicts a first exemplary embodiment of a system for developing and deploying emergency flows.

FIG. 4 depicts an exemplary embodiment of a system 400 including an emergency flow editor user interface 470 (hereinafter, "emergency flow editor"), triggering devices 467, an emergency alert 423, the EFMS 440, the EMS 430, and an output service 450. In some embodiments of the system 400, an administrator accesses the emergency flow editor 470 and uses the emergency flow editor user interface to configure an emergency flow. The emergency flow editor 470 then optionally stores the emergency flow in an emergency flow database (e.g. the data module 343 depicted in FIG. 3) and assigns the emergency flow an emergency flow ID. In some embodiments, the administrator then installs a program, application, or script (e.g. an API) into a triggering device 467 configured to deliver data pertaining to the emergency via pipeline 423. In some embodiments, the data is transmitted within the emergency alert including the emergency flow ID. In some embodiments, the data is transmitted before or after the emergency alert is sent via the pipeline 423 to the EFMS 440, which functions in conjunction with the EMS 430 to execute the emergency flow. In some embodiments, the emergency alert 425 (not shown) includes additional data, such as a location associated with a user, health data associated with a user, or a list of accounts associated with a user. In some embodiments, the execution of the emergency flow includes initiating communications with an output service 450, such as an EDC or PSAP.

In some embodiments, the data pertaining to the emergency is transmitted to the EDC 450 via a pipeline 424 (not marked). The data is transmitted as a part of an emergency alert or afterwards. In some embodiments, the data is provisioned in the EFMS 440, EMS 430 or a third-party server and sent to the EDC 450 in response to a query from the EDC 450.

The data transmitted through pipelines 423, 424 is optionally encrypted and sent through secure pathways to authorized recipients. Pipelines 423, 424 are contemplated to deliver location, voice, and additional data (e.g. user data, images, video feed) from device 467 to the EDC 450 in a secure and compatible format.

In one exemplary implementation of this embodiment, the administrator is a company that produces a smartwatch. The company optionally uses the emergency flow editor 470 to create an emergency flow that activates when a wearer of the smartwatch (e.g. the triggering device 467) presses a button on the smartwatch that indicates (e.g. delivers an emergency alert 425 to the EFMS 440) that the wearer is in a state of distress (e.g. the wearer of the smartwatch has fallen and is incapable of picking themselves up). When activated, the emergency flow is configured by the company to instruct the EFMS 440 to deliver an interactive call to the smartwatch (if the smartwatch is capable of receiving calls) or to a phone associated with the wearer in which the interactive call asks the wearer if they are in need of emergency assistance. The interactive call then optionally waits for a predetermined duration of time (e.g. 20 seconds) for an input from the wearer of the smartwatch (e.g. the interactive call may present the wearer with two options: press 1 for yes or * for no). If the wearer selects 1, or the predetermined duration of time expires before the wearer submits an input, the EFMS 440 then initiates a call with an EDC, and connects the wearer with the EDC 450 once the EDC has accepted the call. If the wearer selects *, the EFMS 440 terminates the emergency response flow.

In another exemplary implementation of this embodiment, the administrator is a company that provides a vehicle safety service (e.g. OnStar or AAA). In this example, the company uses the emergency flow editor 470 to create an emergency flow that is automatically activated when an intelligent vehicular system (integrated with the vehicle safety service) within a vehicle detects that the vehicle has been compromised (e.g. when the vehicle has been in an accident). In this example, when the intelligent vehicular system detects that the vehicle has been compromised, the vehicle (e.g. the triggering device 467) delivers an emergency alert 425 to the EFMS 440, which executes the emergency flow. In this example, when executed, the emergency flow is configured by the company to instruct the EFMS 440 to call a customer service provider 450 (e.g. a AAA representative), call the vehicle, and bridge the calls between the vehicle and the customer service provider 450. The emergency flow also optionally provides the customer service provider 450 with an option to initiate a call with an EDC 450 (e.g. call a PSAP).

Figure 5:
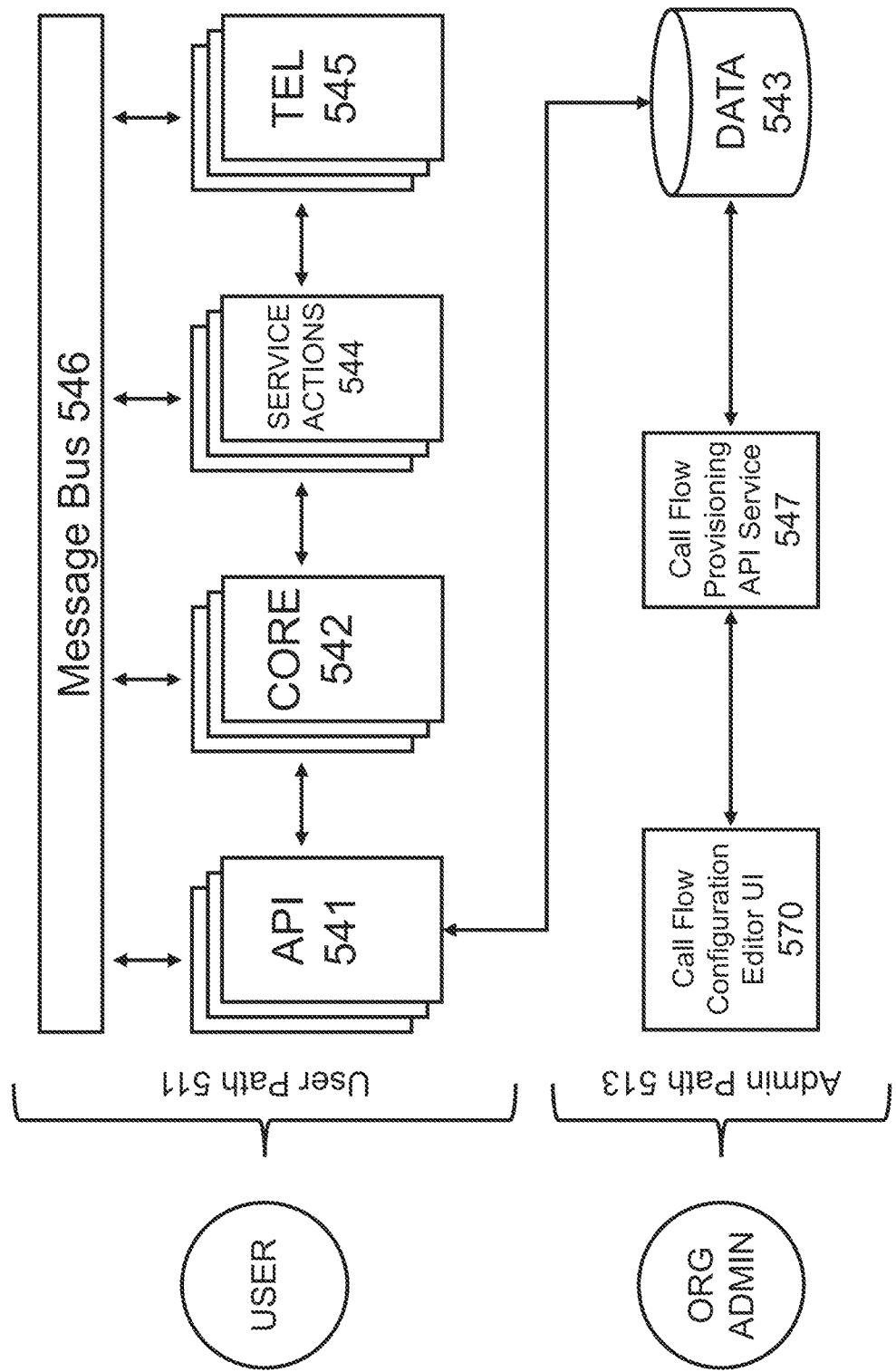
FIG. 5 depicts a second exemplary embodiment of a system for developing and deploying emergency flows.

FIG. 5 depicts an exemplary embodiment of a system 500 for the creation and implementation of an emergency flow. As depicted in FIG. 5, in some embodiments, the system 500 contains two pathways: an administrator pathway 513 (admin path) and a user pathway 511 (user path). The admin path 513 is initiated by an administrator. In the admin path, the administrator accesses an emergency flow editor 570 to configure an emergency flow to fit the needs of the administrator's product or service, such as the smartwatch or vehicle described in the examples provided above with respect to FIG. 4. In some embodiments, in the admin path, an emergency flow provisioning API service 547 compiles the emergency flow, assigns an emergency flow ID to the emergency flow, and stores the emergency flow within a data module 543. The user path 511 is initiated by a user 500, or a device associated with a user, of the product or service provided by the administrator, such as the vehicle or the wearer of the smartwatch described in the examples provided above with respect to FIG. 4. In some embodiments, in the user path, the API module 541 receives an emergency alert including an emergency flow ID from a triggering device. In some embodiments, the API module 541 then references the emergency flow ID with the data module 543 to find the emergency flow corresponding to the emergency flow ID and delivers the emergency flow to the core module 542 for execution. In some embodiments, the core module 542 employs the service actions module 544 and the telephony module 545 to execute various blocks of the emergency flow. In some embodiments, the API module 541, the core module 542, the service actions module 544, and the telephony module 545 are separately and simultaneously in communication with the message bus 546, which facilitates and coordinates synchronous and asynchronous communications (e.g. a communication bridge, text messages, etc.) between the modules and various users and accounts (e.g. a user, emergency contacts, emergency responders, etc.).

The Emergency Console

Figure 6:
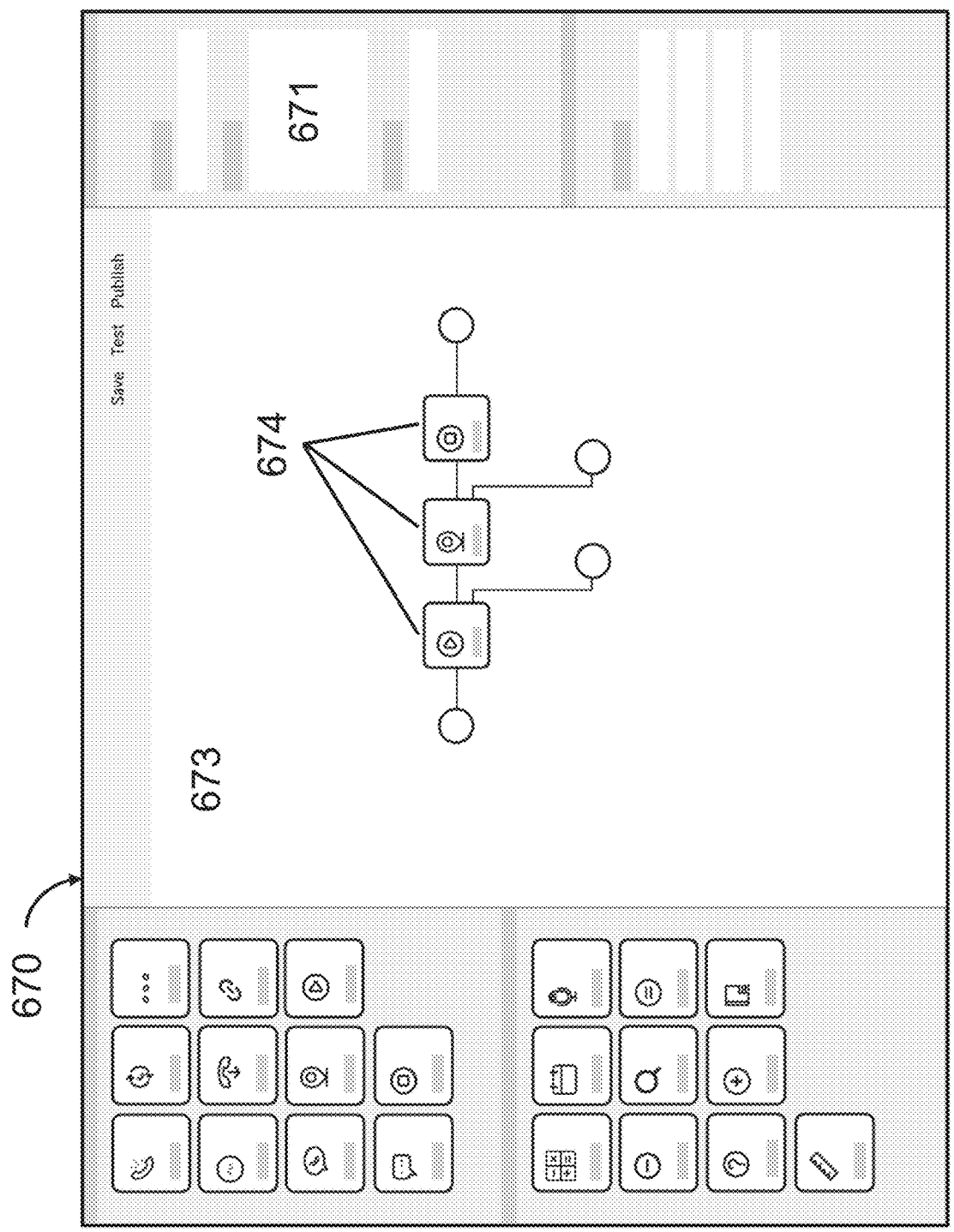
FIG. 6 shows a screenshot of an exemplary embodiment of an application or application interface for developing and deploying emergency flows.

FIG. 6 depicts an exemplary view of an emergency flow configuration editor 670 (also referred to as the Emergency Console). In some embodiments, the emergency flow editor 670 is used to configure customized emergency flows. In some embodiments, the emergency flow editor 670 includes a programming language input field 671 in which users manually program an emergency flow by inputting written programming commands to create a script 672 (not shown) that defines the emergency flow. In some embodiments, the emergency flow editor additionally or alternatively includes a graphical user interface 673 (also referred to as an "interactive space") which users use to configure emergency flows by dragging and dropping (or otherwise manipulating) graphical representations of emergency flow building blocks 674 into various arrangements. In some embodiments, an emergency flow building block is defined by a short script (e.g. a compilation or block of written programming commands), written in a programming language, that contains instructions for executing various functions (also referred to as emergency response functions) relating to an emergency flow. A single emergency flow building block generally contains instructions relating to one emergency flow function, as will be described in greater detail, and does not represent an entire emergency flow. In some embodiments, an arrangement of emergency flow building blocks in the graphical user interface 673 automatically results in the creation of a script 672, which is optionally displayed in the programming language input field 671. In some embodiments, an emergency flow building block receives at least one input, performs at least one emergency response function based upon the at least one input, and generates at least one output. In some embodiments, at least one input for an emergency flow building block comprises an output received from another emergency flow building block. In some embodiments, adjacent emergency flow building blocks in an emergency flow script are connected such that an output of a preceding emergency flow building block forms an input for at least one succeeding emergency flow building block. In some embodiments, the emergency flow editor 670 includes either the programming language input field 671 or the graphical user interface 673, but not both. In some embodiments, the emergency flow editor includes both the programming language input field 671 and the graphical user interface 673. In some embodiments, the emergency flow editor 673 includes options or buttons to save, test, and publish an emergency flow.

In some embodiments, the Emergency Console allows a variety of customizable emergency flows between users, emergency contacts, emergency services, and related third parties by establishing a multitude of voice and data connections to Public Safety Answering Points (PSAPs) through a variety of trigger mechanisms. In some embodiments, the trigger mechanisms enable implementation in a variety of scenarios including software panic buttons (e.g. within mobile applications), remote activation by associated emergency contacts, and others. The Emergency Console allows for the customization and generation of emergency flows while ensuring that the generated emergency flows comply with regulatory constraints (Federal, State or local laws, regulations, policies, best practices, etc.) applicable to the location and type of emergency. In some embodiments, the Emergency Console is a part of the EMS. In some embodiments, the Emergency Console is part of an EDC such as a PSAP. In some embodiments, the Emergency Console is operated on an emergency response server. In some embodiments, the EMS comprises an emergency response server. In some embodiments, the Emergency Console is a web interface that provides tools for generating and testing emergency flows. In some embodiments, the Emergency Console allows for emergency flows to be initiated via simple API triggers from any device.

Emergency Flow Building Blocks

In some embodiments, the emergency flow editor 670 (e.g. the Emergency Console) contains a set of predefined emergency flow building blocks. Below is a non-exhaustive list of exemplary emergency flow building blocks that are optionally included in the set of predefined emergency flow building blocks and that may be incorporated into a customized emergency flow.

(a) Create Emergency Bridge Block:

In some embodiments, the create emergency bridge block instructs the EFMS to create a communication bridge in which one or more calls are dynamically added or removed. The communication bridge serves as a hub for various calls that are made during the execution of an emergency flow. In some embodiments, the create emergency bridge block takes no inputs and produces no outputs. In some embodiments, the create emergency bridge block is a core component included in every emergency flow. In some embodiments, the create emergency bridge block is an implied emergency flow building block (e.g. the script defining the create emergency bridge block is included in every emergency flow but the create emergency bridge block is not depicted in the graphical user interface 673).

(b) Call User Block:

In some embodiments, the call user block instructs the EFMS to initiate a phone call to a phone number associated with the user associated with the triggering device and connect the phone call with a communication bridge. The input for the call user block is the phone number associated with the user. The outputs of the call user block are: (i) the user answered the phone call or (ii) the user did not answer the phone call.

(c) Play Pre-Recorded Message Block:

In some embodiments, the play pre-recorded message block instructs the EFMS to play a pre-recorded audio file to one or more parties currently connected to a communication bridge. The input for the play pre-recorded message block is the name or file location of the pre-recorded audio file. The play pre-recorded message block has no output.

(d) Play TTS Message Block:

In some embodiments, the play TTS (text-to-speech) message block instructs the EFMS to play an audio file adaptation of a text file to one or more parties currently connected to a communication bridge. The input for the play TTS message block is the text of the message to be converted to audio. The play TTS message block has no output.

(e) Send SMS Message Block:

In some embodiments, the send SMS message block instructs the EFMS to deliver a SMS message to a user or a group of users. In some embodiments, the SMS message includes information pertaining to status of the emergency flow session. The inputs for the send SMS message block are the contents of the text message to be sent and the phone number(s) of the intended recipients of the text message. The send SMS message block has no output.

(f) Timeout Block:

The timeout block instructs the EFMS to add a timeout instruction for a desired event. For example, in some embodiments, an administrator can add a timeout instruction to another emergency flow building block, such as the call user block, and specify an amount of time that the emergency flow should wait at the call user block before autonomously determining a negative outcome (e.g. in the case of the call user block, the user did not answer). The input for the timeout block is the amount of time (e.g. 1-30 seconds). The output of the timeout is a confirmed negative outcome.

(g) Location Block:

In some embodiments, the location block instructs the EFMS to query or detect a location of a user. In some embodiments, the location block instructs the EFMS to parse a location database for a location. In some embodiments, the location block instructs the EFMS to communicate with a triggering device to determine the location of the triggering device. The input for the location block is an account associated with a user (e.g. a phone number of the user). The output of the location block is a location of the user.

(h) API/HTTP Request Block:

In some embodiments, the API/HTTP request block instructs the EFMS to execute an API or HTTP post to an internet-based service to provide status, alerts, and notifications regarding the current emergency. The API or HTTP post may be provided by the user or included in the Emergency Console. In some embodiments, the inputs for the API/HTTP request block are a URL and any necessary parameters (named parameters included in HTTP post). In some embodiments, the outputs of the API/HTTP request block are (i) success or (ii) failure.

(i) Find Next Available Contact Block:

In some embodiments, the find next available contact block instructs the EFMS to loop through a list of contacts (e.g. accounts associated with a user or emergency contacts), call each one-by-one in sequence, play an audio message to them and wait for confirmation to determine whether to call the next contact. In some embodiments, a contact can confirm readiness to speak to an EDC or emergency dispatch center by responding to the audio message (e.g. by pressing 1). In some embodiments, the call of the find next available contact block is an interactive call (as discussed below). In some embodiments, the input for the find next available contact block is a list of contacts, the list of contacts including phone numbers and names. In some embodiments, the outputs of the find next available contact block are (i) contact answers the call, (ii) contact does not answer the call, and/or (iii) there are no available contacts (also referred to as an NAC response).

(j) Interactive Call/IVR Block:

In some embodiments, the interactive call/IVR (interactive voice response) block instructs the EFMS to call a phone number (e.g. an account associated with a user) and play an audio message to the recipient of the call and wait for a dial tone response (e.g. an interactive call) to determine whether the recipient of the call confirms readiness to speak to an EDC or emergency dispatch center. In some embodiments, the interactive call presents the recipient with a plurality of options to choose from (e.g. press 1 to dial 9-1-1, press 2 to call an emergency contact, press * to hang up). In some embodiments, the inputs for the interactive call/IVR block are a name and associated phone number of the intended recipient of the call and an audio message to play to the recipient. In some embodiments, the inputs for the interactive call include a plurality of options for the recipient to choose from. In some embodiments, the outputs of the interactive call/IVR block are (i) a dial tone response from the recipient (ii) the call was answered or (iii) the call was unanswered.

(k) Connect to Customer Call/Operations Center Block:

In some embodiments, the connect to customer/operations center block instructs the EFMS to initiate a call with an operations center associated with the administrator. The input for the connect to customer call/operations center is a phone number of the customer call/operations center. In some embodiments, the outputs of the connect to customer call/operations center are (i) successful connection to customer call/operations center or (ii) unsuccessful connection to customer call/operations center. In some embodiments, the call of the connect to customer call/operations center block is an interactive call (as described above).

(l) Connect to 9-1-1 Block:

In some embodiments, the connect to 9-1-1 block instructs the EFMS to call 9-1-1 (or another emergency response/dispatch center number), add the call to a communication bridge, and provide the EDC with a location and name of a user. The inputs for the connect to 9-1-1 block are the location of the user and the name and phone number of the user. The outputs of the connect to 9-1-1 block are (i) successful connection to 9-1-1 or (ii) unsuccessful connection to 9-1-1.

(m) Add $3^{rd}$ Party Block:

In some embodiments, the add $3^{rd}$ party block instructs the EFMS to initiate a call with an additional party (e.g. an emergency contact, customer service, a suicide hotline, etc.) and add the call with the additional party to a communication bridge. The inputs for the add $3^{rd}$ party block are a name and number of a $3^{rd}$ party. The outputs of the add $3^{rd}$ party block are (i) successful connection to $3^{rd}$ party or (ii) unsuccessful connection to $3^{rd}$ party.

(n) Failsafe Block:

In some embodiments, the failsafe block instructs the EFMS to detect a failure within an emergency flow and deliver a message to a user notifying the user that the emergency flow has failed. In some embodiments, the failsafe block further instructs the API to prompt the user to call 9-1-1. In some embodiments, the failsafe block is an implied emergency flow building block (e.g. the script defining the failsafe block is included in every emergency flow but the "create emergency bridge" block is not depicted in the graphical user interface 673). In some embodiments, the failsafe block is an implied additional or associated component of every emergency flow building block configured within an emergency flow. In general, the failsafe block functions to ensure that an emergency flow is at least as reliable as a traditional emergency call (e.g. calling 9-1-1 in the United States). In some embodiments, the input for the failsafe block is a failed outcome of a previous or associated emergency flow building block (e.g. the previous or associated emergency flow building block failed to execute its intended function). The failsafe block has no output.

In some embodiments, in addition to the emergency flow building blocks, the Emergency Console contains one or more utility building blocks. For example, in some embodiments, utility building blocks may perform computational or logistical functions, as opposed to emergency functions. For example, the utility building blocks may include a calculator building block configured to perform a mathematical equation on two inputs, a datetime building block configured to return the current day and time, an evaluate building configured to evaluate an expression (e.g. an algebraic expression), a compare building block configured to execute an if/then statement. In some embodiments, the utility building blocks may include increase and decrease building blocks configured to increase or decrease the value of a numerical variable, respectively.

The Emergency Console optionally contains any number of emergency flow building blocks defining any number of emergency response functions. In some embodiments, additional emergency response functions include, but are not limited to, at least one of the following: delivering a location of a user to an emergency dispatch center or database accessible by the emergency dispatch center, identifying an emergency dispatch center suitable for responding to an emergency alert based on location data associated with or received from an electronic device associated with a user, calling an emergency contact of a user for whom an emergency alert has been received, calling an associated device of the user, and obtaining sensor data from a network of sensors associated with the user or user's electronic device. In some embodiments, the Emergency Console allows administrators to edit the short script of an emergency flow building block to reprogram the building block to be more applicable to the needs of the administrator. For example, in some embodiments, the Emergency Console may contain a predefined call user block that takes a single phone number as an input. In this example, the Emergency Console optionally allows an administrator to edit the short script of the predefined call user block such that the edited call user block now takes a list of phone numbers as its input and dials each number in the list of phone numbers one-by-one in sequence until one of the numbers is successfully reached. In some embodiments, the Emergency Console allows administrators to configure any parameter of an emergency flow building block, including, but not limited to: the input, output, and emergency response function. In some embodiments, the Emergency Console allows administrators to design their own original emergency flow building blocks, such as by writing their own short script in the programming language input field 671. In some embodiments, the Emergency Console includes a shared (e.g. accessible to all administrators) library of administrator generated emergency flow building blocks.

Example Emergency Flows

In some embodiments, emergency flows are designed based on desired solutions. As an example, a simple flow is configured to initiate a direct connection between the caller and 9-1-1. In some embodiments, complex logical flows include multiple callers or call centers with tunable timing, with text-to-speech and interactive voice response (IVR) components, with SMS messaging, with rich data interchange, etc. The EFMS service is designed to be modular so that the various building blocks, such as the ones described above, can be assembled to construct an emergency flow that meets any particular emergency connectivity solution design. In some embodiments, an emergency flow may be considered as a logic tree (e.g. a series of if/then statements that progressively lead to various actions or decisions based on the outcome of the previous action or decision). The following emergency flows examples depict exemplary emergency flows constructed by an administrator within the Emergency Console.

Figure 7:
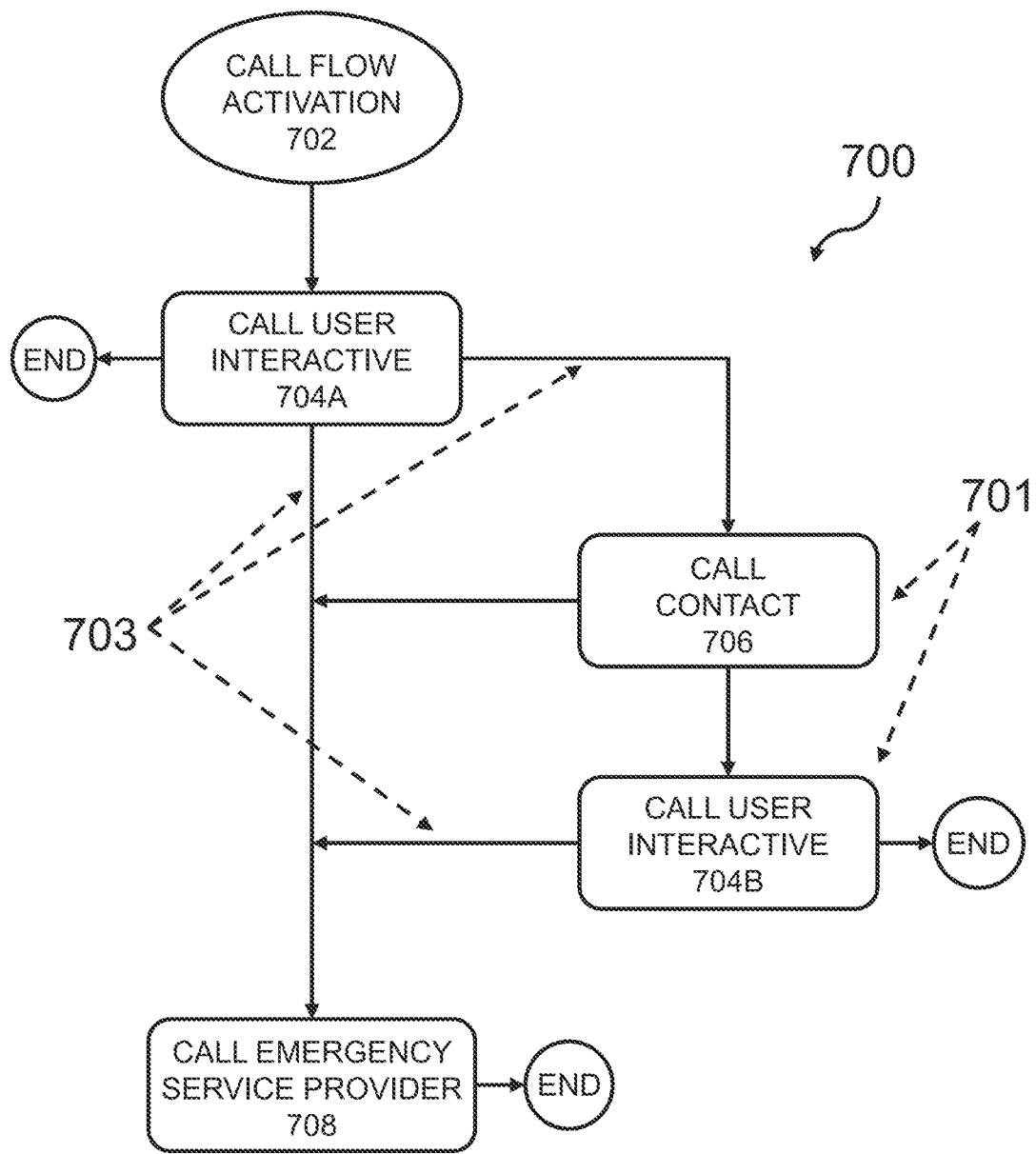
FIG. 7 illustrates a first exemplary embodiment of an emergency flow.

FIG. 7 depicts an exemplary configuration of an emergency flow 700. The emergency flow 700 may be designed for a user-triggered panic button (e.g. a soft button on a mobile application, for example). FIG. 7 depicts the emergency flow 700, as it may appear in the graphical user interface 673 in some embodiments of the Emergency Console, as a configuration of emergency flow building blocks 701 and various accompanying connectors 703. In some embodiments, connectors 703 are used to define the path or sequence of execution of the emergency flow building blocks 701. In some embodiments, emergency flow 700 begins with emergency flow activation block 702. The emergency flow activation block 702 can be triggered in various ways, such as by the EFMS 340 receiving an emergency alert including an emergency flow ID corresponding to emergency flow 700 from a triggering device 367 associated with a user at the API module 341; the API module 341 referencing the emergency flow ID with the data module 343, identifying emergency flow 700 as the emergency flow corresponding to the emergency flow ID, and delivering the emergency flow 700 to the core module 342 for execution; and the core module 342 executing the emergency flow 700. In some embodiments, the emergency flow activation 702 is an emergency flow building block. In some embodiments, the emergency flow activation 702 is an implied emergency flow building block. In some embodiments, the emergency flow activation 702 is functionally equivalent to a "create emergency bridge" block, as described above.

In some embodiments, the emergency flow 700 continues with call user interactive block 704a, an interactive call/IVR block that instructs the EFMS to deliver an interactive call (as described above) to a phone number associated with a user. The interactive call optionally plays an audio message to the user and prompts the user to select one of a plurality of options. In some embodiments, the plurality of options includes connect to an EDC (e.g. "press 1 for 9-1-1") or disconnect (e.g. press * to end this call). In some embodiments, the plurality of options additionally or alternatively includes an option to deliver a message to an emergency contact associated with the user (e.g. press 2 to alert an emergency contact). In some embodiments, the option to deliver a message to an emergency contact prompts the EFMS to deliver a text message (e.g. an SMS or MMS message) to an emergency contact. In some embodiments, the interactive call/IVR block additionally includes at least one default input parameter such as a timeout criterion (e.g. user does not provide a selection before the expiration of 30 seconds), an NA response (e.g. the phone call is not answered), or a hang up response (e.g. the user answers the call but hangs up).

After the call user interactive block 704a, in some embodiments, as depicted in FIG. 7, the emergency flow 700 proceeds in one or more directions, dependent upon the output of the call user interactive block 704a (e.g. the emergency flow building blocks shown in emergency flow 700 optionally form parallel emergency flow pathways for both calling the emergency responder 708 and messaging a contact 706). In some embodiments, when the output of the call user interactive block 704a is a user command or selection to connect to an EDC, the emergency flow 700 continues with call EDC block 708. In some embodiments, when the output of the call user interactive block 704a is a user command or selection to deliver a message to an emergency contact, or the interactive call timed out (e.g. the timeout criteria was satisfied), or there was an NA response, the emergency flow 700 continues with call contact block 706. In some embodiments, when the output of the call user interactive block 704a is the user selected to disconnect, the emergency flow 700 terminates.

In some embodiments, the emergency flow 700 continues with call contact block 706, a find next available contact block (as described above) that instructs the EFMS to loop through a list of contacts associated with the user and call each one-by-one in sequence until one of the contacts answers. In some embodiments, the calls prompted by the call contact block 706 are interactive calls that play an audio message that prompts the recipients of the calls to select one of a plurality of options. In some embodiments, the plurality of options includes an option to connect to an EDC or to disconnect. In some embodiments, the call contact block 706 additionally includes a default input such as an NAC response (e.g. there are no available contacts, or all of the listed contacts have been called and none answered) or a hang up response.

After the call contact block 706, in some embodiments, as depicted in FIG. 7, the emergency flow 700 proceeds in one or more directions, dependent upon the output of the call contact block 706. In some embodiments, when the output of the call contact block 706 is a contact selected to connect to an EDC, the emergency flow 700 continues with call EDC block 708. In some embodiments, when the output of the call contact block 706 is the contact selected to disconnect or there was an NAC response, the emergency flow 700 continues with call user interactive block 704b. In some embodiments, when the output of the call contact block 706 is the contact selected to disconnect, a hang up response, or there was an NAC response, the emergency flow 700 terminates.

In some embodiments, the emergency flow 700 continues with call user interactive block 704b, an interactive call/IVR block. In some embodiments, call user interactive block 704b functions the same as call user interactive block 704a, described above. In some embodiments, the interactive call executed by call user interactive block 704b takes different inputs and produces different outputs than those of call user interactive block 704a. After the call user interactive block 704b, the emergency flow 700 proceed in one or more directions, depending upon the output of the call user interactive block 704b. In some embodiments, when the output of the call user interactive block 704b is a user command or selection to disconnect, or a hang up response, or an NA response, or the interactive call timed out, the emergency flow 700 terminates. In some embodiments, when the output of the call user interactive block 704b is the interactive call timed out or an NA response, the emergency flow 700 repeats the call contact block 706. In some embodiments, when the output of the call user interactive block 704b is a user command or selection to connect an EDC, the emergency flow 700 continues with call EDC block 708.

In some embodiments, the emergency flow 700 continues with call EDC block 708, a connect to 9-1-1 block (as described above) that instructs the EFMS to call an emergency response or emergency dispatch center. In some embodiments, once the EDC has answered the call and been added to the communication bridge, the emergency flow 700 ends. In some embodiments, after answering the call, an EDC selects an option to query the location of the user.

A section of an example of an emergency flow script corresponding to emergency flow 700 is shown below. In the example shown below, an interactive call block is shown first, followed first by a "connect to 9-1-1" block and then by a "find next available contact" block. The following example should not be considered a complete emergency flow.

Example Emergency Flow Script states:

```
- name: call_user
    action: INTERACTIVE_CALL
    inputs:
      phone_number: '${user.phone_number}'
      text: >-
        "This is an automated call from ${company}. If this is a real emergency,
        dial one to talk to a nine one operator and receive help. If this
        is a false alarm, please dial star to cancel your request for help. You
        have activated the emergency feature in ${company}. Please dial one to
        talk to a nine one one operator and receive help. If this is a false
        alarm, please dial star to cancel your request for help. If you do not
        press one for help or star to cancel, we will call your emergency
        contacts and prompt them to speak to nine one one in your place. This
        call will now disconnect. "
    on_output:
      '#1@.*': user_call_911_play
      '#\*@.*': user_cancelled_911
      HANGUP@.*: user_hangup_sms
      'false': find_available_contact
  name: user_call_911_play
    action: PLAY
    inputs:
      text: 'Now calling nine one one... '
      phone_number: '${user.phone_number}'
    on_output:
      'true': user_call_911_sms
    goto: fail_safe
  name: find_available_contact
    action: CALL_LOOP
```

```
inputs:
    callee_list: contacts
    text: >-
        "This is an emergency call from ${company}. ${user.full_name} has
        designated you as an emergency contact in the app. The user has
        activated the emergency procedure, dial one to speak to a nine one one
        operator closest to ${user.full_name}'s location and send help to his
        exact location, or hang up to disconnect this call. If you do not dial
        one to connect to a nine one one operator, we will call
        ${user.full_name}'s other emergency contacts if he has provided any.
        This call will now disconnect. "
    time: 120
    store: found_contact
    on_output:
        '#1@.*': contact_call_911_play
        'false': user_call_final_911_call
    goto: fail_safe
```

In the example shown above, after the emergency flow is activated, the emergency flow begins by executing an interactive call block (e.g. call user interactive block 704a). A call is placed to {user.phone_number} (e.g. a phone number included in or associated with the emergency alert that activated the emergency call flow) and the message is dictated to the recipient of the call as a text-to-speech (TTS) message. As shown above, if the recipient selects "1", the emergency flow continues by executing a connect to 9-1-1 block (e.g. call emergency responder block 708). If the recipient selects "*", the emergency flow ends. If the recipient does not submit a response, the emergency flow continues by executing a find next available contact block (e.g. call contact block 706).

Figure 8:
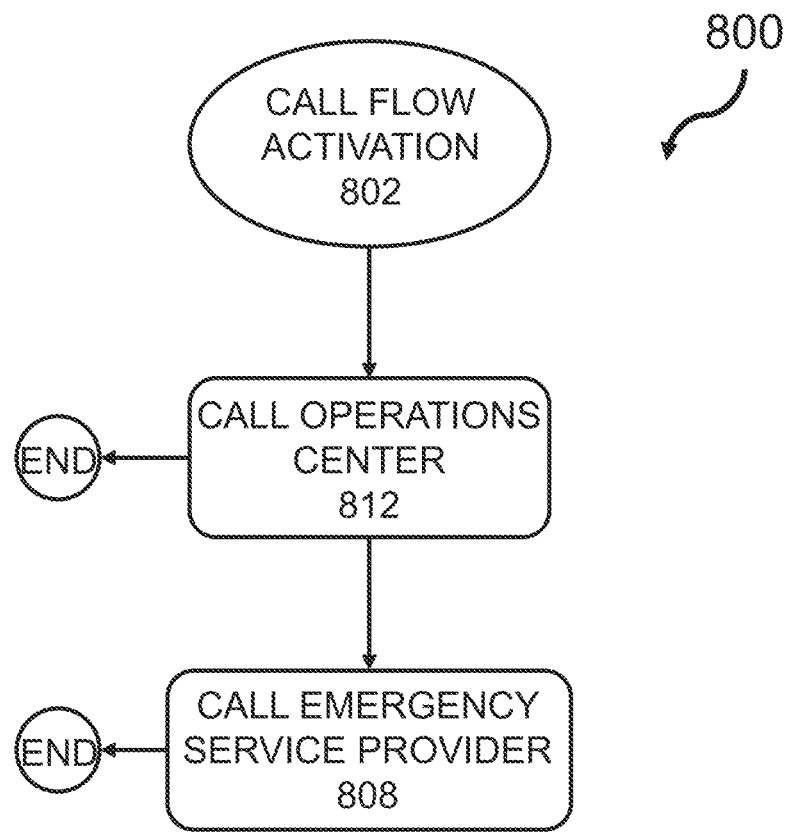
FIG. 8 illustrates a second exemplary embodiment of an emergency flow.

FIG. 8 depicts an exemplary configuration of an emergency flow 800. FIG. 8 depicts the emergency flow 800, as it may appear in the graphical user interface 673 in some embodiments of the Emergency Console, as a configuration of emergency flow building blocks and various accompanying connectors. In some embodiments, emergency flow 800 begins with emergency flow activation block 802. Similar to emergency flow activation block 702, emergency flow activation block 802 may be triggered in various ways and initiates the emergency flow 800. Similar to emergency flow activation block 702, in some embodiments, the emergency flow activation block 802 is an implied emergency flow building block. In some embodiments, emergency flow activation block 802 is functionally equivalent to a create emergency bridge block (as described above).

The emergency flow 800 continues with call operations center block 812, a connect to customer call/operations center block that instructs the EFMS to call an operations center associated with the administrator of the emergency flow (as described above). In some embodiments, the call is an interactive call that plays an audio message to the recipient of the call (e.g. the operations center representative). In some embodiments, the interactive call gives the recipient the option to call an EDC (e.g. press 1 to dial 9-1-1). In some embodiments, if the recipient hangs up or does not answer the call, the emergency flow 800 ends. In some embodiments, if the recipient selects to call an EDC, the emergency flow 800 continues with call EDC block 808, a connect to 9-1-1 block (as described above) that instructs the EFMS to call an EDC or emergency dispatch center. In some embodiments, once the EDC has answered the call and been added to the communication bridge, the emergency flow 800 ends.

In one example of one embodiment of the emergency flow 800, the administrator is a social media network (e.g. Facebook). In this example, the social media network monitors activity on the network to determine potential emergencies. If a user of the social media network posts (e.g. a user post) a status message that reads "Help, someone is trying to break into my apartment!" a representative of the social media network may receive a notification of the status message and determine whether or not the user is experiencing a potential emergency. As another example, when a user of the social media network streams a live video of themselves talking about suicide or attempting to commit suicide, a representative of the social media network receives a notification of the live video and determines whether or not the user is in potential danger. In some embodiments, detection of potential emergencies is based on text-based analysis of written user posts or audio/visual-based analysis of user posted videos. In this example embodiment, the social media network has accessed the Emergency Console, created the emergency flow 800, and integrated an API call into their system that delivers an emergency alert to the EFMS when activated. While monitoring the social media network for potential emergencies, a representative of the social media network receives a notification about a live streaming video session in which a user is talking about ending his or her own life. The representative quickly determines that the user is in potential danger, and clicks a button to send an emergency alert to the EFMS, which accordingly executes the emergency flow 800. First, the EFMS creates an emergency bridge at emergency flow activation block 802 and delivers a call to the representative of the social media network at call operations center block 812. The representative presses 1 to dial 9-1-1, prompting the EFMS to deliver a call to an EDC and add the call to the emergency bridge at call EDC block 808. The representative gives the location of the user (determined by the social media network) to the EDC who then dispatches an emergency vehicle to the location of the user.

Figure 9:
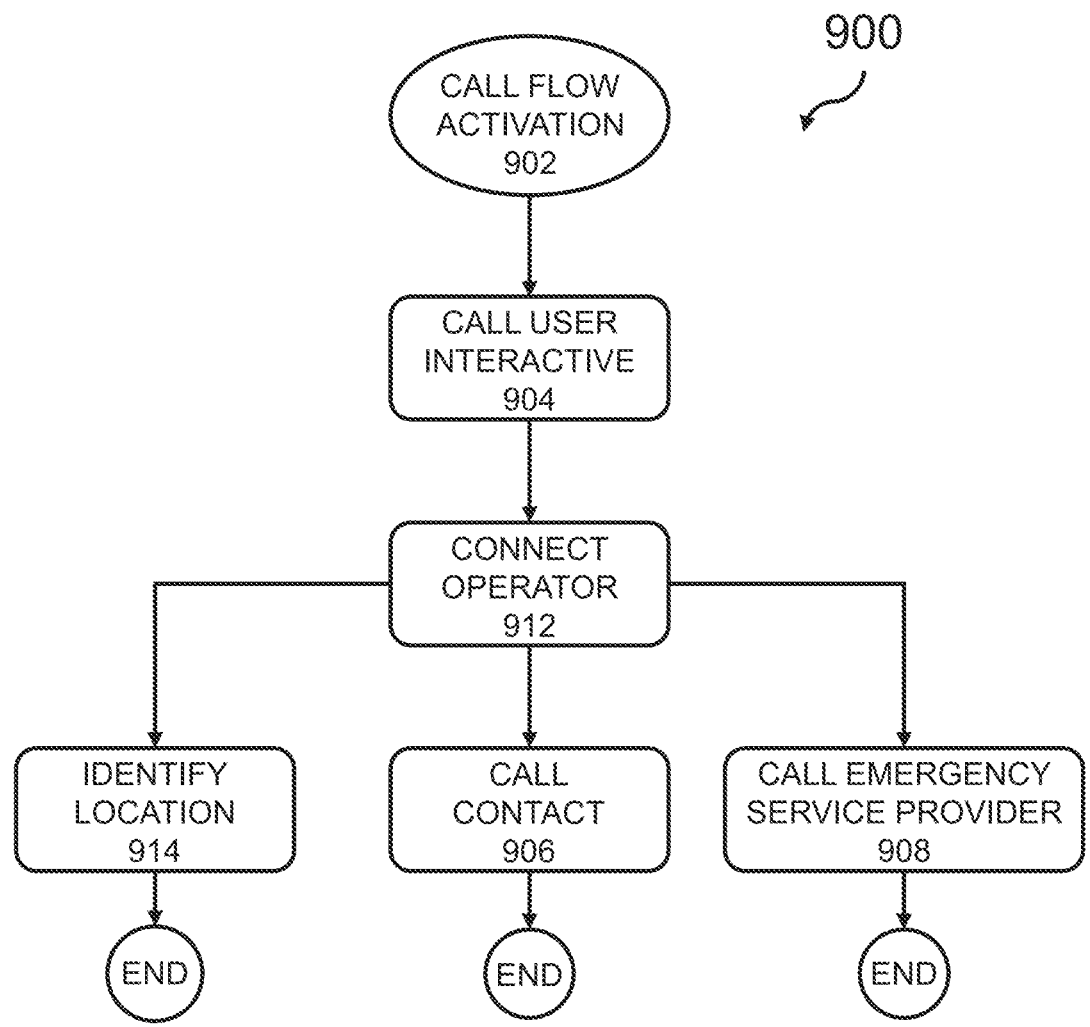
FIG. 9 illustrates a third exemplary embodiment of an emergency flow.

FIG. 9 depicts an exemplary configuration of an emergency flow 900, in some embodiments. FIG. 9 depicts the emergency flow 900, as it may appear in the graphical user interface 673 in some embodiments of the Emergency Console, as a configuration of emergency flow building blocks and various accompanying connectors. In some embodiments, the emergency flow 900 begins with an emergency flow activation block 902 and continues with call user interactive block 904, which function similarly to emergency flow activation block 702 and call user interactive block 704a, respectively, as described above with respect to FIG. 7. In some embodiments, the emergency flow 900 continues with "connect operator" block 912, a connect to customer call/operations center block (as described above) that functions similarly to call operations center block 812, as described above with respect to FIG. 8. In some embodiments, "connect operator" block 912 delivers an interactive call that plays an audio message to a recipient (e.g. a customer service representative) that prompts the recipient to select one of a plurality of options. In some embodiments, the plurality of options includes options to query the location of a user, call a contact associated with a user, and call an EDC. In some embodiments, if the recipient of the interactive call hangs up (e.g. the customer service representative determines that the emergency alert was falsely triggered or not meriting further response), the emergency flow 900 ends. If the recipient of the interactive call setup by the "connect operator" block 912 selects to query the location of a user, the emergency flow 900 continues with identify location block 914, a location block that instructs the EFMS to query or detect the location of a user, as described above. If the recipient of the interactive call setup by the "connect operator" block 912 selects to call a contact associated with a user, the emergency flow 900 continues with call contact block 906, which functions similarly to call contact block 706, as described above with respect to FIG. 7. If the recipient of the interactive call setup by the "connect operator" block 912 selects to call an EDC, the emergency flow 900 continues with call EDC block 908, which functions similarly to call EDC block 708, as described above with respect to FIG. 7. In some embodiments, after the recipient of the interactive call setup by the connect operator 912 selects an option from the plurality of options, the emergency flow 900 ends. In some embodiments, the recipient may select two or more of the options from the plurality of options before the emergency flow 900 ends. In some embodiments, if the recipient of the interactive call setup by the "connect operator" block 912 selects to call an EDC, the user called in call user interactive block 904 is removed from the communication bridge by the EFMS before the EDC is called. In some embodiments, if the recipient of the interactive call setup by the "connect operator" block 912 selects to call an EDC, the recipient of the interactive call setup by the "connect operator" block 912 is removed from the communication bridge by the EFMS before the EDC is called.

In one example of one embodiment of the emergency flow 900, the administrator of the emergency flow is again the administrator of the taxi cab coordinating service (e.g. CurbCall) of the example described above with respect to FIG. 7. Again, in this example, the administrator accesses the Emergency Console, creates the emergency flow 900, and integrates an API call that delivers an emergency alert to the EFMS into a panic button within a mobile application developed by the taxi cab coordinating service. A rider with the mobile application installed on his or her smart phone gets into a taxi cab under the management of the taxi cab coordinating service. In this example, the taxi cab driver accidentally runs a red light and the taxi is hit on the left by a truck. The driver is severely injured and unconscious. The rider is conscious but injured and cannot escape the vehicle. To get help, the rider presses the panic button on the mobile application, which sends an emergency alert to the EFMS, which accordingly executes the emergency flow 900. First, the EFMS creates a communication bridge at emergency flow activation block 902 and calls the rider at call user interactive block 904. The rider answers and receives an audio message that recites "press 1 for help." The rider presses 1, prompting the EFMS to call the taxi cab coordinating service's customer service center and bridges a call between the rider and a customer service representative of the taxi cab coordinating service. The rider tells the customer service representative that the rider and the driver have been in an accident and need emergency help. The customer service representative then queries the location of the rider at identify location block 914, calls 9-1-1 at call EDC block 908, and calls one of the rider's emergency contacts at call contact block 906.

Figure 10:
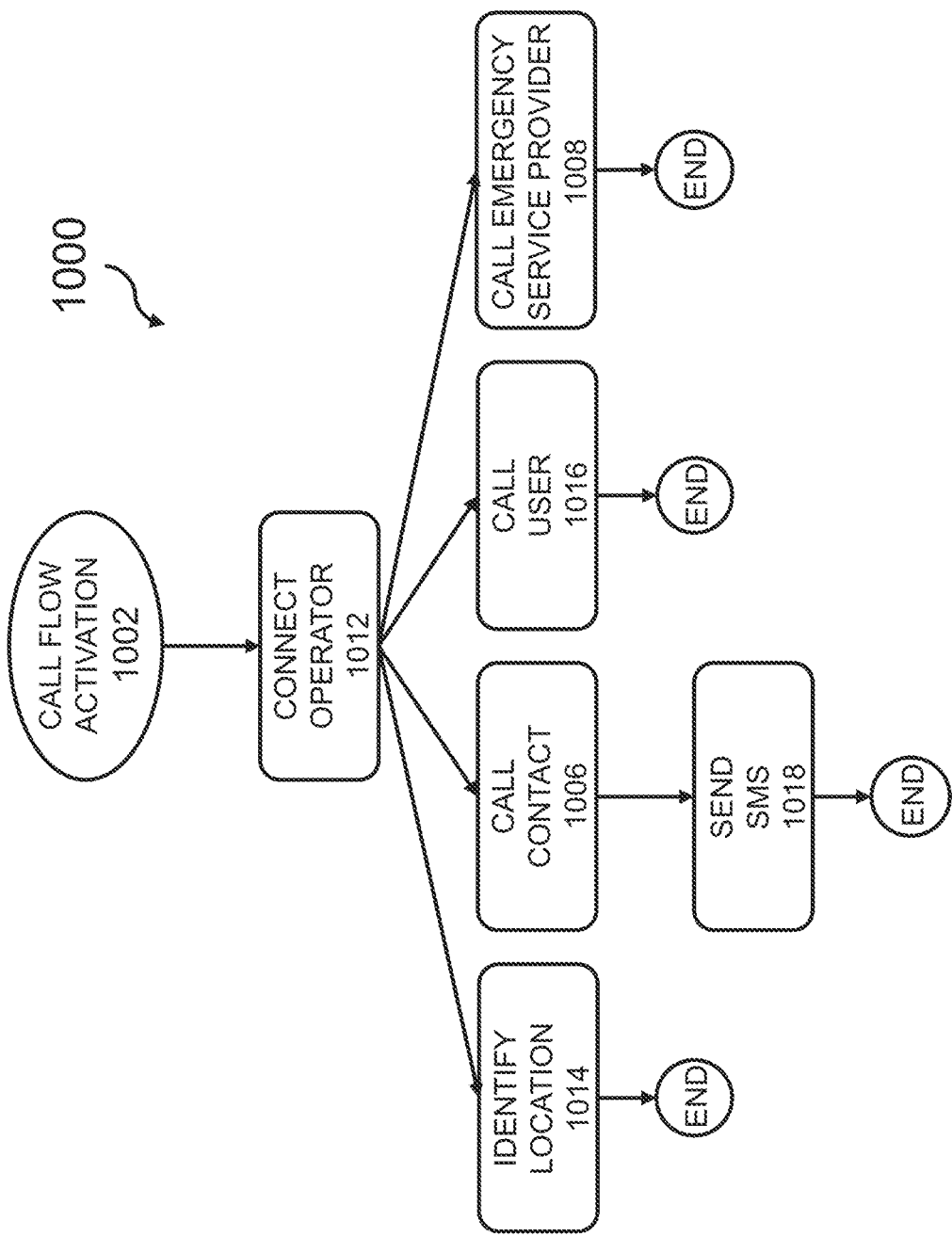
FIG. 10 illustrates a fourth exemplary embodiment of an emergency flow.

FIG. 10 depicts an exemplary configuration of an emergency flow 1000. FIG. 10 depicts the emergency flow 1000, as it may appear in the graphical user interface 673 in some embodiments of the Emergency Console, as a configuration of emergency flow building blocks. In some embodiments, the emergency flow 1000 begins with emergency flow activation block 1002, which functions similarly to emergency flow activation block 702, as described above with respect to FIG. 7. In some embodiments, the emergency flow 1000 continues with "connect operator" block 1012, a connect to customer call/operations center block (as described above) that functions similarly to call operations center block 812, as described above with respect to FIG. 8. In some embodiments, "connect operator" block 1012 delivers an interactive call that plays an audio message to a recipient (e.g. a customer service representative) that prompts the recipient to select one of a plurality of options. In some embodiments, the plurality of options includes options to query the location of a user, call a contact associated with a user, call a user, and call an EDC. If the recipient of the interactive call setup by the "connect operator" block 1012 selects to query the location of a user, the emergency flow 1000 continues with identify location block 1014, a location block that instructs the EFMS to query or detect the location of a user, as described above. If the recipient of the interactive call setup by the "connect operator" block 1012 selects to call a contact associated with a user, the emergency flow 1000 continues with call contact block 1006, which functions similarly to call contact block 706, as described above with respect to FIG. 7. If the recipient of the interactive call setup by the "connect operator" block 1012 selects to call an EDC, the emergency flow 1000 continues with call EDC block 1008, which functions similarly to call EDC block 708, as described above with respect to FIG. 7. If the recipient of the interactive call setup by the "connect operator" block 1012 selects to call a user, the emergency flow 1000 continues with call user block 1016, a call user block (as described above) that instructs the EFMS to initiate a phone call to a number associated with the user and connect the phone call to the communication bridge. In some embodiments, the emergency flow 1000 continues with send SMS block 1018, a send SMS message block (as described above) that instructs the EFMS to deliver a SMS message to a user. In some embodiments, the emergency flow 1000 continues with send SMS block 1018 after a contact associated with a user is successfully contacted at call contact block 1006. In some embodiments, the SMS message includes a web link to a video stream (e.g. a live video stream of a user or an emergency event). In some embodiments, at send SMS block 1018, the EFMS additionally or alternatively delivers a MMS message or a message through an internet-based messaging platform (e.g. email, social media apps, messaging apps).

In one example of one embodiment of the emergency flow 1000, the administrator of the emergency flow is again the administrator of the social media network (e.g. Facebook) of the example described above with respect to FIG. 8. In this example, the administrator of the social media network has accessed the Emergency Console, created the emergency flow 1000, and integrated into their system an API call that delivers an emergency alert to the EFMS when a user of the social media network is detected to be in an emergency situation. In this example, the social media network has detected (e.g. using audio or visual analysis tools or software) that a user of the social media network has initiated a live streaming video session in which the user is contemplating committing suicide. In response, the social media network activates the emergency flow 1000 by sending an emergency alert to the EFMS, which executes the emergency flow 1000 accordingly. First, the EFMS calls a suicide hotline at "connect operator" block 1012 to connect to a suicide hotline operator. The EFMS plays an audio message to the operator that gives the operator the option to call the user of the social media network at call user block 1016. The operator is optionally given the option to query the location of the user of the social media network at identify location block 1014, call an emergency contact associated with the user of the social media network at call contact block 1006, or call an EDC at call EDC block 1008. The operator chooses the option to call one of the social media network user's emergency contacts at call contact block 1006 and then chooses the option to deliver a text message to the emergency contact that includes a link to the live streaming video session.

Figure 11:
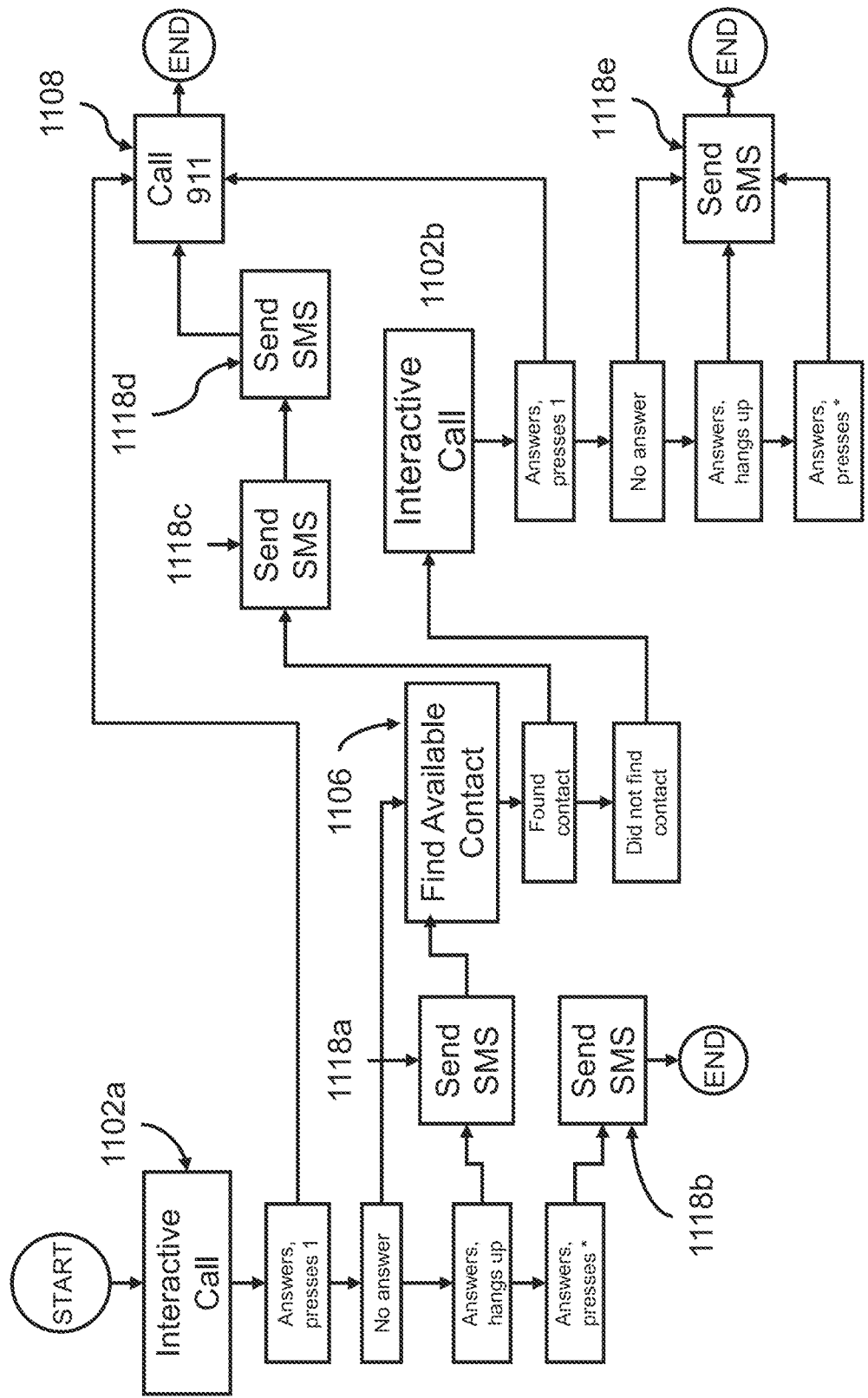
FIG. 11 illustrates a fifth exemplary embodiment of an emergency flow.

FIG. 11 depicts an exemplary configuration of an emergency flow 1100 as it may appear in the graphical user interface 673 in some embodiments of the Emergency Console. As shown in this exemplary emergency flow, the TTS (text-to-speech) scripts for users and emergency contacts are used until a live caller gives an indication to initiate an emergency call.

In some embodiments, as depicted in FIG. 11, the potential outputs of emergency flow building blocks are graphically represented in the graphical user interface 673, including the directions of the emergency flow determined by different outputs. The exemplary emergency flow of FIG. 11 comprises the following steps (labeled by number):

[3] To User: "Revolar: John Smith has been connected to the nearest 9-1-1 center."

[1118a] To User: "Revolar: A call from 9-1-1 was disconnected. If you still need to speak to the nearest 9-1-1 operator, press the big red panic button on our app."

[1118b] To User: "Revolar: John Smith has canceled his request for help from 9-1-1. No further action is needed."

[1118c] To User: "Revolar: Your contact Jane Smith has spoken to a 9-1-1 operator in response to your emergency. Help is on its way."

[1118d] To Contact: "Revolar: Help is on its way to John Smith from 9-1-1."

[1118e] To User: "Revolar: We have attempted to call you at 6:00 am. If you need to speak to the nearest 9-1-1 operator, press the panic button.

In some embodiments, the exemplar flow of FIG. 11 comprises the following TTS scripts (labeled by number):

[1102a] "This is an automated call from Revolar. If this is a real emergency dial "1" to talk to a 9-1-1 operator and receive help. If this is a false alarm, please dial '*' to cancel your request for help. You have activated the emergency feature in Revolar. Please dial "1" to talk to a 9-1-1 operator and receive help. If this is a false alarm, please dial '*' to cancel your request for help. If you do not press '1' for help or '*' to cancel, we will call your emergency contacts and prompt them to speak to 9-1-1 in your place. This call will now disconnect."

"This is an emergency call from Revolar. John Smith has designated you as an emergency contact in the app. The user has activated the emergency procedure, dial '1' to speak to a 9-1-1 operator closest to John Smith's location and send help to his exact location, or hang up to disconnect this call. If you do not dial '1' to connect to a 9-1-1 operator, we will call John Smith's other emergency contacts if he has provided any. This call will now disconnect."

[1102b] same as [1102a]

Figure 12:
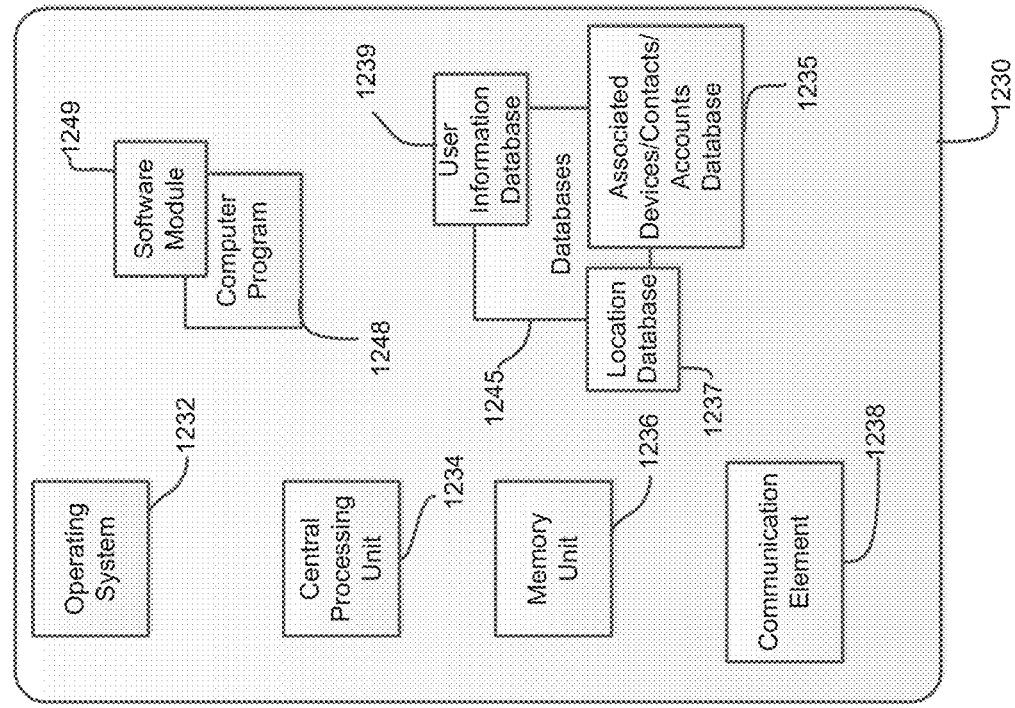
FIG. 12 depicts an exemplary embodiment of (i) the triggering device and (ii) the emergency management system.
Figure 12:
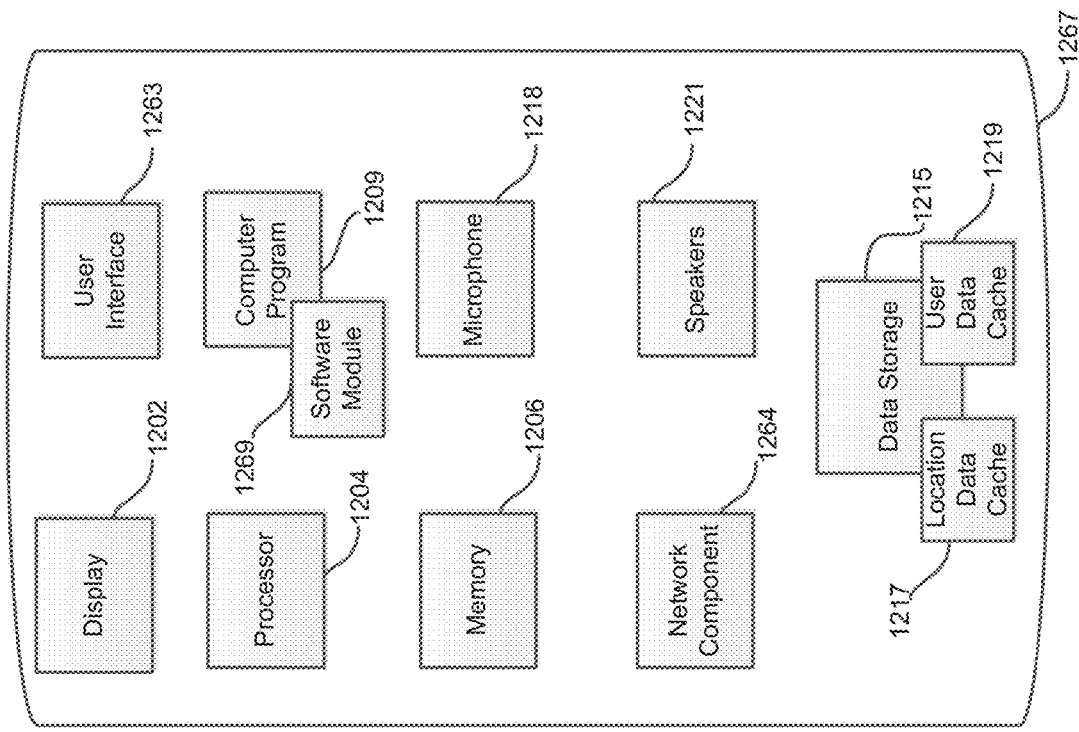

In certain embodiments, disclosed herein are communication devices, systems and methods for connecting users with dispatch centers for emergency response. FIG. 12

- Call user play TTS [Interactive Call Block 1102a]
- If user answers and accepts by pressing "1"
  - Call 911 [Connect to 9-1-1 Block 1108]
  - Send notification SMS to user [3, described below]; END of Flow
- Else
  - If user answers and cancels by pressing "*"
    - Send notification SMS to user [Send SMS Message Block 1118b]; END of Flow
  - If user answers and hangs up
    - Send notification SMS to user [Send SMS Message Block 1118a]
  - If user does not answer or answers and hangs up
    - Find next available emergency contact (loop through) [Find Next Available Contact Block 1106] play TTS
    - If contacts answers and accepts by pressing "1"
      - Send notification SMS to user [Send SMS Message Block 1118c]
      - Send notification SMS to contact [Send SMS Message Block 1118d]
      - Call 911 [Connect to 9-1-1 Block 1108]
      - Send notification SMS [3]; END of Flow
    - Else
      - Call user again [Interactive Call Block 1102b]
      - If user answers and accepts by pressing "1"
        - Call 911 [Connect to 9-1-1 Block 1108]
        - Send notification SMS [3]; END of Flow
      - Else
        - Send notification SMS [Send SMS Message Block 1118e]; END of Flow In some embodiments, the exemplary emergency flow of FIG. 11 comprises the following SMS messages (labeled by number):

depicts embodiments of the (i) communication device (e.g. a triggering device) and (ii) emergency management system. In some embodiments, the device 1267 is a digital processing device such as a communication device (e.g. mobile or cellular phone, computer, laptop, etc.). In some embodiments, a communication device is a wearable device. In some embodiments, a communication device is a wireless mobile device or a smart phone. In some embodiments, a communication device is a walkie-talkie or a two-way radio. In some embodiments, a user 1200 (not shown) is the primary user of the device 1267.

In some embodiments, the device 1267 comprises at least one of a processor 1204, a memory 1206 (e.g. an EPROM memory, a RAM, a solid-state memory), a display 1202 (not shown), a user interface 1263, a network component 1264 (e.g. an antenna and associated components, Wi-Fi adapters, Bluetooth® adapters, etc.), a microphone 1218, speakers 1221 and a computer program 1209 (e.g. mobile application, server application, computer program, application) with an exemplary software module 1269. In some embodiments, the device 1267 is equipped with a location component 1216 (not shown), for example, a global positioning system (GPS). In some embodiments, the device comprises data storage 1215. In some embodiments, the device comprises at least one of a location data cache 1217 and a user data cache 1219.

In some embodiments, the device 1267 has several components including a display 1202 (not shown) and user interface 1263, which allow the user 1200 to interact with the device 1267. In some embodiments, the display 1202 is a part of the user interface 1263 (e.g. a touchscreen is both a display and provides an interface to accept user interactions). In some embodiments, the display 1202 and/or the user interface 1263 comprises a touch screen (e.g. a capacitive touch screen), which is capable of displaying information and receiving user input. In some emFIG.bodiments, the device 1267 comprises hardware components not including a display 1202 and a user interface 1263, wherein the device functions autonomously without requiring active user guidance or interaction. In some embodiments, the computer program 1209 includes a voice or speech recognition module (not shown) for taking voice commands. In some embodiments, the computer program 1209 comprises at least one software module 1269 for carrying out one or more instructions.

In some embodiments, a device 1267 includes various accessories 1222 that allow additional functionality. In some embodiments, the accessories 1222 include one or more of the following: a camera 1287 (not shown) (e.g. for input of gestures commands or pictures from the user 1200), one or more sensors 1277 (not shown) such as a smoke detector or a heart monitor, USB/micro-USB port, headphone jack, a card reader, SIM card slot, and any combination thereof.

In some embodiments, a device 1267 autonomously detects emergencies based on data from various sources such as the sensors 1277 (sensor data) or sound detection picked up from the microphone 1218 or another accessory (e.g. smoke detector). For example, in some embodiments, a device autonomously detects an emergency based on sensor data when sensor readings or values exceed a threshold (e.g. a predefined threshold set by the device software by default, by a user, or by an EMS) or fall outside a threshold range. In some embodiments, the device 1267 may obtain relevant data from an associated device for the device 1267 to trigger the emergency.

FIG. 12 also shows a schematic diagram of one embodiment of an emergency management system 1230 as described herein. In some embodiments, the emergency management system 1230 comprises one or more of an operating system 1232, at least one central processing unit or processor 1234, a memory unit 1236, a communication element 1238, and a software application 1248 (e.g. server application). In some embodiments, the emergency management system 1230 comprises one or more databases 1235, which may also be a component of the "emergency clearinghouse." In some embodiments, the emergency management system 1230 comprises at least one of a location database 1237 and a user information database 1239. In some embodiments, the software application 1248 comprises at least one software module 1249 for carrying out one or more instructions.

In some embodiments, the EMS 1230 includes an associated database 1245 where associated devices, emergency contacts, or associated accounts are stored for the device 1267 and/or the user 1200. After an emergency alert has been received, the database 1245 may be searched for information associated with the device 1267 using an account identifier (e.g. phone number, user name, device ID, etc.). In some embodiments, the user 1200 had established an account when the triggering device 1267 has been deployed to detect emergencies. For example, the user 1200 may have added emergency contacts, a secondary user or owner of the device 1267 (such as a spouse or a corporate representative), associated devices (e.g. other devices owned by the user or devices owned by a secondary user or owner) a location for the device. In some embodiments, an organization or a corporate entity provides device information for a corporate representative who can be contacted in case of an emergency. In some embodiments, the database 1245 includes a prioritized list of associated devices or emergency contacts for the device 1267. As shown, the associated database 1245 may be incorporated in the databases 1235 or it may be a standalone database or maintained by a third-party or corporate client.

Figure 13:
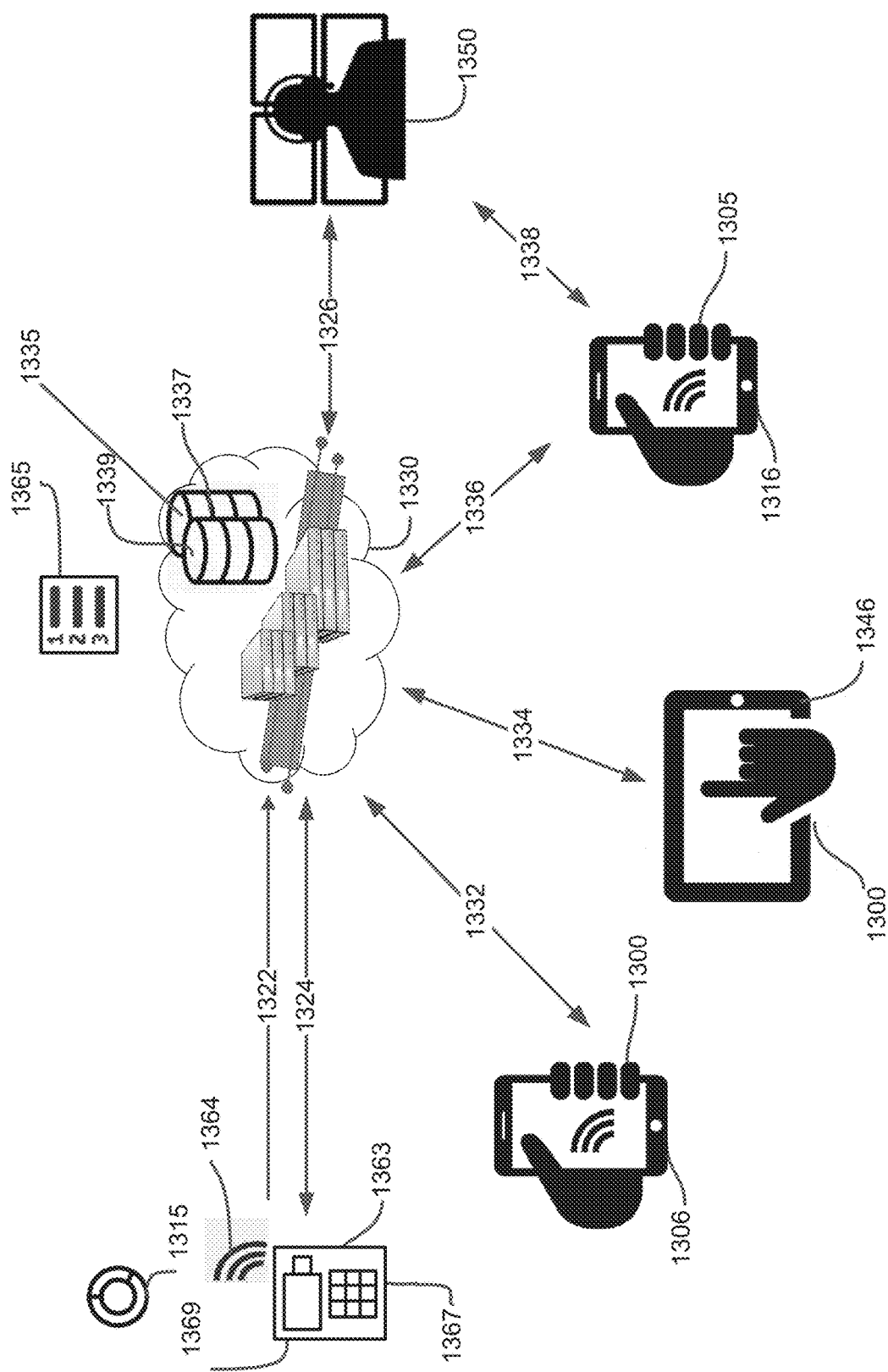
FIG. 13 depicts an exemplary embodiment of a system for connecting with other devices after an emergency alert has been triggered.

FIG. 13 depicts an embodiment of a system for connecting with other devices after an emergency alert has been triggered (similar to FIG. 2). As shown, a triggering device 1367 sends the emergency alert, which is a request for assistance to respond to an emergency, to an Emergency Management System or EMS 1330. Ultimately, the EMS 1330 will forward the alert as a request for assistance and connect the triggering device 1367 with one or more dispatchers 1350. The dispatcher 1350 may be an Emergency Dispatch Center (EDC) or a private dispatcher such as corporate security, university police, towing service, or a private security service.

In some embodiments, the triggering device 1367 includes a network component 1364 (e.g. a Wi-Fi antenna) which sends the emergency alert. The emergency alert may be sent in various ways via the internet, cellular or landline network. In some embodiments, the triggering device 1367 includes location data within its storage 1315 or in a database in the EMS 1330 (e.g. databases 1335).

In some embodiments, the triggering device 1367 includes a computer program 1369 for sending the emergency alert. The computer program 1369 may be pre-installed on the device or may have been loaded and installed by the user (e.g. user 1300). User 1300 may have followed through a setup or registration process for the device 1367, where he or she has provided user data such as emergency contacts (e.g. phone numbers, email addresses, messaging IDs), user information, location (e.g. a physical address of the location of the device 1367), etc. In some embodiments, user data, location data, emergency data, etc., may be saved in data cache or storage 1315 in the device 1367. In other embodiments, the data may be saved in one or more databases 1335 in the EMS, in third-party servers or in cloud-based systems. In some embodiments, data regarding associated devices, associated accounts and/or emergency contacts may be saved in databases 1335 (location database 1337, user database 1339 or associated database 1345 (not shown)). The data may be protected by password protection, authentication protocols for transmission, encryption, use of secured pathways, and other methods for limiting the risk of security breaches.

In some embodiments, the emergency is triggered by user input, which may involve the user (e.g. user 1300) interacting with the user interface 1363 of the triggering device 1367. In some cases, the user 1300 may press one or more hard or soft buttons on the user interface 1363. However, other types of user interactions such as touch, tap, pattern of touches, gesture, voice-activation, etc. are contemplated.

In some embodiments, the triggering device 1367 may autonomously detect emergency situations or likely emergency situations. The triggering device 1367 may send an alert based on autonomously detected emergencies using one or more sensors (not shown) such as from a smoke alarm in a building.

In some embodiments, the triggering device 1367 may be a communication device such as a mobile phone, a computer, a wearable device (e.g. a smart watch), a digital assistant, smart speakers, etc. If the triggering device 1367 is a mobile phone or another device with a cellular connection, the emergency alert may be sent via a cellular network. After the alert is sent to the EMS 1330 via communication link 1322, the EMS 1330 may initiate a voice call along two-way communication link 1324. In some cases, communication link 1324 is a data link, which may support a data call such as VoIP. Link 1324 may be used for sending data such as user data, location data, emergency data, text, images, and video from the triggering device 1367. In some embodiments, communication link 1324 is established via landline, cellular network or the Internet. In some embodiments, the communication link 1324 is through VoIP, both voice and data can be transmitted in the same path (e.g. in the SIP signaling, as headers or in multi-part messages). In some embodiments, the communication link 1324 may be an analog voice call over landline or cellular network and a data link for transferring data via Wi-Fi, cellular data, etc. Generally, data links are preferred for transmission of both voice and data whenever they are available, and the signal strength is good. In certain cases, the communication link may be arranged through NG911 systems or where the data is sent through SIP signaling.

In some embodiment, the EMS 1330 may include one or more databases 1335 housed in one or more servers in the same or in a remote location. In some embodiments, a location database 1337 may house location data regarding the location of the emergency. In some embodiments, a user database 1339 may house user data and/or emergency data (such as an emergency contact list 1365 of associated devices, emergency contacts or associated contacts). In other embodiments, the location, user and/or emergency data (such as list 1365) may be saved on data cache 1315 in the triggering device 1367 or in data storage in other devices such as mobile phone 1306, computer 1346, or mobile phone 1316 (mobile phone of a secondary user user), etc. In other embodiments, the data may be saved online in one or more remote servers or cloud-based systems.

In some embodiments, the emergency contact list 1365 may be entered by user 1300 at the time of registration or installation of the computer program 1369 or at another time. The emergency contact list 1365 may be a list of phone numbers, email addresses, IP addresses, MAC addresses, etc. In particular, computing devices which are not associated with a phone number (such as computer 1346) may be identified by an IP address, MAC address, URLs or SSIDs.

In some embodiments, the emergency contact list 1365 is a list with at least one contact (e.g. phone number, email address, messaging ID, device ID, etc.). In some embodiments, the list 1365 is a non-prioritized list with more than one contact wherein attempts to connect to the contacts can be made in any order or even concurrently. For example, attempts can be made to connect with two contacts simultaneously and continue with whoever picks up or whoever agrees to make the emergency call, etc.

In some embodiments, the EMS 1330 may try to connect to a user using one or more communication links (e.g. 1324, 1332, 1334, 1336) before sending the emergency alert to one or more dispatchers 1350. In some embodiments, the EMS will send the alert indirectly to a dispatcher (e.g. a PSAP). The EMS may send the alert to an intermediary (e.g. other public emergency response agencies, private security or emergency response service providers, emergency contacts, etc.), which in turn will contact the PSAP. The EMS 1330 may attempt to connect to user 1300 using communication device 1306 or tablet 1346. If unsuccessful or simultaneously, the EMS 1330 may connect to user 1305 via communication device 316 (e.g. an emergency contact, a secondary user of device 1367, a corporate representative). A direct connection 1338 between device 1316 and dispatcher 1350 may be established or the user 1305 may be connected via the EMS 1330 via links 1336 and 1326. Further details may be found in FIGS. 14 and 15.

It is contemplated that a wide range of devices may be the triggering device 1367. Thus, the device 1367 be a simple device with limited capability (e.g. a smoke alarm, IoT device), possess a wide range of components or functionality (e.g. a smart phone) or device with some basic functionality (e.g. a wearable device, a smart car console, a personal digital assistant). Thus, the methods and systems herein are designed to handle emergency alerts from a variety of triggering devices through its emergency flows.

FIG. 14 illustrates an exemplary method for an emergency management system to communicate with dispatchers for assistance after an emergency alert has been triggered. Once the alert has been triggered (act 1412), the EMS attempts to connect to a user through the triggering device. If the triggering device has capabilities to connect to a user, the EMS may be able to connect to a user (act 1414). For example, the triggering device may include an audio system with a microphone and speaker to host a call with a user. In some embodiments, the triggering device includes a user interface and display for hosting an SMS exchange or another type of messaging with a user. In some embodiments, the EMS may evaluate whether the triggering device includes compatible software for hosting a connection with EMS. In some cases, the EMS decides not to connect to a triggering device if a responsive user is not likely available at that location (e.g. a burglar alarm in a smart home, car alarm in a parked vehicle, etc.). In some embodiments, the connection to the triggering device is not successful. For example, if an emergency is triggered by the control console in a smart home with an audio system, the EMS may attempt to reach a user there. In some cases, a user is unresponsive or not in the home and the attempt to connect will fail. The evaluation of the capabilities of the triggering device may be conducted at the time of registration or setup of the account. In some embodiments, the evaluation is done in real time after the emergency has been triggered.

It is contemplated that there could be variations in the decision to be made in step 1414. For example, the decision could be whether the device that has triggered the emergency should be called or not based on user or administrator preferences, which may be established during registration. In some embodiments, an organization or company policy may dictate whether a particular device should be called first or not. Thus, information about whether to attempt to call the triggering device may be saved on the device or in one or more databases in the EMS. For example, the EMS looks up the device (using a device or user identifier) in the database to check if it should call the device or skip to the next step. In other embodiments, the decision may depend on the type of device, type of emergency, likelihood that someone will be available, etc.

In some cases, an audio call is not preferred because of a variety of reasons and other connections (such as SMS or instant messaging, HTTP messages, push notifications, etc.) may be attempted. For example, the user may be unable to talk because of presence of an intruder, disability, language difficulties, injury, age, etc. In some cases, voice communication may not be efficient to transfer all the information relevant for the emergency. When signal strength is weak, or bandwidth is not sufficient to maintain a good quality voice connection, non-voice communication (such as SMS) may be preferred. In contrast, audio calls may be required in some jurisdictions where existing and legacy PSAP systems can only accept voice calls and have limited capacity to accept other formats. The emergency alert may be sent with location information as described in FIG. 17.

For example, the triggering device may be a smart speaker installed with a digital assistant and able to host a connection with the EMS (directly via an internet connection or indirectly through another device such a smart phone or router). Once the EMS is connected to a user (act 1416 & 1418), the EMS may request user input to agree to be connected to a dispatcher (act 1422) or give other instructions (act 1424). For example, the screen may indicate that user's car has been involved in a crash and the user is allowed to press a button to connect to emergency dispatchers. Based on the user input, the user may be connected to a dispatcher (act 1442). An appropriate dispatcher may be chosen based on various factors including type of emergency, location of emergency, severity and likelihood of emergency, etc. Specifically, the EMS may respond differently when the severity of the emergency is high (e.g. when a person's life may be at risk in after a car crash has been detected) versus a low severity incident (e.g. a car alarm has been triggered for an unattended parked car). For example, if the severity of the emergency is low, the EMS may send notifications to emergency contacts when an emergency is triggered.

In some cases when the user is unresponsive or did not request to connect to dispatcher, an appropriate dispatcher may be contacted (e.g. by dialing an emergency number and playing a Text-to-Speech (TTS) message) (act 1426 and 1428). The message may inform the dispatcher that the type and location of the emergency. In some embodiments, when the user is not responsive, non-human users may be prohibited from calling emergency dispatchers in some jurisdictions or services. In those jurisdictions, notification messages may be sent to the associated devices, devices of emergency contacts or friends and family groups, a third-party monitoring service (e.g. OnStar®), nearby devices and/or "recently contacted" devices, etc. (act 1432). The EMS may consider various factors such as the existing laws (e.g. non-human users may be prohibited from calling emergency dispatchers in some jurisdictions), user preferences, severity and likelihood of the emergency, etc. Notification messages may be sent at various points including when the emergency is triggered (act 1412) or when the emergency call is made (act 1428). The messages may be sent simultaneously to several devices through text messages or SMS, push notifications, email notifications, and/or automated calls.

For example, the EMS may consider likelihood of emergency based on trigger values, situational awareness, user inputted information, etc. In addition, the EMS may consider emergency response policies or rules, based on a variety of inputs such as user preferences, federal, state, or local regulations, ordinances, or other statutory requirements, technology limitations of various response options, private emergency response services, etc. to make routing and communication decisions. For example, if an alert comes from a connected car in a local jurisdiction where the PSAP does not allow non-human callers, the EMS may elect to attempt to establish a voice connection with various emergency contacts or third-party emergency response providers instead of the PSAP or before contacting the PSAP. In some cases, the triggering device may not allow a connection to a user, the EMS will check the account preferences of the user of the triggering device (act 1434) to identify associated devices to connect to (act 1436 & 1438). In some embodiments, the associated devices will be contacted simultaneously and when a user responds, the user will be connected to the dispatcher. In other embodiments, the associated devices will be contacted in a sequence so that the next user on a list will be contacted if there is no response on a given device.

In some embodiments, the emergency alert is triggered in numerous ways such as, for example, sensor readings outside specified range, device safety warnings, environmental warnings, and other triggers. In addition, the emergency alert may be triggered through user input, such as pressing an interactive button on the device or by voice command.

In some embodiments, the triggering device is a stationary device with communication capabilities such as desktops, home consoles, smart speakers with digital assistants, smart home consoles, thermostats and other controllers for sensors, etc. In some embodiments, the triggering device is a mobile device with communication capabilities such as mobile phones, radios or walkie talkies, wearable devices, vehicle consoles, etc.

Waterfall Calling

FIG. 15 illustrates method for an emergency management system to call dispatchers for assistance after an emergency has been triggered. Here, the EMS will establish an emergency call connecting a user to one or more dispatchers. The emergency may be triggered in various ways (e.g. a smoke alarm, an IoT sensor, a car crash detector, a user pressing a panic button, a voice command, an API call for emergency assistance).

If the triggering device can support audio, then the EMS will try to connect to a user through the triggering device (act 1514 and 1548). For example, the triggering device may have audio capabilities such as a microphone, speakers and may include calling software (e.g. VoIP call). In some embodiments, the EMS determines the audio capabilities based on the identifier for the triggering device or user. In some embodiments, the EMS finds the association of the device to a particular account or an organization. In some embodiments, the evaluation of the audio capabilities is done at the time of registration or setup of the device. In other embodiments, the evaluation is done in real time after the emergency has been triggered. In some embodiments, for connecting to the triggering device, a user (e.g. an emergency contact, an authorized secondary user, a corporate representative) who is available to participate in an audio call is also required.

For example, after a car crash, an emergency alert may be sent to the EMS by the car console. If the car console has a VoIP client for answering calls, which is operational and a user in the car is able to answer the call, the EMS will connect a call between the user and a dispatcher. If the driver is unresponsive, the EMS will try to connect to other devices as described below.

In some cases, a voice call is preferred. As an example, after a car crash, a voice call is preferred for communicating emergency information to enable the user to quickly and efficiently provide the information to the dispatcher. In addition, a voice call allows a two-way exchange and the dispatcher can advise the user who is in the emergency situation quickly and efficiently.

In some embodiments, before triggering an emergency alert, the EMS collects information about the location of the emergency and basic information about the type of emergency. In some embodiments, the EMS also provides information about the user associated with the triggering device to one or more dispatchers.

In some embodiments, when the triggering device does not allow an audio connection to a user (act 1514), the EMS searches for the account for the user of the triggering device to identify associated user devices to call (act 1516). In some cases, there is a mobile phone, or another device associated with the user and the EMS attempts to connect with the user via that device (act 1552).

In some cases, the triggering device does not support an audio call, and the EMS will identify associated user devices to call. In some cases, there are not any associated devices and the EMS will proceed to determining whether an emergency call should be made based on whether a TTS (text-to-speech) message is allowed by dispatch centers in the area (act 1544). Some prohibit non-humans to make emergency calls. In some embodiments, for some jurisdictions and for private dispatchers, the EMS connect to a dispatcher without a user on the line and play a TTS message providing details regarding the emergency (act 1546).

In some cases, the EMS identifies a contact number for the user of the triggering device. In some embodiments, the user has provided his or her contact information during the registration and setup of the triggering device. In some embodiments, when an emergency is triggered, the EMS locates the user data in the data storage on the triggering device, in one or more databases (e.g. 1335 in FIG. 13) in the EMS or some other data storage location. If unable to call the user at the triggering device, in certain cases, the EMS will try to call the user at other devices using a contact number (act 1516 and 1522).

In some embodiments, the EMS identifies a call list for the user of the triggering device. The user may have provided a list of emergency contacts (emergency data) during the registration and setup of the triggering device. In some embodiments, the emergency contacts includes name of an emergency contact and their contact number.

When an emergency is triggered, the EMS may locate the emergency data in the data storage on the triggering device, in a database (e.g. 1337 in FIG. 13) in the EMS or some other data storage location. If unable to call the user at the triggering device, the EMS will try to call the user at other devices or other users who are on the contact list using the emergency contact numbers (act 1516, 1518 and 1522). As shown, the EMS will call the next number on the list if a user was not responsive in the previous contact number or did not choose to connect to a dispatcher (act 1518).

The advantage of sequentially going through a contact list (e.g. 1365 in FIG. 13) that is a prioritized list is that the user can place his or her devices and devices of other closely associated users on the top of the list (e.g. spouses can be given higher priority). In the same way, the user may give lower priority to emergency contacts who would only be contacted in the event that higher priority contacts are unavailable. For example, people with lower priority may be further away, but still able to make an emergency call on behalf of the user (e.g. a proxy call).

In some embodiments, a prioritized list comprises at least one associated device. In some embodiments, a prioritized list comprises a plurality of associated devices having an order of priority. In some embodiments, the order of priority determines the sequence in which associated devices in the prioritized list are contacted by, for example, an emergency management system or a dispatch center. As an example, a prioritized list comprises an emergency contact's cell phone and tablet (with a VoIP application) with the cell phone having a higher priority than the tablet (e.g. as determined by the user), wherein the cell phone and tablet are associated devices of a triggering device (e.g. a wearable heart rate monitor). The user has a heart condition and has adjusted the settings for the heart rate monitor to detect an emergency when it detects an irregular heartbeat. In this case, the heart rate monitor detects an irregular heart beat and transmits an emergency alert. An emergency management system receives the emergency alert and looks up a list of associated devices of the triggering device. In this case, the associated devices are the cell phone and tablet. The emergency management system then connects to the cell phone since it has the highest priority in the list and obtains location information and other user information (e.g. user identity, medical information).

Once a user picks up the call, the EMS determines whether that user is the one who is in the emergency situation (act 1524). To determine this, the user may be asked a simple question such as "Are you in an emergency?" or "Do you need help?" For a quick response, the EMS will prompt the user to respond by pressing a button on a keypad or by yes or no voice answer. If the connected user is in the emergency, an abridged message may be played such as "Do you want to be connected to 911?" or "Press 1 to connect to get connected to emergency dispatch center in your area" (act 1526). If the user is not the one in the emergency situation, the EMS will play a detailed message to explain the emergency situation and prompting a user response (act 1532) An example detailed message may say: "we have detected that John Doe's car may be in an emergency on I-90. Do you want to be connected to 911 or an emergency dispatch center on their behalf?"

In emergencies, it is preferred that the communications are clear and concise, and the user is prompted to respond in a specific and simple manner. In some embodiments, if the user presses 1, they are connected to 911 and if the user presses *, the session is cancelled. In another embodiment, the device interface may ask the user to confirm the call based on a displayed authorization instructions (using a password, passcode, fingerprint sensor, voice recognition analysis, etc.) and user interaction on the interface of the device.

In addition, a timer is started to allow a limited time for the user to respond and if the user is unresponsive to connect to the next user on the list. The timer (also referred to as the timeout value may be between 0.01 seconds to 300 seconds, preferably between 10 to 30 seconds. In some embodiments, the timer is about 1, 2, 3, 4, 5, 6, 7, 8, 9, 10, 11, 12, 13, 14, 15, 16, 17, 18, 19, 20, 25, 30, 35, 40, 45, 50, 55, 60, 70, 80, 90, 100, 110, or about 120 seconds. In some embodiments, the timer is at least about 1, 2, 3, 4, 5, 6, 7, 8, 9, 10, 11, 12, 13, 14, 15, 16, 17, 18, 19, 20, 25, 30, 35, 40, 45, 50, 55, 60, 70, 80, 90, 100, 110, or about 120 seconds. In some embodiments, the timer is no more than about 1, 2, 3, 4, 5, 6, 7, 8, 9, 10, 11, 12, 13, 14, 15, 16, 17, 18, 19, 20, 25, 30, 35, 40, 45, 50, 55, 60, 70, 80, 90, 100, 110, or about 120 seconds. If there is user input, the timeout will be reached before the timer has expired. If there is no user input and the timeout value has been reached (act 1528, 1534 & 1536), the EMS searches for other associated user devices to call (act 1518). If there are no other associated user devices (act 1518), the EMS will send a TTS message if it is allowed in the jurisdiction (act 1544) and/or sends notifications to the user and emergency contacts (act 438).

Figure 16:
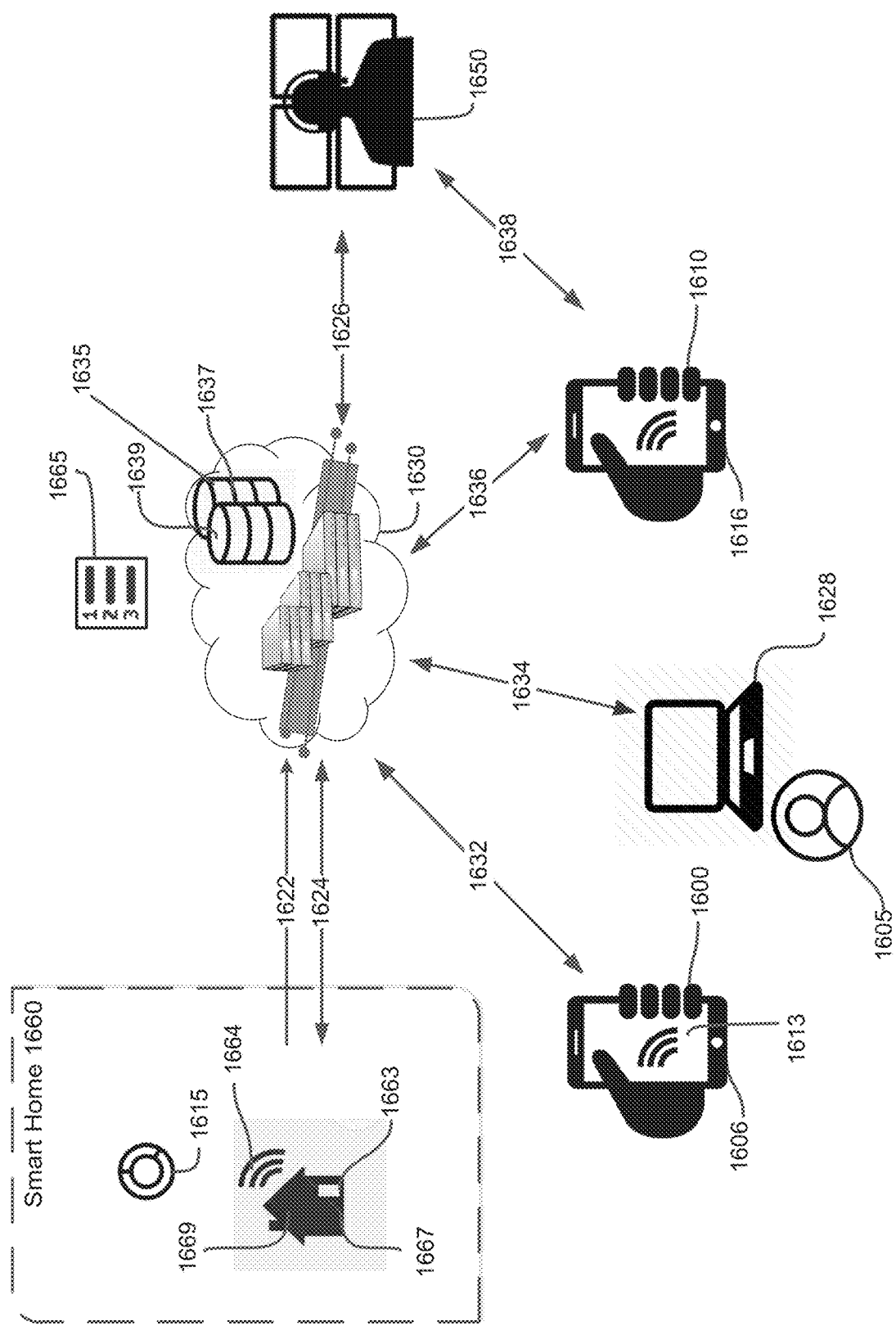
FIG. 16 depicts embodiments of a triggering device within a smart home, emergency management system, and computer programs.

FIG. 16 depicts embodiments of a triggering device within a smart home, emergency management system and computer programs. As shown, a triggering device 1667 (not shown) with computer program 1669 within the smart home 1660 sends the emergency alert, which is a request for assistance to respond to an emergency, to an Emergency Management System or EMS 1630. The EMS 1630 will transmit the alert and connect the triggering device 1667 with one or more dispatchers 1650. The dispatcher 1650 may be an Emergency Dispatch Center (EDC) or a private dispatcher.

In some embodiments, the triggering device 1667 includes a network component 1664 (e.g. a Wi-Fi antenna) which sends the emergency alert. In some cases, the connectivity (e.g. Wi-Fi signals) is weak or the pathways are not secure, and the emergency alert is transmitted using another communication device (e.g. a mobile phone) or a routing device (e.g. Wi-Fi router).

In some embodiments, the triggering device 1667 includes a computer program 1669 for sending the emergency alert. In some embodiments, user 1600 followed through a setup or registration process for the device 1667, where he or she has provided user data such as emergency contacts (e.g. phone numbers, email addresses, messaging IDs), user information, location (e.g. a physical address of the location of the device 1667), etc. In some embodiments, user data, location data, emergency data, etc., may be saved in data cache 1615 in the device 1667. In other embodiments, the data is saved in one or more databases 1635 in the EMS, in third-party servers or in cloud-based systems.

In some embodiment, the EMS 1630 may include one or more databases 1635 housed in one or more servers in the same or in a remote location. In some embodiments, a location database 1637 houses location data regarding the location of the emergency. In some embodiments, a user database 1639 houses user data and/or emergency data (such as an emergency contact list 1665). In other embodiments, the location, user and/or emergency data (such as an emergency contact list 1665) is saved on data cache 1615 in the triggering device 1667 or in data storage in other devices such as mobile phone 1606, etc.

In some embodiments, the triggering device 1667 may be an IoT (IoT) device such as a home thermostat, intelligent home monitors, baby monitors, smoke or carbon monoxide detectors, home security camera systems, etc. In some embodiments, the triggering device 1667 is a communication device such as a mobile phone, a computer, a wearable device (e.g. a smart watch, fitness tracker, smart jewelry). If the triggering device 1667 is a mobile phone, the emergency alert may be sent via a cellular connection, if it is available. After the alert is sent to the EMS 1630 via communication link 1622, the EMS 530 may initiate a voice call (e.g. via a VoIP call) along link 1624.

In some embodiments, the triggering device 1667 autonomously detects emergency situations or likely emergency situations. In some cases, the triggering device 1667 sends an alert based on autonomously detected emergencies using one or more sensors (not shown) such as from a smoke detector or a burglar alarm in a building.

In some embodiments, the triggering device 1667 sends the alert with location information of the emergency. For example, user 1600 may have entered the physical address of the home 1660 into the triggering device 1667, which may be stored in data storage 1615. In some cases, the triggering device 1667 includes the address in the alert. In some embodiments, the triggering device includes a location component (e.g. GPS, location API, etc.) to determine its location, which is optionally provided in the alert.

In other embodiments, the emergency alert is sent without location information. When the user 1600 set up an account for the triggering device 1667 with the EMS 1630, he or she may have provided an address of the home 1660. When the EMS 1630 receives an alert without location information, it will search its databases 1635 (including location database 1637) for the location of the triggering device 1667. In addition to x, y coordinates and/or physical address, the location information may include additional information such as altitude, floor number, apartment number, suite number to accurately identify the location. In some embodiments, IoT devices and IoT networks (including a network of sensors and/or devices) may be stored in a device location database stored in a database in the EMS or a third-party server. Further discussion about location information is provided in FIG. 17.

In some embodiments (not shown), the triggering device 1667 sends the alert using another device with communication capabilities such as mobile phone 1606 through an indirect connection (e.g. Wi-Fi, Bluetooth, etc.). An indirect connection may be advantageous when the triggering device 1667 is unable to send the alert to the EMS 1630 due to bad connection, busy networks, etc. In addition, the user 1600 will be instantly alerted about the emergency situation even if he or she is in a different room as the triggering device 1667.

In some embodiments, the triggering device includes sensors that detect environmental conditions and triggers an alarm when the sensed value is outside a specified range. Another device (e.g. home console, a digital assistant, wearable, phone, etc.) evaluates if the sensed value indicates an emergency situation or likely emergency situation and sends an emergency alert. In such cases, the triggering device 1667 does not directly send the alert, but the triggering device is part of network of devices that sends the alert.

In some embodiments, the EMS 1630 attempts to connect to a user (e.g. 1600, 505, 510) using one or more communication links (e.g. 1624, 1632, 1634, 1636) before sending the emergency alert to one or more dispatchers 1650. The EMS 1630 may attempt to connect to user 1600 using communication device 1606. Another user 1605, who may also be an owner of the smart home 1660, may be contacted on their work laptop 1628. If the connection to user 1605 is unsuccessful, the EMS 1630 may attempt to connect to user 1610 (a corporate representative) via a communication device 1616 (e.g. a corporate phone).

In some embodiments, the emergency contact list 1665 is a list with no prioritization and emergency contacts can be contacted in any order or concurrently. On the other hand, if the emergency contact list 1665 is a prioritized list, it will allow the user 1600 to give higher priority to informing user 1605 who may be living in the home 1660 over another user 1610, who may be living further away.

Once connected to user 1610, a direct connection 1638 between device 1616 (e.g. by calling the corporate operations center using an available number to get additional information such as the type of burglar alarm system, etc.) and dispatcher 1650 may be established or the user 1610 may be connected via the EMS 1630 via links 1636 and 1626. Thus, the user 1610 can respond if he or she wishes to call the dispatcher on behalf of the primary user 1600 as described in FIG. 15 to request emergency assistance.

Processing Location Information from the Emergency Alert

Figure 17:
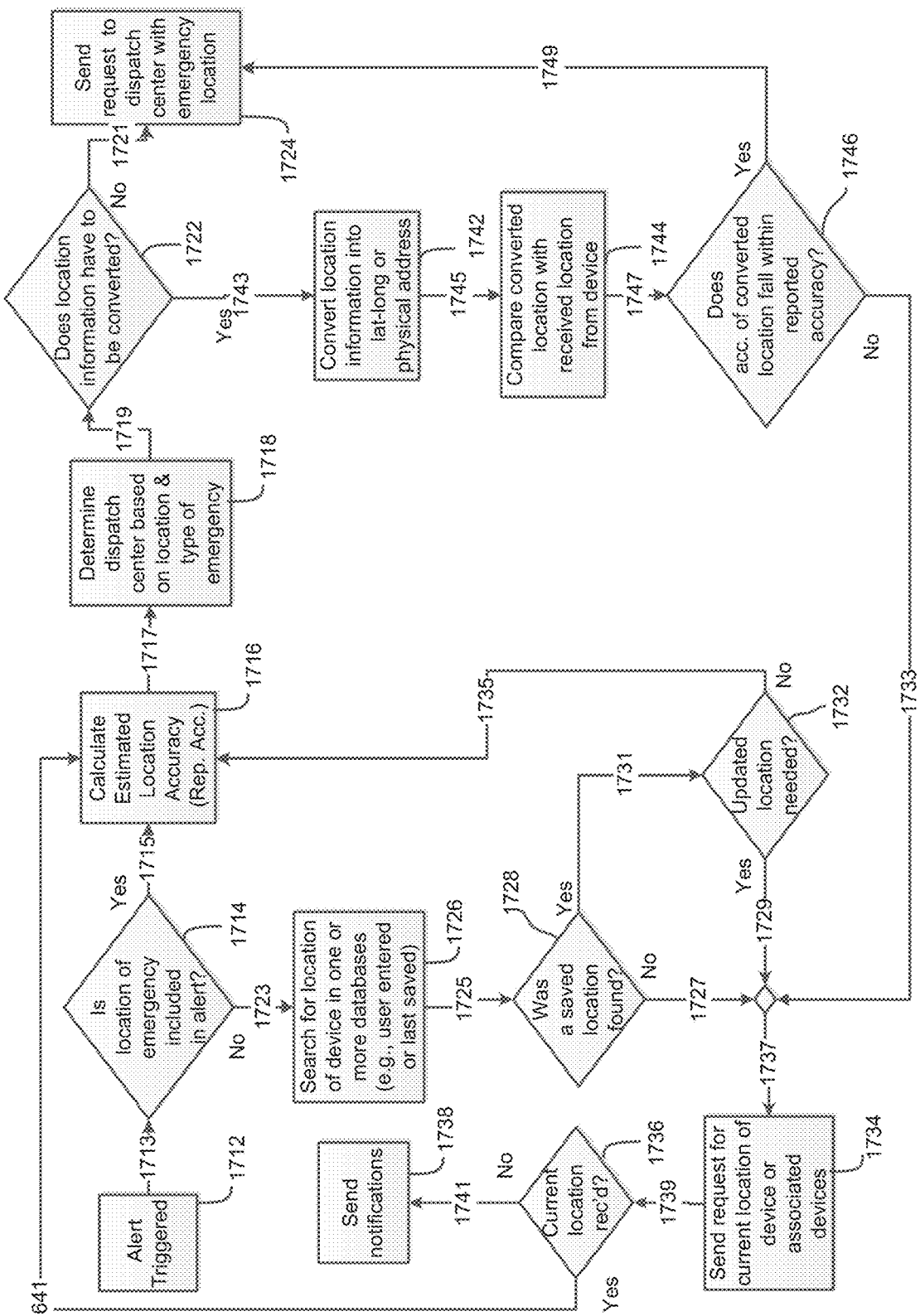
FIG. 17 illustrates an exemplary method for providing a location for the emergency.

FIG. 17 illustrates an exemplary method for providing a location for an emergency. An emergency may be triggered in various ways, including user interaction indicating an emergency and autonomous detection of an emergency using one or more sensors. When the emergency alert is received (act 1712), the EMS determines if the location of the emergency is included in the alert (act 1714). In some cases, the triggering device may have a location component (such as GPS or device-based hybrid location application) or it may not have a saved address. In such cases, the device may send the alert with the location information. In some cases, the triggering device may be a simple device with limited capability (e.g. an IoT sensor) and it may not know where it is. In such cases, the device will not be able to send the alert with location data. In some cases, where the triggering device is sending an alert using an indirect connection with a communication device (e.g. a mobile phone with location services), the location data from the communication device may be appended or included in the alert or sent in some other fashion.

In some embodiments, if the location of the emergency is provided in the alert, the EMS calculates an estimated location accuracy (also referred to as the reported accuracy) for the location information (act 1716), which is optionally sent to the dispatcher. In some embodiments, the location is calculated to within 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, or 100 meters of the location of the triggering device or an associated device of the triggering device, including increments therein. In some embodiments, the location is calculated with at least 80%, 85%, 90%, 95%, or 99% estimated location accuracy, including increments therein.

In other embodiments, alternate location accuracy (e.g. accuracy radius, confidence) may be used. As used herein, "location accuracy metric" refers to a measure for quantifying the accuracy of a location as compared to a ground-truth or actual location. In some embodiments, the location accuracy metric is a distance (e.g. a distance from ground-truth). In some embodiments, the location accuracy metric is a likelihood or probability. In some embodiments, the location accuracy metric is a confidence.

Determining the location of the emergency is a critical step in providing quick and efficient response to the location. The location and type of the emergency (which may be also included in the alert) can be used to determine the dispatch center (e.g. PSAP) to send the emergency alert (act 1718). In some embodiments, the type of emergency may include: fire, medical, police, car crash, etc. Once the dispatch center is determined, the EMS may look up characteristics of the dispatch center including the type and format of the location information that can be sent to the dispatch center. For example, if the recipient PSAP requires a dispatchable address (with a physical address), the location information may need to be converted from lat-long format (x, y coordinates) to a physical address using reverse geocoding. In some cases, the user may have saved an address for a home and the EMS may convert it into lat-long format and provide either or both formats to the dispatch center.

Figure 18:
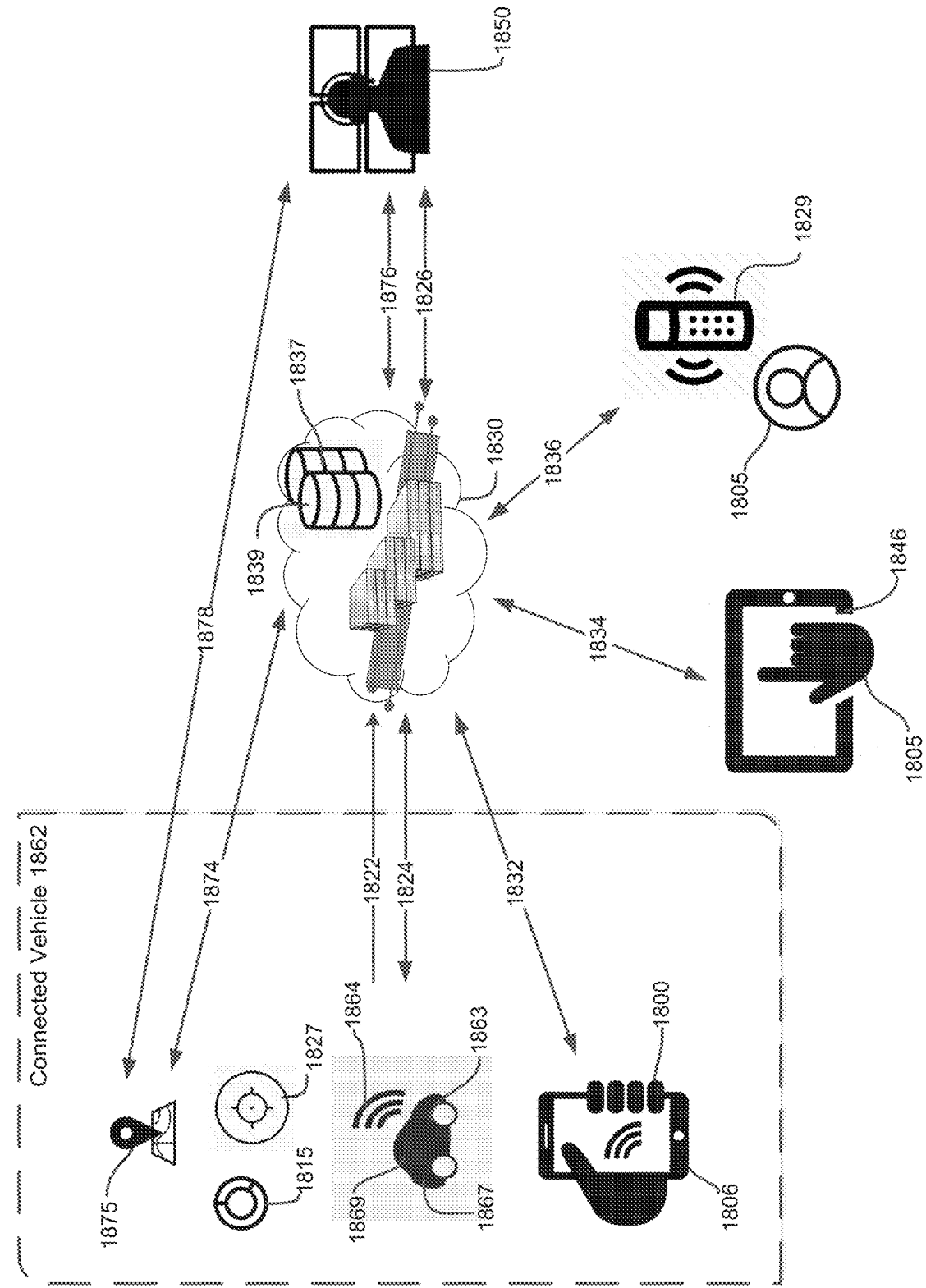
FIG. 18 depicts exemplary embodiments of a connected vehicle, emergency management system, and computer programs.

In some embodiments, the EMS evaluates the accuracy of the converted location such as according to any of the following methods. If the location information has to be converted (act 1722 and 1742), the EMS may compare the converted location to the received location. In addition, the EMS may determine whether the accuracy of the converted location falls within the reported accuracy calculated in act 716 (act 1744). If the accuracy is not sufficient, the EMS may send a request for the current location of the device (e.g. through a HTTP message, an automated call or push notification) (act 1734). For example, the triggering device may be the vehicle console in a connected car as shown in FIG. 18 and the EMS may request the console to send an updated location. If the vehicle console is not responsive, the EMS may send a request to a user device such as a mobile phone or wearable device associated with the user to obtain the user's location information. In some embodiments, the EMS may take the battery life of the devices into account. In some embodiments, the EMS may decide not to frequently request location information from devices with limited battery life to preserve battery life other essential functions. In some embodiments, the emergency alert will contain location information within the body of the alert or in the metadata.

Referring to FIG. 17, if location information is not sent within the alert or in the metadata, the EMS may search for location information within its databases (act 1726). For example, there may be a user provided address for the device (such as a home address) or a last saved location for the device. If a saved location for the triggering device has been found (act 1726), the EMS may try to get an updated location, if needed (act 1732). For example, the triggering device may be a mobile device such as a wearable or the last saved location may have been saved a long time ago and an updated location may be needed. In such cases, the EMS will send a request to the device or associated device for a current location, which may be used for sending the alert to one or more dispatch centers. In some cases where the location information from the triggering device is not accurate (act 1746), changing rapidly (e.g. a connected vehicle, not shown), incomplete (not shown) or outdated (not shown), the EMS may obtain current location from the device in the same way. For example, a current location may be obtained in the following cases: i) the radius of uncertainty reported for the location obtained by the device is too large; ii) the geocoded location of the provided address is too far from the reported lat-long, iii) the timestamp on the location is too old (e.g. 10 minutes, the time cutoff may vary based on device type and trigger types). The advantage of getting location directly from the triggering device even when there is a user-provided location is that the current location may be more accurate. Often the location sent in the emergency alert or 911 calls are obtained from cellular carriers and are not accurate. In contrast, the location information obtained directly from the device (such as from the GPS receiver or location services) may be more accurate. In addition, for mobile devices, the EMS may be able to follow the trajectory of the device and updated the dispatch center and emergency responders to facilitate the emergency response. The frequency of updates from the device may be moderated to preserve battery life.

In some embodiments, the EMS may obtain location information from other sensors or IoT devices that are associated with the user account by sending push notifications or SMS or other methods of obtaining location. For example, when a crash is detected by a vehicle console, but the location information is not available or accurate, the EMS may send push notifications to the user's mobile phone to obtain location information. In another the embodiment, if the emergency is triggered by a wearable device which does not have a GPS or location services and thus, sends the emergency alert to the EMS without location information, the EMS can request location from another device associated device such as the user's mobile phone. In some embodiments, the trigger devices are programmed to autonomously send location data after the emergency has been triggered.

In some embodiments, mobile devices (e.g. smart phone 1806) have the capability for generating and transmitting device-based hybrid location (DBHL) using location services. DBHL incorporates multiple technologies embedded in smart devices, such as GPS, Wi-Fi, and Bluetooth, to obtain accurate location even in indoor settings. DBHL are calculated on an electronic or communication device (using location services or geolocation APIs), as opposed to locations calculated using a network (e.g. a carrier network). Device-based hybrid locations can be generated using inputs from multiple sensors such as GPS, network-based technologies, Wi-Fi access points, Bluetooth beacons, barometric pressure sensors, dead reckoning using accelerometers, gyrometers, etc.

Specifically, in some embodiments, the location is determined on the device using GPS, received location data from cellular base station signal triangulation, Wi-Fi location data, Bluetooth beacon data, or any other form of location information stored at the communication device. In some embodiments, the altitude or elevation (z-direction coordinate) may be determined using GPS, barometric sensor or an accelerometer. In some embodiments, the location comprises lat-lon (x, y coordinates) and altitude (z-direction). In some embodiments, the lat-lon coordinates includes 5-13 decimal places. In some embodiments, the lat-lon coordinates includes 6 decimal places. In some embodiments, the reported location includes reported accuracy radius and confidence percentage. In some embodiments, the location data is validated before it is provided to dispatch centers by using results from ground truth-testing. For example, test calls may be made from pre-surveyed buildings or outdoor location determined using a GPS chipset.

The EMS may use location information from various sources to validate the location of the emergency. If a sensor's location determination doesn't match known locations or frequently visited locations, the EMS may send push notifications to additional user devices to confirm location (e.g. a smart phone known to be affiliated with the user of a wearable or a connected car). Location information obtained from the wearable or the connected car may be compared and used for confirmation of the location. For example, if a connected car GPS sensor shows that a user is traveling at 50 mph in South Africa, the EMS may try to confirm the location of the emergency by obtaining location from the user's mobile phone. If the user's phone also indicates a velocity of 50 mph but in the user's home state, the EMS may decide to use the smart phone's location rather than the connected car's transmitted location. Thus, the EMS leverages every available piece of information to validate location.

In some embodiments, machine learning algorithms are used to understand frequent user behaviors and further validate accuracy of location. For example, if a user is at work every day at 3 PM and a wearable indicates they are having a health emergency in another part of the country, the EMS may decide to query additional devices or sensors affiliated with the user to validate location.

FIG. 18 depicts embodiments of a connected vehicle, emergency management system and computer programs. It is understood that connected or smart vehicle may be connected to the internet through various ways including its own internet connection and connecting through another device such as a mobile phone, etc. As shown, a triggering device 1867 (e.g. a vehicle console, electronic control unit, engine control unit, or engine control module) with computer program 1869 within the connected vehicle 1862. The computer program 1869 may be a part of the operating system of the vehicle console or may be a separate program that can be opened by the user or triggered when a crash is detected. Various sensors (e.g. electromagnetic sensors, ultrasonic sensors, pressure sensors, gyroscopes) and software (e.g. crash detection software, obstacle detection software) may be employed to automatically detect when there has been a car crash.

An emergency may be triggered by user 1800 interaction with the user interface 1863 or autonomously detected (e.g. detection of a car crash). After an emergency is triggered, the triggering device sends the emergency alert, which is a request for assistance to respond to an emergency, to an Emergency Management System or EMS 1830 network component 1864 (e.g. Wi-Fi, Bluetooth®, or cellular radio). In some embodiments, the vehicle 1862 may connect to the internet via another device such as a mobile phone using Bluetooth® or a cellular connection. In other embodiments, the vehicle 1862 will be connected to the internet directly via a Wi-Fi connection or cellular connection. The EMS 1830 transmits the alert and connects the triggering device 1867 with one or more dispatchers 1850, which may be PSAP other public-sector emergency response agency, private security service, private emergency response service, or a private fleet management service.

In some embodiments, the triggering device 1867 (e.g. vehicle console) in the connected vehicle 1862 includes a location component for determination of the current location such as GPS receiver. In some embodiments, the vehicle 1862 includes one or more accelerometers and gyroscopes, which may be used to estimate the location via methods such as dead reckoning. In other embodiments, sensor data from odometers and tire rotation sensors may be used for estimating the location of the vehicle 1862. In some embodiments, the location of the vehicle 1862 may be determined by using another device such as mobile phone with a GPS or another locationing method. In some embodiments, the vehicle 1862 is located using devices fixed to a particular location (e.g. traffic cameras, toll booths, satellites, and other external sensors that could sense or track the location of the vehicle and convey it to the EMS). In some embodiments, the vehicle 1862 is equipped with Wi-Fi and barometers, which is optionally used for estimating the location of the vehicle. In addition, the vehicle's location may be estimated from nearby Wi-Fi hotspots, other connected vehicles, smart buildings, etc. Based on the location information, the triggering device 1867 may generate location data by using, for example, a location API on GPS coordinates). The location data may be in form or lat-long or x, y coordinates or a physical address. The location data may be sent with the emergency alert using communication link 1822.

However, in other embodiments, the location data 1875 is not sent in the alert and have to be transmitted through other pathways such as communication links 1874 and 1878. The location data 1875 may be sent after receiving a request from the EMS 1830 or dispatcher 1850. In some embodiments, the location data 1875 is sent after an emergency is detected, periodically during the emergency or for some time after the emergency session has ended. The location data may be provisioned in one or more databases 1835 in the EMS 1830 and provided to the dispatch center 1850 through secure pathways. In this way, the EMS 1830 and dispatchers 1850 may be able to follow the trajectory of the vehicle 1862 in real-time. In some embodiments, the frequency of location determination may be moderated to preserve battery life of the device 1865 (especially for portable mobile devices like smart phones).

If the location data from the triggering device 1867 is not available or insufficient (no connectivity, low accuracy, etc.), the EMS 1830 may look up associated user devices (e.g. 1806) and request current location data using communication link 1832.

In some embodiments, user data, location data, emergency data, etc., are saved in data cache or storage 1815 in the device 1867. In other embodiments, the data are saved in one or more databases in the EMS (e.g. 1837, 1839), in third-party servers or in cloud-based systems. In some embodiments, the EMS 1830 attempts to connect to a user (e.g. 1800, 1805, 1810) using one or more communication links (e.g. 1824, 1832, 1834, 1836) before sending the emergency alert to one or more dispatchers 1850. The EMS 1830 may attempt to connect to user 1800 using communication device 1806, user 1805 through tablet 1846. If the connection to user 1805 is unsuccessful, the EMS 1830 may attempt to connect to user 1810 via communication device 182916 (e.g. smart speakers with a digital assistant). In some embodiments, an emergency contact list 1865 (not shown) is accessed to identify devices to contact during the emergency. It is understood that the emergency contact list may be user-defined emergency contacts, other associated user devices, devices of friends and family groups, a third-party monitoring service (e.g. OnStar®), etc. In some embodiments, the contact list 1865 is generated in real time from nearby devices (e.g. identified by a Wi-Fi scan of the area), by searching for a name such as "Mom" from the contact list on the device and/or "recently contacted" devices or numbers from the call log, etc.

The user 1810 may be connected via the EMS 1830 via links 1836 and to the dispatch center 1850 via link 1826. The user 1810 can respond by voice command (Yes or No) he or she wishes to call the dispatch center 1850 on behalf of the primary user 1800 as described in FIG. 15 for requesting emergency assistance.

Activating Emergency Response by Voice Command

Figure 19:
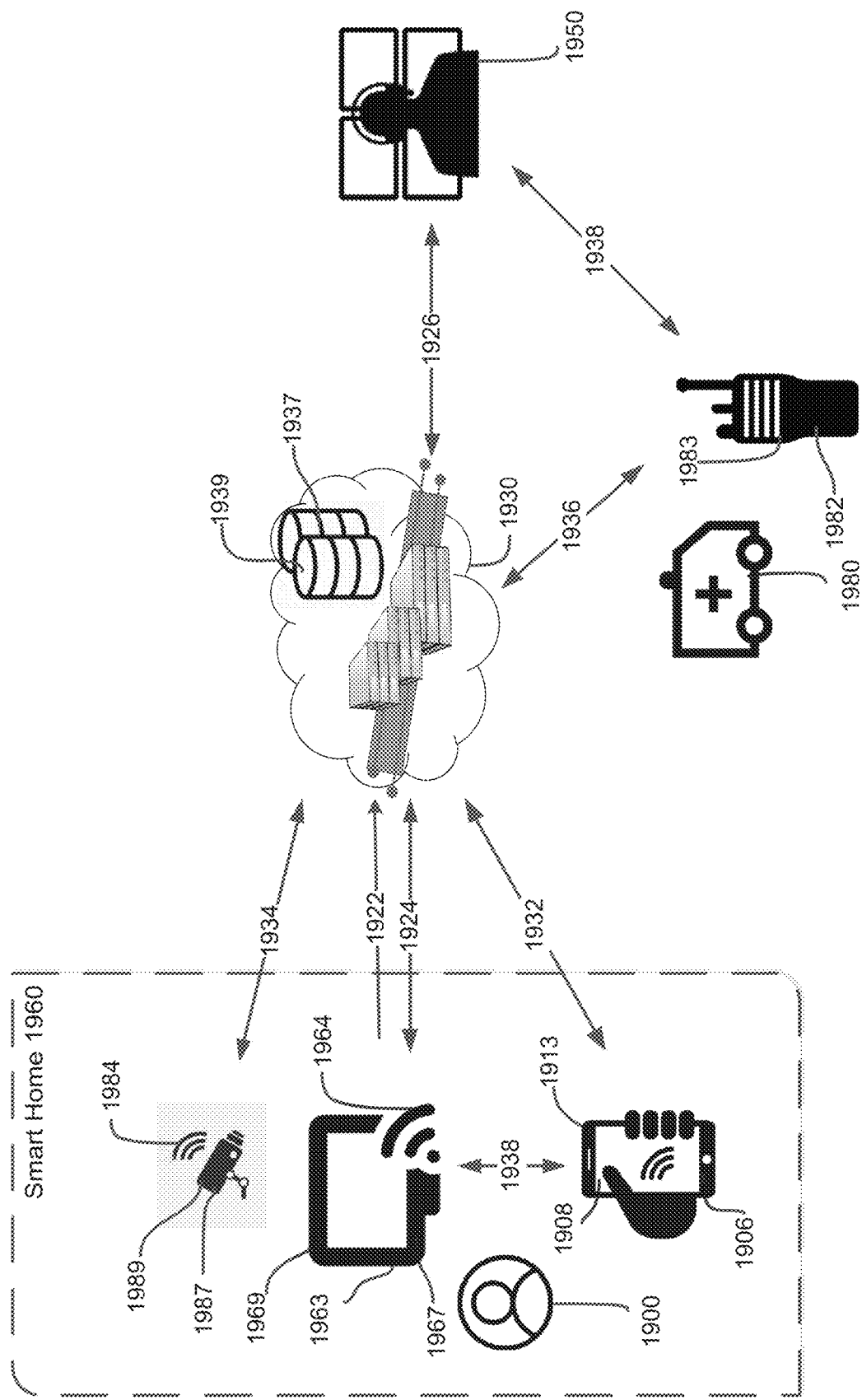
FIG. 19 depicts an exemplary embodiment of a voice-activated emergency alert from a user in a smart home.

FIG. 19 depicts embodiments of a voice-activated emergency alert from a user in a smart home. The triggering device may be a device with audio capabilities (e.g. a microphone and/or speakers) and a network component (e.g. Wi-Fi, Ethernet, cable connection) in the smart home 1960. Other triggering devices may be a desktop, a laptop, a tablet, VoIP phone, a smartphone, a digital or virtual assistant, IoT devices (e.g. a smart smoke alarm) or other computing devices capable of receiving voice commands, etc. In some embodiments, the triggering device may be a smart home or smart vehicle or a component thereof. For example, a digital assistant service in a smart home or smart vehicle may be programmed to take voice commands.

The triggering device may be a component of a smart hub. The connectivity to the internet may be managed through a hub (e.g. a smart home hub using a home network using Zigbee, Bluetooth or Wi-fi) and links several devices or sensors. A sensor in the network may make a reading and the smart hub could determine if there is an emergency (include confirmation) and send an emergency alert (or directly initiate an emergency session or call). In one embodiment, the hub may be a command panel with computing capabilities linked to sensors throughout a building via hardwires or other connections (e.g. a commercial fire detection system).

In some embodiments, a smart hub system triggers an emergency alert based on input from various IoT devices in its network. A smart hub can provide easy control through machine-learning and artificial intelligence. In some embodiments, an IoT device does not include a cellular network transceiver radio or interface, and thus may not be configured to directly communicate with a cellular network and may send an emergency alert via indirect communication via another device (e.g. smart phone 1906). In some embodiments, an IoT device may include a cellular transceiver radio, and may be configured to communicate with a cellular network using the cellular network transceiver radio. Exemplary smart hubs include Samsung SmartThings, Amazon Echo, Google Home, Apple Home.

Exemplary IoT devices that can trigger an emergency alert include home automation network devices that allow a user to access, control, and/or configure various home appliances located within the user's home (e.g. a television, radio, light, fan, humidifier, sensor, microwave, iron), or outside of the user's home (e.g. exterior motion sensors, exterior lighting, garage door openers, sprinkler systems).

In some embodiments, network devices is used in other types of buildings, such as a business, a school, a university campus, a corporate park, or any place that can support a local area network to enable communication with network devices. For example, a network device can allow a user to access, control, and/or configure devices, such as office-related devices (e.g. copy machine, printer, fax machine), audio and/or video related devices (e.g. a receiver, a speaker, a projector, a DVD player, a television, or the like), media-playback devices (e.g. a compact disc player, a CD player, or the like), computing devices (e.g. a home computer, a laptop computer, a tablet, a personal digital assistant, a computing device, a wearable device), lighting devices (e.g. a lamp, recessed lighting), security devices associated with a security, devices associated with an alarm system, devices that can be operated in vehicles or mobile devices (e.g. radio devices, navigation devices), etc.

Referring to FIG. 19, for taking voice commands, the TV 1967 is installed with voice or speech recognition software. Voice commands can be quick and efficient for the user to interact with a device as compared to typing on a keyboard, particularly during emergency situations. In some embodiments, voice recognition software may be able to match a user's voice and provide authorization for the call. In some embodiments, participants in the emergency call or emergency connection session may have to obtain appropriate authentication credentials and be granted appropriate permissions during initial registration or setup. For example, voice recognition may allow the adult resident of the home to make the call, but not children. In some embodiments, an authorized user may be required to make an emergency call, which may be done based on recognition of the speaker of the voice command. In some embodiments, the user may authorize the call by entering or voicing a phrase or a code.

The TV 1967 may be installed with sound recognition software for autonomous detection of emergencies. Intelligent noise interpretation may detect emergencies based on sound (alarms, breakage, gunshots, explosion, fire, car crash, etc.) or absence of sound (e.g. no heartbeat, etc.). In some embodiments, the TV 1967 is installed with an application for identifying user-defined sounds such as a clap, a whistle, etc. The device may include a microphone and ability to intelligently interpret noise or sounds. In some embodiments, the sound may be detected using a sound transducer or piezoelectric sensor, LM393 Sound Detection Sensor, or microphones like dynamic microphone, condenser microphone, ribbon microphone, carbon microphone etc.

The software for sound detection or recognition software is generally hosted on the device, in the EMS or on a remote server. In some embodiments, the software has access to a library of sounds or noises either on the device, the EMS or at a remote server. In addition, the software may identify background ambient sounds that do not indicate emergencies.

It may be appreciated that users in a smart home are exposed to different types of ambient noises throughout the day. As a result, relying on a trigger capable to continuously adapting itself to the environment may result in a good detection rate. In some embodiment, the present invention proposes powerful algorithm wakes-up the DSP handling Keyword Spotting regardless of the environment and the distance between the user and the audio-capturing device.

Once a trigger sound or voice command is detected, the software may send an emergency alert and the EMS may try to contact a user who is available to connect to the dispatcher as described in FIGS. 14 and 15. In some cases, the EMS may connect to a dispatcher without a human user on the line.

In some embodiment, a trigger sound or voice command is detected by user uttering one or two words, for example, a "Hey Sam" feature allows users to activate a digital assistant. In some embodiments, a small speech recognizer runs all the time and listens for just those two words. When it detects "Hey Sam", the digital assistant parses the following speech as a command or query. The "Hey Sam" detector may use a Deep Neural Network (DNN) to convert the acoustic pattern of your voice at each instant into a probability distribution over speech sounds. Using a temporal integration, it may then to compute a confidence score that the phrase you uttered was "Hey Sam." If the score is high enough, Sam wakes up.

In some embodiments, the user wakes up the device by saying a key phrase. Hardware, software, and Internet services work together to provide a seamless experience. In some embodiments, the audio detector has several components, many of which are hosted "in the Cloud", including the main automatic speech recognition, the natural language interpretation and the various information services. There are also servers that can provide updates to the acoustic models used by the detector.

In some cases, once a trigger sound or phrase is detected, the software requests or asks for confirmation from a user before sending the alert. For example, the software may alert the user that it is primed (or on standby) for sending the alert and request confirmation (e.g. TV is muted, would you like to connect to emergency services?"). In some cases, voice recognition authenticates the identity of the user. In other cases, the user has provided instructions to skip "ask or request confirmation" (e.g. gun shots have triggered the system) and the emergency alert will be sent immediately after the trigger sound or phrase is detected.

In some embodiments, an emergency call is authorized by a two-tiers of confirmation: (tier i) emergency triggered by a user (e.g. by voice command) or autonomously by the triggering device (e.g. a trigger sound detection); followed by (tier ii) emergency that is authorized by a user (e.g. user may authorize using a pin, a passcode, speech recognition, face recognition, a fingerprint, etc.). In some embodiments, authorization need not be provided in real time. For example, a user may have provided pre-authorization for sending an emergency alert for some types of emergencies. In some cases, the EMS may decide to send the alert to one or more recipients (including emergency contacts) after evaluating the severity and likelihood of emergency.

As shown in FIG. 19, the triggering device is a connected TV or smart TV 1967 with a computer program 1969 for sending an emergency alert. The TV 1967 includes a network component 1964 which may be an Ethernet connection, Wi-Fi connection cellular connection, etc. for communicating with the EMS 1930. The emergency alert is sent to the EMS 1930 via communication link 1922. The EMS 1930 may call back and get data (e.g. user data, location data, emergency data) from the device 1967 via the two-way communication link 1924.

In some embodiments, the TV 1967 sends the emergency alert using communication device 1906, e.g. user 1900's mobile phone. In some embodiments, the communication device 1906 has a better connection to the EMS 1930 and has computer program 1908 for sending the emergency alert. The emergency alert may contain location information and other information about the emergency, for example, user 1900 may have entered the address of smart home 1960 previously or the device-based hybrid location of the communication device 1906 may be included.

The emergency response provider (e.g. a PSAP, an emergency responder, a private dispatcher) is configured to receive emergency calls within its geographical jurisdiction. Based on the location and (optionally, the type of emergency, or other factors) the EMS 1930 may determine the appropriate dispatcher 1950 (e.g. an emergency dispatch center such as the local PSAP, other public emergency response agency, private emergency response service, etc.) for establishing an emergency session or call.

In some embodiments, the system further comprises a sensor or IoT device database storing data collected by at least one sensor. For example, the EMS optionally searches for other devices in the smart home 1960 by searching for the user name or location within one or more databases (e.g. user information database 1939, location database 1937 or an associated device database 1235 (not shown) or other databases). When a device such as video camera 1987 is identified, the EMS 1930 may request access to the video feed. In some embodiments, the video feed is from the camera 1987 and is accessed from a cache 1989 on the device or associated device. The video camera 1987 may be connected to the internet via network component 1984 and the video feed may be stored in the cloud. Transfer of the video feed requires connections with sufficient bandwidth (e.g. Wi-fi, 3G or 4G cellular data, etc.). Thus, real-time video feed from the emergency location may be available to the EMS 1930. In some embodiments, historical video feed may also be accessed to gain situational awareness regarding the emergency.

In some cases, the video feed from the emergency location is available to the EDC 1950 and to emergency responders 1980 via a responder device 1982. The device 1982 may be installed with software 1983 for receiving information about the emergency from the EMS 1930 or from the EDC 1950. The communication link 1936 may provide a secure pathway between the EMS 1930 and the responder device 1982 (without sending the data through a dispatch center). In some embodiments, the IoT device sends the sensor data directly to an emergency responder, a public safety network, emergency responder device, or other emergency response systems (not shown).

In some embodiments, the EMS 1930 sends the sensor data (e.g. video feed) to one or more emergency responder devices (e.g. vehicle console, walkie talkies, mobile phones, tablets, etc.). The EMS 1930 may check the credentials of the recipient devices and send the data through secure pathways. In some embodiments, the data may be made available to supervisors, managers, dispatchers and responders to access. The EMS may evaluate and determine whether to make data available and to which emergency responders based on credentials. For example, access to medical data may be limited to EMTs during a medical emergency and may not be available to police or fire personnel. The EMS may also provide access to the data to emergency responders based on their proximity to the location of the emergency. Thus, the emergency responders and other private parties with permission (e.g. home security companies, emergency contacts) may be given have access to real-time video feed from the emergency location to determine the number of people in the area and other situational awareness for effective emergency response.

Confirmation or Verification of the Emergency

In some embodiments, the trigger (e.g. voice command or sensor data) is followed by a confirmation or verification of the emergency. For audio (voice command or sound) triggers, it may be necessary to get a confirmation of the emergency to prevent frivolous emergency calls to public safety. Generally, there are many ambient sounds and noises that may trigger the emergency alert, but the situation is not an emergency. The confirmation or verification step may be designed to prevent false alarms. In some embodiments, the confirmation may be user-defined or chosen from a list of confirmation options. For example, a sensor detects an emergency automatically or by voice command. It may send an alert to another device (e.g. a smart home hub, a computer, smart phone, etc.), to a system (e.g. EMS) or a corporate entity (e.g. campus security) or specific individuals (e.g. emergency contacts, fire marshals, etc.).

Confirmation of the emergency can be done in various ways including voice confirmation, security code, fingerprinting, face recognition, or through the use of sensors. For example, the user may be asked to verbally confirm the emergency or by pressing a button.

In some embodiments, the alert is sent to a third-party such as an emergency contact, a loved one, a corporate representative, an alarm monitoring company, a private response system, etc. The third party may be asked to verbally or press a button to confirm the emergency.

In some embodiments, sensor data is used to confirm the emergency. For example, if a user commands "Call 911" and an alert is sent to the EMS. For example, the emergency may be confirmed by identifying that nearby smoke detectors are going off. In another example, the emergency may be confirmed by audio or video feed from the emergency location. For example, audio or video feed may confirm movements inside the building, location of specific objects and people in the home (e.g. a headcount), etc. In one example, when a trigger device detects a falling individual, a central device or EMS may determine whether the individual was a person or an animal and potentially identify the individual.

In some embodiments, the initial alert will activate other sensors in the area to capture situational awareness regarding the emergency. For example, the secondary sensors that could be activated to detect environmental parameters (e.g. temperature, moisture, smoke, toxins, etc.) or health parameters (e.g. heart rate, pulse, peripheral capillary oxygen saturation, blood pressure, blood sugar).

In some embodiments, the verification step may be conducted after connecting with the triggering device or another device. For example, the triggering device has "voice-calling" ability (e.g. VoIP) such as a smart phone, smart TV or smart speaker), the emergency call may be connected directly to the user, who can confirm the emergency. In some embodiments, the triggering device does not have voice-calling capability (e.g. IoT sensor, crash detection sensor, smart home hub, etc.) and the verification may be done by calling a known phone number for the user or owner. In some cases, the alert may also be sent using a nearby communication device (e.g. a smart phone).

In some embodiments, the emergency session or call is made to public safety (e.g. appropriate PSAP). After receiving the emergency alert, the EMS may determine the appropriate PSAP based on the location of the emergency and the jurisdictional boundaries of PSAPs. In some cases, other factors may be considered when choosing an appropriate EDC such as type of emergency, severity or priority of the emergency (e.g. need for ambulance), etc. In some embodiments, the situation may not rise to the level of an emergency and notifying third parties may be appropriate. In some cases, the emergency call is made to a third-party security service (e.g. corporate or campus security) or a private response system and the verification step may not be needed.

The present methods and systems disclose partially or fully integrated solutions emergency management systems, dispatch centers and triggering devices. Previous systems were not integrated and could not provide secured pathways, user privacy and software compatibilities. In some embodiments, partial integration with a dispatch center or emergency responder may involve adding the emergency management system as a "trusted link" on their systems or devices. In some embodiments, end-to-end software solutions are beneficial, e.g. for video feed from sensor to be available to emergency responders.

Figure 20:
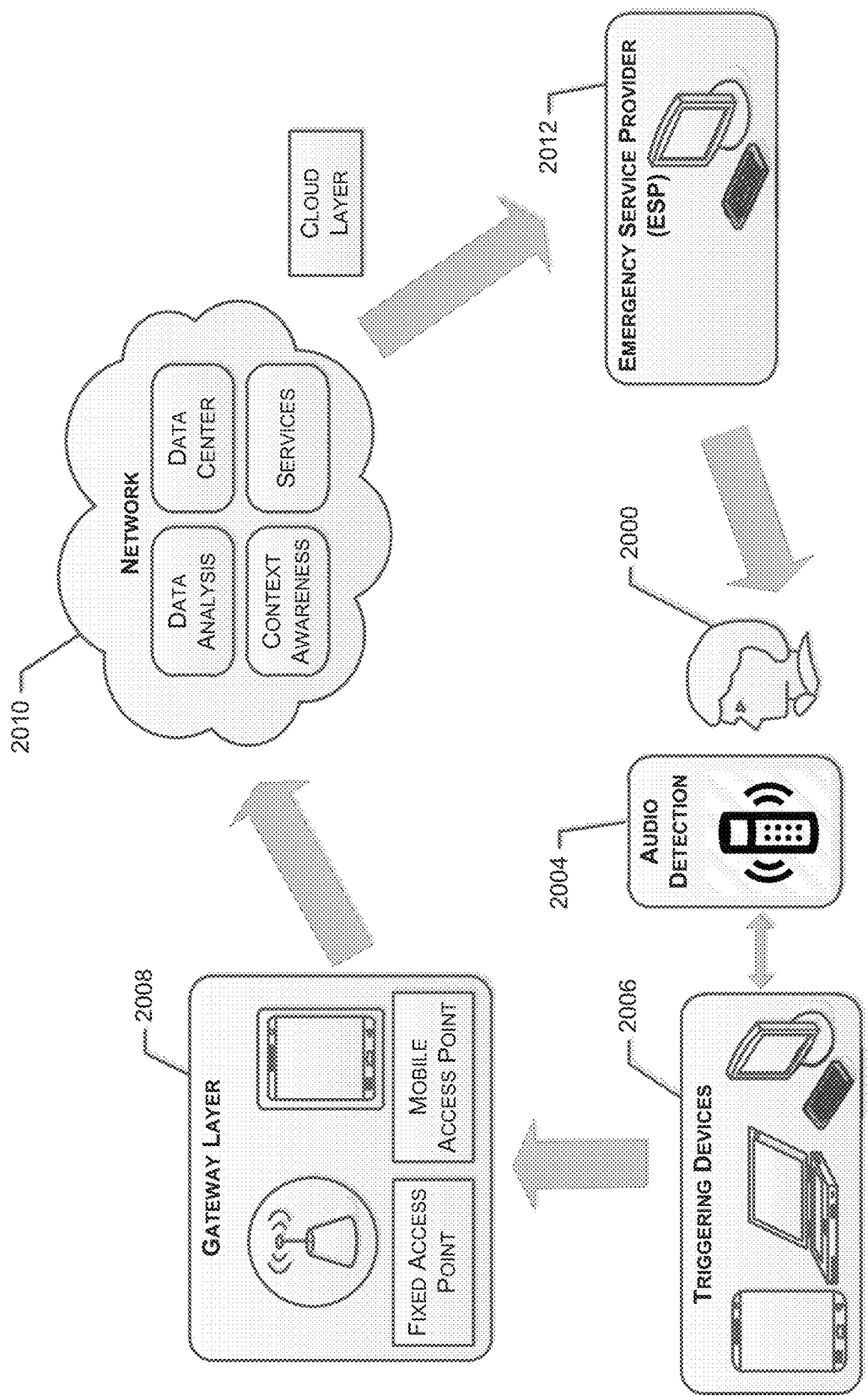
FIG. 20 depicts a system for requesting emergency assistance by voice activation.

FIG. 20 depicts a system for requesting emergency assistance by voice activation by a user 2000. As shown, a user 2000 initiates an emergency using an audio detector 2004 (e.g. smart speakers) by giving a voice command for calling emergency as described in FIGS. 21A & 21B.

For analyzing the voice command, speech recognition software may be installed on the device 2014, or on the triggering devices 2006, or in a cloud-based system (not shown). The speech recognition software in the devices 2006 may use keyword spotting to analyze the voice command. Upon detecting a voice command, the audio detector 2004 can trigger the audio file(s) to one or more nearby triggering devices 2006. In an example, the triggering devices 2006 (e.g. smart phone, laptops, desktop). The triggering devices 2006 may perform an analysis of the audio(s) received from the audio detector 2004 to confirm the emergency. In some cases, an additional confirmation from the user 2000 may be prompted such as a voice confirmation, fingerprint, etc. In some cases, the match of the voice command to the user's voice by a voice recognition software may confirm the emergency without need for confirmation. In other cases, the analysis may consider the user's habits, other sensor data, user preferences to make a decision about whether to send the emergency alert. In some embodiments, the audio detector 2004 is a component of the triggering device 2006. After the emergency is confirmed, the triggering device 2006 using its communication capabilities transmits the emergency alert to one or more emergency service provides (ESPs) 2012 using one or more gateways 2008 having one or more access devices like routers, switches, gateway devices, etc. through the network 2010. In some embodiments, the network 2012 is partially or fully in the cloud. The emergency alert may comprise location data, user data, sensor data and/or additional data. Upon receipt of the emergency event the one or more emergency service provides (ESPs) 2012 can send emergency help to the user 2002.

Figure 21A:
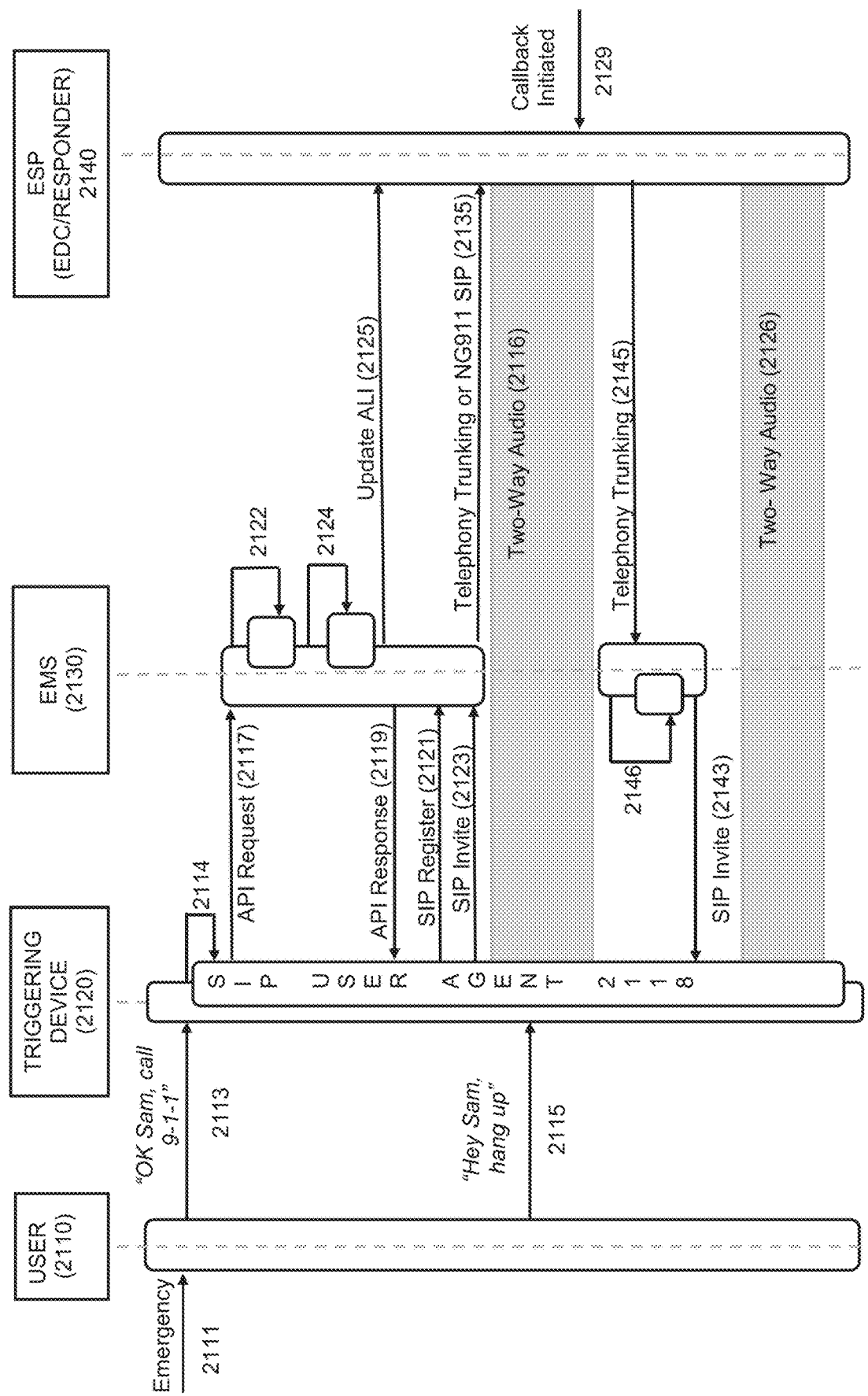
FIG. 21A depicts an exemplary implementation of an emergency call initiated by voice activation.
Figure 21B:
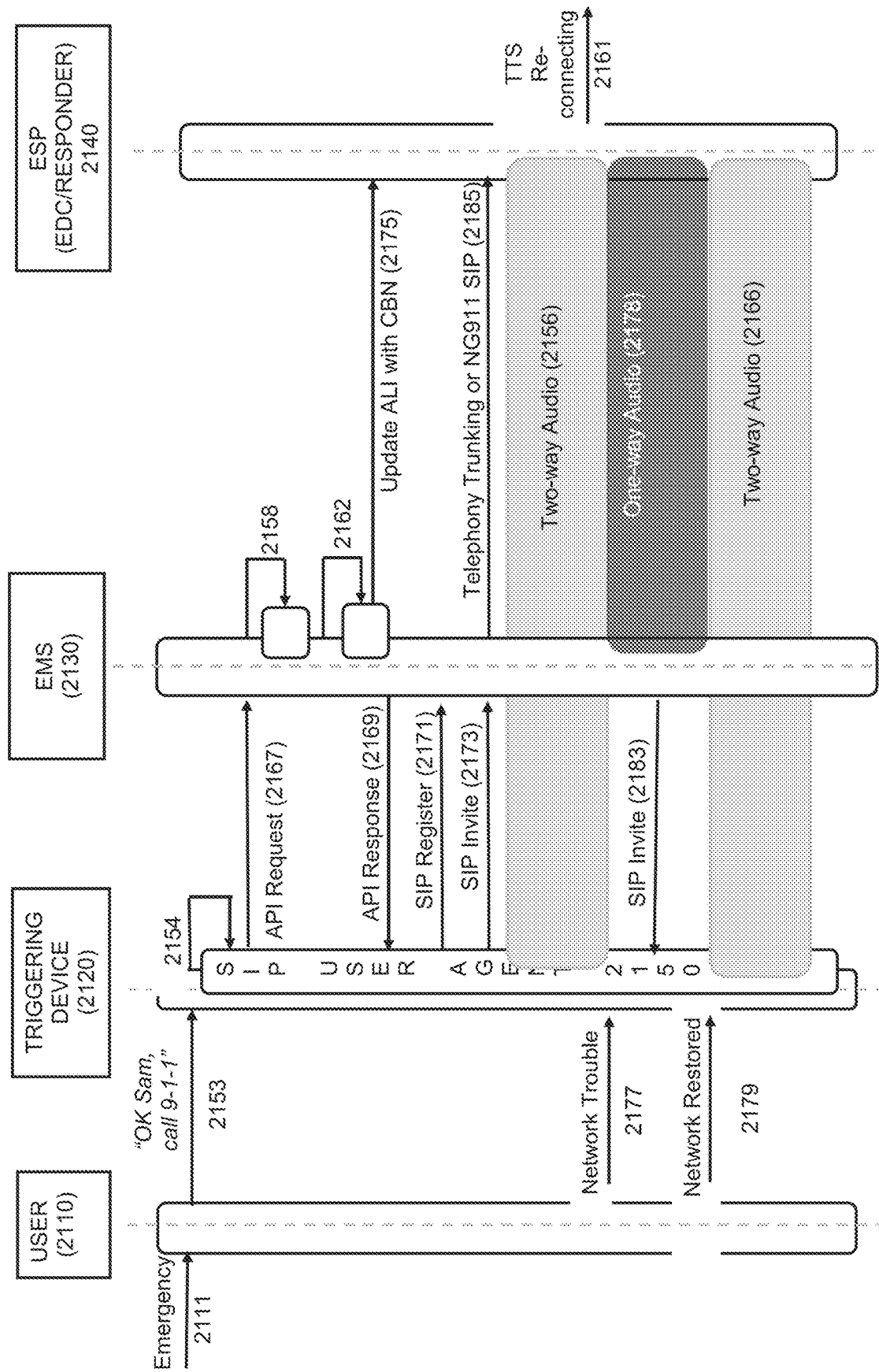
FIG. 21B depicts another exemplary implementation of an emergency call initiated by voice activation.

FIGS. 21A and 21B depicts an exemplary implementation of an emergency call initiated by voice activation. In some embodiments, a triggering device 2120 is activated when an emergency situation arises 2111 when a user 2110 gives a voice command 2113 "Ok Sam, call 9-1-1." Although not shown, an audio detector may be a part of the triggering device 2110 or a separate device. For example, the voice command 2113 may be detected by a smart speaker with a digital assistant when the user 2110 utters the trigger phrase "Ok Sam, call 9-1-1." In some cases, "OK Sam" may be a wakeup command after which the digital assistant may be primed for a voice command "call 9-1-1." Alternatively, the triggering device 2120 may be activated by trigger sounds (e.g. gunshots) to initiate an emergency alert.

In some embodiments, the triggering device 2120 transmits the emergency alert to an EMS 2130 with data regarding the emergency (e.g. user data, location data, sensor data, additional data, etc.). In some cases, the triggering device 2120 may prompt the user to confirm or verify the emergency before sending the alert. In some case, the EMS 2130 may require the user to confirm or verify the emergency.

For example, after activation, the triggering device 2120 may activate Session Initiation Protocol (SIP) User Agent 2118 through a "setup SIP user agent" 2114 mechanism, which in return sends an API request 2119 to the EMS 2130. In some embodiments, the API request 2119 has inputs "location" and "name" and the output is the SIP endpoint, SIP password, and SIP domain/STUN. In an exemplary embodiment where the triggering device does not have a phone number, upon receipt of API request 2119, the EMS 2130 executes several internal mechanisms such as assign 10-digit phone number for emergency, provision call-back number (CBN) 2122, associate location with CBN 2124, etc. In some other embodiments, the emergency alert may be assigned a phone number associated with the account, which will be used to provision data including location data.

Various mechanisms for providing data to the ESP 2140 are contemplated. In some embodiments, the ALI record (including location for the CBN is updated 2125, which will be provided to the ESP 2140. In other embodiments, the data may be pushed out the ESP 2140 directly.

In some embodiments, the EMS 2130 sends an API response 2119 to the triggering device 2120 as an acknowledgement. In some embodiments, the EMS 2139 may make an emergency determination and may decide not to forward the emergency alert to an ESP 2140 if it appears to be a false alarm or prompt the user 2110 to confirm the emergency.

In some embodiments, the SIP user agent registers the session with ESP 2140 using a SIP register 2121 and a SIP invite 2123 commands, which is forwarded by the EMS 2130 (e.g. as a SIP Invite) and Telephony Trunking or NG911 SIP 2135. A two-way audio session 2116 is established where the user 2110 can connect to an ESP personnel to get help. The ESP 2140 can also access the data regarding the emergency including the location data.

A similar SIP session can be initiated from ESP 2140 using the CBN. As shown, the user 2115 has disconnected the call with a voice command, "Hey Sam, hang up" 2115 and the emergency call has ended. Here, "Hey Sam" may be a wake-up phrase. Regardless of the reason for disconnections, a second two-way audio session may be initiated by the ESP 2140 using a call-back initiation step 2129. When the EMS 2130 receives the telephone trunking from the ESP 2140, it looks up the previous association 2146 by getting an endpoint for the CBN and returning an SIP endpoint. An SIP invite 2143 could be sent to the triggering device 2120 to initiate another two-way audio session 2126.

Referring to FIG. 21B, an implementation of voice activation is shown where the two-way audio session is interrupted due to network trouble. In some embodiments, a triggering device 2120 is activated when an emergency situation arises 2111 when a user 2110 gives a voice command 2153 "Ok Sam, call 9-1-1." Alternatively, the triggering device 2120 may be activated by trigger sounds (e.g. gunshots) to initiate an emergency alert. In some embodiments, the triggering device 2120 transmits the emergency alert to an EMS 2130 with data regarding the emergency (e.g. user data, location data, sensor data, additional data, etc.)

Similar to scheme in FIG. 21A, the triggering device 2120 may activate Session Initiation Protocol (SIP) User Agent 2150 through a "setup SIP user agent" 2154 mechanism, which in return sends an API request 2167 to the EMS 2130. In an exemplary embodiment where the triggering device does not have a phone number, upon receipt of API request 2167, the EMS 2130 executes several internal mechanisms such as assign 10-digit phone number for emergency, provision call-back number (CBN) 2158, associate location with CBN 2162, etc. In some other embodiments, the emergency alert may be assigned a phone number associated with the account, which will be used to provision data including location data. In some embodiments, the ALI record (including location for the CBN is updated 2175, which will be provided to the ESP 2140.

In some embodiments, the EMS 2130 sends an API response 2169 to the triggering device 2120 as an acknowledgement. In some embodiments, the SIP user agent registers the session with ESP 2140 using a SIP register 2171 and a SIP invite 2173 commands, which is forwarded by the EMS 2130 (e.g. as a SIP Invite) and Telephony Trunking or NG911 SIP 2185. A two-way audio session 2156 is established where the user 2110 can connect to an ESP personnel to get help.

When network trouble begins 2177, the two-way audio session 2156 may get disconnected. Then, the EMS 2130 may maintain the link with the ESP 2140 in a one-way audio session 2156 in order to continue the current emergency session. In many cases, if a new session is started, the user 2110 may be connected with another ESP personnel, who will have to be brought up to speed regarding the emergency losing precious minutes. However, in this way, the specific ESP personnel may be informed to stay on the line using a text-to-speech message 2161, while the EMS 2130 attempts to reconnect with the user 2110.

In some embodiments, the EMS 2130 may send a SIP invite 2183 to the triggering device 2110. In some embodiments, the SIP invite may be sent periodically for a period of time. When the network is restored 2179, the triggering device 2110 receives the invite and the two-way audio session 2166 is re-started. In some embodiments, the first audio session 2156 is resumed after the short delay.

FIG. 22 depicts an exemplary view of information displayed at an emergency dispatch center (e.g. PSAP). As shown, the name and contact information for a corporate representative making the call on behalf of a user (a proxy call) is displayed. In addition, the name, address, phone number for the operations center for the corporation is also listed. In some embodiments, the location (x, y coordinates, accuracy) of the user in the emergency situation is displayed at the PSAP. Specifically, the ALI view is depicted in FIG. 22, but other displays are contemplated including displays with tabs and windows and a map view.

FIGS. 23A and 23B depict exemplary screenshots for an interface for testing emergency flows. FIG. 23A shows the "code view" for the flow and FIG. 23B shows the "ALI display" that is shown on a PSAP display (e.g. EDC 450 in FIG. 4). In some embodiments, the Emergency Console is a web application that users (e.g. administrators) can access through an internet browser (e.g. Internet Explorer, Google Chrome). In some embodiments, the Emergency Console is a desktop application that can be accessed offline. In addition to the graphical user interface 673 (see FIG. 6) in which users can configure emergency flows, the Emergency Console may include a dashboard where users can view, test, and manage their emergency flows. In some embodiments, users can select emergency flows from a drop-down list, as depicted in FIG. 23. In the example depicted in FIG. 23, the selected emergency flow is called "company_contacts." In some embodiments, once an emergency flow is selected, the dashboard automatically populates with information regarding the selected emergency flow. In some embodiments, the information regarding the selected emergency flow includes user names, contact names, and associated accounts (e.g. phone numbers, email accounts). In some embodiments, after an emergency flow is selected, the Emergency Console displays data pertaining to the selected emergency flow. For example, in some embodiments, the Emergency Console displays an emergency flow history (such as from the emergency flow history database described above with respect to FIG. 3) including an entry for every individual execution of the selected emergency flow. An entry optionally includes data including, but not limited to: the day and time that the selected emergency flow was executed, what type of triggering device sent the emergency alert that triggered the execution of the selected emergency flow, an identity of the user associated with the triggering device, which contacts were contacted, if a party opted to contact an emergency responder, if an emergency responder was contacted, if contacting an emergency responder was successful or unsuccessful, which party opted to contacted an emergency responder, how long the execution of the selected emergency flow lasted, or combinations thereof. In some embodiments, the emergency flow history includes additional data pertaining to the selected emergency flow including, but not limited to: the average length of the execution of the selected emergency flow, the total number of times the selected emergency flow has been executed, the absolute number of false positives (e.g. how many times the selected emergency flow was triggered and then promptly canceled), the percentage of false positives (e.g. the absolute number of false positives divided by the total number of times the selected emergency flow has been executed), the absolute number of times and percentage that an EDC was contacted, the number of times the selected emergency flow failed, or combinations thereof.

In some embodiments, as depicted in FIGS. 23A & B, the dashboard includes a code example tab, an API request tab, and an ALI display tab. FIG. 23A depicts an exemplary view of a dashboard within the Emergency Console when the code example tab is selected. In some embodiments, the code example tab displays the script that defines the selected emergency flow. FIG. 23B depicts an exemplary view of a dashboard within the Emergency Console when the ALI display tab is selected. In some embodiments, the ALI display tab depicts a simulation of information displayed at an emergency dispatch center (e.g. PSAP) generated by the selected emergency flow.

Authentication

In some embodiments, the EFMS authenticates requests using a short-lived OAuth 2.0 access token granted using application client credentials. The token is valid for authenticating requests to the EFMS for a temporary duration of time (e.g. one hour), after which a new token for future requests will need to be fetched. Details for retrieving and using one of these tokens are described below.

(i) Getting an Authentication Token

POST https://api-sandbox.rapidsos.com/oauth/token

Request

Headers

Content-Type: x-www-form-urlencoded

Parameters client_id: Client ID of an application authorized to use the service client_secret: Client secret of an application authorized to use the service grant_type: client credentials Response Fields (access token: Short-lived OAuth 2.0 access token)

(ii) Using an Authentication Token

To authenticate requests using an access token, requests typically must include an Authorization header set to the value Bearer <ACCESS-TOKEN> where <ACCESS-TOKEN> is substituted for the retrieved access token.

(iii) Triggering/Initiating Emergency Flow

The logical entity triggering the emergency flow (e.g. a mobile application, service backend, or any connected device) will trigger the emergency flow with a single API call as described below.

POST https://api-sandbox.rapidsos.com/v1/rem/trigger

Request

Headers (Authorization: Bearer <ACCESS-TOKEN>; Content-Type: application/json); Parameters (emergency flow: The name of the emergency flow to execute; variables: JSON Object defining any variables that you have defined and use in your emergency flow).

Response: Fields (code: Status code of the emergency flow initiation; id: Unique identifier of the instance (e.g. the particular emergency flow session) of the emergency flow execution; message: Human-readable descriptor of the emergency flow status)

Exemplary Markup Language for Emergency Flows—REML (Proprietary Emergency Markup Language)

As discussed above, in some embodiments, emergency flows are defined by scripts written in a programming language. In some embodiments, the programming language used to write the scripts is the YAML (YAML Ain't Markup Language) language or a derivative thereof. In some embodiments, the programming language used to write the scripts is the RapidSOS Emergency Markup Language (REML). The REML language may be used to define a REML state machine. In some embodiments, the REML state machine may be specified by a "states" tag. Each REML state includes the following main items including name of state, description of state, action to be executed, action inputs (also referred to as arguments), variable name to store the results of the action, transitions based on the result of the action (e.g. which state to move to). An exemplary schema describes the syntax of a state:

```
name: <string>
description: <string>
action: <string>
inputs:
    name1: value1
    name2: value2 ...
store: <string>
on_output:
    result1: <string>
    result2: <string> ...
goto: <string>
log: <string>
```

Table 1 describes optional REML tags below.

TABLE 1

REML Tags

| Tag | Description |
| --- | --- |
| Name | Name of a state |
| Description | Nonfunctional, descriptive comment of what a state accomplishes |
| Action | Name of the action to run i this state |
| Inputs | Map of variables to provide the action as input parameters |
| Store | Name of a variable to store the result of the action |
| on_output | Map of name/values to specify the state transition |
| Goto | Specify transition (if there's no match with "on_output") |
| Log | Mostly Troubleshooting add a customer log for this state |

In addition to the current states, there are two built-in states that can be used to stop execution of state-machine: (i)_STATE_END_: specify successful execution of state-machine; (ii) _STATE_ERROR_: specify unsuccessful execution of state-machine.

The built-in states are optionally used in various scenarios: one of the built-in states can be specified in the script; in case of an error—the system will force transition to _STATE_ERROR_; when your state-machine ends—the state-machine will automatically move to _STATE_END_.

In some embodiments, a "transition" is used for determining the "next state". In order to demonstrate a simple transition, consider the next example of a state:

```
name: example-state
action: PLUS
inputs: { a: 1, b: 2 }
    on_output:
    3: ___STATE_END___
    goto: ___STATE_ERROR___
```

In this example, the PLUS action is run with inputs a=1" and b=2. If the result is 3 (as expected), the transition moves to the _STATE_END_state, otherwise the transition moves to the _STATE_ERROR_state. This example shows that the "on_output" acts as an "if statement" for the action's result.

In some embodiments, transition from one state to another is determined by the following factors: the result of an action: REML will try to match the result of the action with one of the "on_output" entries. In case of a match—the next state; External events (e.g. while executing an action, the REML system can send events to your state-machine. During a phone-call between two users, each user can hang up the call regardless of the state. To handle such hang-up events and decide what is the next state based on the user who hung up the call, transitions are used. The same "on_output" tag may be used to handle events—just like the action=results); the "goto" tag—if there is no "on_output" match, the user can specify the "default next state" using the "goto" tag; if the user hasn't specified goto—the system will move to the next state in the list.

REML Actions

In some embodiments, there is a single action that can be executed (e.g. telephony operations, control actions, data actions) for each machine state. Non-limiting examples of telephony operations includes CALL, EMERGENCY CALL, HANGUP, PLAY, STOP PLAYBACK. In some embodiments, EMERGENCY_CALL is an enhanced version of the "CALL" action. As an example, in some embodiments, for EMERGENCY_CALL, the Admin or designated representative must provide the location (latitude/longitude), which is optionally passed to the 911 via ALI database and SIP headers; the Admin or designated representative must provide the "caller name", which may be passed to the ALI database; specifying a destination "phone_number" is optional as the emergency-number is known ("test number" for non-production system, 911 for production). If a phone-number is provided, the system will optionally use it as an emergency number.

Non-limiting examples of inputs include: caller_name: name of caller that will be presented to 911; caller_number: phone-number of caller (will be presented to 911); longitude, latitude: location of emergency (will be presented to 911); emergency_number: optional string, the emergency number to call. In some embodiments, the default emergency-number is an answering machine.

In some embodiments, the results include: "true": success—user has answered; "false": failure—user hasn't answered. we do not distinguish between different errors/failures/disconnections.

```
Example: name: call_911
action: EMERGENCY_CALL
inputs: { latitude: 10.10., longitude: -20.20, caller_name="Kai",
caller_number="1234567789" }
on_output:
"true": play-message
"false": die
```

Another exemplary REML action is FAILSAFE. A FAILSAFE action for handling different types of failures can be formulated. In some embodiments, a failure is either triggered by the system (e.g. 9-1-1 not answering) or by the emergency flow (e.g. explicitly triggered by the emergency flow author).

In some embodiments, the FAILSAFE action instructs the system to post an HTTP request to a backend system provided by the emergency flow author and then immediately terminates the session, and therefore the on_output section is not applicable and not needed.

In order to initiate a fail-safe procedure, some embodiments of the emergency flow include failsafe metadata. Two embodiments the FAILSAFE action—the minimal one and the advanced one—are described below. A minimal failsafe requires a URL and a failsafe-reason as shown below. In this minimal case, the action will trigger a POST request to the URL provided by the author and the emergency flow will be terminated. As a request-body, the system will provide the 'reason' in JSON dictionary.

In some embodiments, composite actions are formulated. Composite actions decompose into a series of smaller actions before they are executed by the EFMS. In some embodiments, individual emergency flow building blocks are defined by a single REML action. In some embodiments, individual emergency flow building blocks are defined by composite actions. INTERACTIVE_CALL and CALL_LOOP are exemplary composite actions.

In some embodiments, the INTERACTIVE_CALL action decomposes into CALL, PLAY, AND WAIT actions. In cases where a user should be called, and an audio message played to them while a DTMF tone is waited on to further the emergency flow to the next state, a composite action can be used.

In some embodiments, inputs may include: phone_number: string, the phone-number to call; playback: media-resource to play; text: Text (string) to speech; time: Time to wait in seconds after the playback has stopped.

An exemplar INTERACTIVE_CALL action is shown below.

```
action: INTERACTIVE_CALL
inputs: {phone_number: "${phone_number}", text: "${text}"}
on_output:
    "false": fail_state
    "HANGUP@${phone_number}": fail_state
    "#1@${phone_number}": next_state
```

In some embodiments, the CALL_LOOP action decomposes into a list of actions that perform a loop through a list of dictionaries that each contain a phone number of a user to call. When the users are called, an audio is played to them, and they can hit a dtmf to break out of the loop. The final callee dict that is called during the loop is optionally saved in the variable given in the store parameter after the CALL_LOOP runs.

In some embodiments, REML includes some specific events to handle cases where two users are contacted simultaneously. For example, HANGUP@<phone>: a hang-up event from user; #<num>@<phone>: DTMF event from user.

In some embodiments, three players are connected in an emergency call. First, the user is called. When the user picks up the call, a message is played (e.g. "press 1 to connect . . . "). Once the user press '1', a corporate call center or representative may be called and during their call—if anyone hits '9', an emergency call is made and connected to the appropriate PSAP (based on location), so that there can be three or more participants in the conference emergency call or session.

There are cases where there may be several stakeholders or several individuals with interest and/or information regarding an emergency situation. Thus, it will be advantageous to connect the stakeholders in one emergency conference call. However, setting up a conference call with two or more participants has its challenges. For example, one participant may hang up before another participant has joined. To deal with such challenges, a communication bridge can be used as described below.

In some embodiments, two or more participants may be added to an emergency conference call or emergency session on the communication bridge (as shown in FIGS. 7 & 11). In some embodiments, two or more participants may be added to an emergency conference call on the conference bridge (as shown in FIGS. 9 & 10). As shown in FIG. 10, a customer service representative at an organization's operations center is contacted first and added to the communication bridge, if they agree to be connected to an EDC. Then, the "emergency contact" or "associated contact" is called and if they choose to connect to an EDC, an ESP personnel is called and connected to the communication bridge. In some cases, the user may also be called and added to the communication bridge. In some embodiments, specialized events for setting up the communication bridge are contemplated including "hangup" and "Dual-tone multi-frequency signaling (DTMF)" for playing an audio message while a user is allowed to make an input (where the input can be stored as a variable for later use) and maintaining the call even when one user hangs up.

In some embodiments, the participants in an emergency call are selected from a user, an associated contact, an emergency contact, an organizational representative, a customer service representative, an ESP personnel. In some embodiments, the emergency conference session is a three-way conference call including a user, a corporate representative and a PSAP operator.

Audio Activation Embodiments

In one aspect, provided herein is a system for emergency communications comprising: (a) a triggering device detecting an audio emergency trigger and sending an emergency alert to the emergency management system; and (b) at least one server providing a server application at the emergency management system, said server application. In some embodiment, the server application is configured to perform the steps of: (i) receiving the emergency alert from the triggering device; (ii) determining a callback number for the triggering device, wherein the callback number is selected and assigned to the triggering device when the triggering device does not have a phone number; (iii) determining a location of the triggering device, pairing the location with the callback number, and updating a location database that can be made accessible to emergency service providers with the paired location and callback number; (iv) identifying an appropriate emergency service provider for responding to the emergency alert based on at least one of the location of the triggering device, a source of the emergency alert on the triggering device, and an emergency indication; and (v) facilitating an emergency communication session between the triggering device and the appropriate emergency service provider, wherein the callback number enables the session with the triggering device to be re-established after the session is disconnected. In some embodiments, the audio emergency trigger is a voice command. In some embodiments, the emergency alert comprises an API request to the emergency management system to initiate the emergency communication session. In some embodiments, the triggering device is a phone and the callback number is a phone number of the triggering device. In some embodiments, the triggering device is an Internet of Things (IoT) device. In some embodiments, the triggering device is a smart speaker. In some embodiments, the triggering device is connected as part of a mesh network. In some embodiments, the triggering device is part of a local network of smart devices. In some embodiments, the local network is a home, office, or business network. In some embodiments, the emergency alert from the triggering device is sent to the emergency management system through a mesh network or an intermediate communication device. In some embodiments, the intermediate communication device is a cell phone or Internet router. In some embodiments, the triggering device gathers emergency information in response to detecting the audio emergency trigger and provides the emergency information to the emergency management system. In further embodiments, the emergency information comprises location information, sensor data, audio, video, user information, emergency contact information, type of emergency, or any combination thereof. In further embodiments, the triggering device gathers the emergency information from one or more devices in a local network. In some embodiments, the location database is an E911 ALI database. In some embodiments, the emergency communication session is a two-way audio session established using SIP protocol. In some embodiments, the triggering device utilizes a voice assistance service to transmit the emergency alert to the emergency management system as an API request. In some embodiments, the server application further comprises a software module re-establishing the communication session upon receiving a request to re-establish communications with the callback number from the emergency service provider. In some embodiments, the triggering device receives sensor data from a network of sensor devices indicative of an emergency situation and attempts to report the emergency situation to a user. In further embodiments, the triggering device attempts to report the emergency situation to the user by broadcasting an audio message. In some embodiments, participants in the emergency communication session are the emergency service provider and an associated device of the triggering device. In further embodiments, the associated device is a communication device associated with the triggering device or a user of the triggering device and is selected from a prioritized list of associated devices to participate in the emergency communication session. In some embodiments, the source of the emergency alert on the triggering device is a mobile application. In further embodiments, the mobile application is a social media application, an emergency application, a messaging application, or an image or video sharing application.

In another aspect, provided herein is a computer-implemented method for facilitating emergency communications comprising: (a) receiving an emergency alert from a triggering device that is sent in response to detection of an emergency audio trigger; (b) determining a callback number for the triggering device, wherein the callback number is selected and assigned to the triggering device when the triggering device does not have a phone number; (c) determining a location of the triggering device, pairing the location with the callback number, and updating a location database that can be made accessible to emergency service providers with the paired location and callback number; (d) identifying an appropriate emergency service provider for responding to the emergency alert based on at least one of the location of the triggering device, a source of the emergency alert on the triggering device, and an emergency indication; and (e) facilitating an emergency communication session between the triggering device and the appropriate emergency service provider, wherein the callback number enables the session with the triggering device to be re-established after the session is disconnected. In some embodiments, the audio emergency trigger is a voice command. In some embodiments, the emergency alert comprises an API request to the emergency management system to initiate the emergency communication session. In some embodiments, the triggering device is a phone and the callback number is a phone number of the triggering device. In some embodiments, the triggering device is an Internet of Things (IoT) device. In some embodiments, the triggering device is a smart speaker. In some embodiments, the triggering device is connected as part of a mesh network. In some embodiments, the triggering device is part of a local network of smart devices. In further embodiments, the local network is a home, office, or business network. In some embodiments, the emergency alert from the triggering device is sent to the emergency management system through a mesh network or an intermediate communication device. In further embodiments, the intermediate communication device is a cell phone or Internet router. In some embodiments, the triggering device gathers emergency information in response to detecting the audio emergency trigger and provides the emergency information to the emergency management system. In further embodiments, the emergency information comprises location information, sensor data, audio, video, user information, emergency contact information, type of emergency, or any combination thereof. In further embodiments, the triggering device gathers the emergency information from one or more devices in a local network. In some embodiments, the location database is an E911 ALI database. In some embodiments, the emergency communication session is a two-way audio session established using SIP protocol. In some embodiments, the triggering device utilizes a voice assistance service to transmit the emergency alert to the emergency management system as an API request. In some embodiments, the server application further comprises a software module re-establishing the communication session upon receiving a request to re-establish communications with the callback number from the emergency service provider. In some embodiments, the triggering device receives sensor data from a network of sensor devices indicative of an emergency situation and attempts to report the emergency situation to a user. In further embodiments, the triggering device attempts to report the emergency situation to the user by broadcasting an audio message. In some embodiments, participants in the emergency communication session are the emergency service provider and an associated device of the triggering device. In further embodiments, the associated device is a communication device associated with the triggering device or a user of the triggering device and is selected from a prioritized list of associated devices to participate in the emergency communication session. In some embodiments, the source of the emergency alert on the triggering device is a mobile application. In further embodiments, the mobile application is a social media application, an emergency application, a messaging application, or an image or video sharing application.

In another aspect, provided herein is a non-transitory computer readable storage media encoded with at least one computer program including instructions executable by at least one processor to perform steps comprising: (a) receiving an emergency alert from a triggering device that is sent in response to detection of an emergency audio trigger; (b) determining a callback number for the triggering device, wherein the callback number is selected and assigned to the triggering device when the triggering device does not have a phone number; (c) determining a location of the triggering device, pairing the location with the callback number, and updating a location database that can be made accessible to emergency service providers with the paired location and callback number; (d) identifying an appropriate emergency service provider for responding to the emergency alert based on at least one of the location of the triggering device, a source of the emergency alert on the triggering device, and an emergency indication; and (e) facilitating an emergency communication session between the triggering device and the appropriate emergency service provider, wherein the callback number enables the session with the triggering device to be re-established after the session is disconnected. In some embodiments, the audio emergency trigger is a voice command. In some embodiments, the emergency alert comprises an API request to the emergency management system to initiate the emergency communication session. In some embodiments, the triggering device is a phone and the callback number is a phone number of the triggering device. In some embodiments, the triggering device is an Internet of Things (IoT) device. In some embodiments, the triggering device is a smart speaker. In some embodiments, the triggering device is connected as part of a mesh network. In some embodiments, the triggering device is part of a local network of smart devices. In further embodiments, the local network is a home, office, or business network. In some embodiments, the emergency alert from the triggering device is sent to the emergency management system through a mesh network or an intermediate communication device. In further embodiments, the intermediate communication device is a cell phone or Internet router. In some embodiments, the triggering device gathers emergency information in response to detecting the audio emergency trigger and provides the emergency information to the emergency management system. In further embodiments, the emergency information comprises location information, sensor data, audio, video, user information, emergency contact information, type of emergency, or any combination thereof. In further embodiments, the triggering device gathers the emergency information from one or more devices in a local network. In some embodiments, the location database is an E911 ALI database. In some embodiments, the emergency communication session is a two-way audio session established using SIP protocol. In some embodiments, the triggering device utilizes a voice assistance service to transmit the emergency alert to the emergency management system as an API request. In some embodiments, the server application further comprises a software module re-establishing the communication session upon receiving a request to re-establish communications with the callback number from the emergency service provider. In some embodiments, the triggering device receives sensor data from a network of sensor devices indicative of an emergency situation and attempts to report the emergency situation to a user. In further embodiments, the triggering device attempts to report the emergency situation to the user by broadcasting an audio message. In some embodiments, participants in the emergency communication session are the emergency service provider and an associated device of the triggering device. In further embodiments, the associated device is a communication device associated with the triggering device or a user of the triggering device and is selected from a prioritized list of associated devices to participate in the emergency communication session. In some embodiments, the source of the emergency alert on the triggering device is a mobile application. In further embodiments, the mobile application is a social media application, an emergency application, a messaging application, or an image or video sharing application Waterfall Calling Embodiments In one aspect, provided herein is a system for emergency communications comprising: (a) triggering device of a user transmitting an emergency alert when an emergency is triggered; and (b) at least one server providing an emergency management system server application. In some embodiments emergency management system server application: (i) maintains at least one database comprising a at least one associated device for the triggering device; (ii) receives the emergency alert from the triggering device; (iii) establishes a connection with the triggering device upon determining that the triggering device is able to host a connection with the server; and (iv) connects to the at least one associated device in the list, wherein the at least the one associated device is authorized by the user to be connected to the at least one dispatch center for requesting emergency assistance. In some embodiments, the server application connects to at least two associated devices concurrently. In some embodiments, the server application attempts to connect with the triggering device before connecting with the at least one associated device. In some embodiments, the database comprises a prioritized list having a plurality of associated devices. In further embodiments, the server application connects to a next associated device in the prioritized list in order of priority when a connection with a preceding associated device is unsuccessful. In some embodiments, the server application looks up an associated device by querying the at least one database using an identifier for the emergency alert, wherein the identifier is a telephone number, an email address, a physical address, x-y coordinates, BSSID, SSID, and MAC address of the associated device Temporary Mobile Station Identifier (TMSI), or Internet Protocol (IP) address of the triggering device. In some embodiments, the server application assigns a telephone number to the triggering device. In further embodiments, the phone number is a telephone number of the associated device or a 10-digit number from a pool of inward dial telephone numbers. In some embodiments, the server application establishes an audio call with the triggering device upon determining the triggering device is able to host an audio call. In some embodiments, the user is presented with an option to connect to a dispatch center or disconnect. In some embodiments, the user receives a notification when the emergency alert has been triggered and the server application was unable to connect to the user or emergency contacts. In some embodiments, the emergency alert is triggered autonomously based on sensor data when sensor values exceed a threshold. In some embodiments, the emergency alert is triggered by detection of at least one trigger sound or voice command. In further embodiments, the at least one trigger sound comprises at least one of a gunshot, explosion, breaking glass, person falling, baby crying, police siren, ambulance siren, fire truck siren, outdoor warning siren, and a crash. In further embodiments, the emergency alert is triggered by detection of at least one trigger sound that exceeds a decibel threshold. In some embodiments, the emergency is triggered by user interaction with the triggering device, wherein the user interaction comprises at least one of pressing a soft or hard button, a gesture, or a voice command. In some embodiments, the emergency is triggered by the user giving a voice command, wherein the triggering device recognizes the voice command to detect one or more trigger phrases. In further embodiments, the triggering device confirms user identity using voice recognition. In some embodiments, the triggering device transmits the emergency alert using another communication device through an indirect channel.

In another aspect, provided herein is a method for an emergency management system to connect to a user for providing emergency assistance comprising: (a) maintaining, by the emergency management system, at least one database for lookup of triggering devices and at least one associated device for each triggering device; (b) receiving, by the emergency management system, an emergency alert from a triggering device; (c) determining, by the emergency management system, whether the triggering device is able to host a connection with the user; (d) connecting, by the emergency management system, to the triggering device if the triggering device is able to host the connection; (e) connecting, by the emergency management system, to at least one associated device; and (f) communicating, by the emergency management system, with the user via the at least one associated device for requesting emergency assistance from at least one dispatch center. In some embodiments, the emergency management system maintains a pool of inward dial telephone numbers for assigning to the triggering device for a communication session. In some embodiments, the dispatch center is able to call back to the triggering device or associated device using an assigned telephone number. In some embodiments, the emergency management system attempts to connect with the triggering device before connecting with the at least one associated device. In some embodiments, the database comprises is a prioritized list having a plurality of associated devices. In further embodiments, the emergency management system connects to a next associated device in the prioritized list in order of priority when a connection with a preceding associated device is unsuccessful. In some embodiments, the emergency management system looks up an associated device by querying the at least one database using a telephone number associated with the triggering device. In some embodiments, the emergency management system looks up an associated device by querying the at least one database using one of an email address, physical address, x-y coordinate, BSSID, SSID, and MAC address. In some embodiments, the emergency management system determines an appropriate dispatch center based on the type of emergency, location of emergency and other factors. In some embodiments, the system establishes an audio call with the triggering device upon determining the triggering device is able to host an audio call. In some embodiments, the user is presented with an option to connect to a dispatch center or disconnect. In some embodiments, the emergency alert is sent to the emergency management center indirectly from the triggering device via a communication device. In some embodiments, the emergency alert is triggered autonomously based on sensor data. In further embodiments, the emergency alert is triggered by at least one trigger sound, wherein the trigger sound comprises at least one of a gunshot, explosion, breaking glass, person falling, baby crying, police siren, ambulance siren, fire truck siren, outdoor warning siren, and a crash. In further embodiments, the emergency alert is triggered by detection of at least one trigger sound that exceeds a decibel threshold. In some embodiments, the emergency is triggered by user interaction with the triggering device. In further embodiments, the user interaction comprises at least one of pressing a soft or hard button, a gesture, and a voice command. In some embodiments, the emergency is triggered by the user giving a voice command, wherein the triggering device recognizes the voice command to detect one or more trigger phrases. In further embodiments, the triggering device confirms user identity using voice recognition.

In another aspect, provided herein is a non-transitory computer readable storage media encoded with a computer program including instructions executable by at least one processor to create a server application for connecting a user to at least one dispatch center for facilitating emergency assistance, the application comprising: (a) a software module receiving an emergency alert from the triggering device; (b) a software module maintaining at least one database comprising a list of at least one associated device of the triggering device; (c) a software module establishing a connection with the triggering device upon determining that the triggering device is able to host a connection with the EMS; and (d) a software module connecting to at least one associated device in the list, wherein the at least one associated device in the list is authorized by the user to be connected to the at least one dispatch center for requesting emergency assistance. In some embodiments, the server application connects to at least two associated devices concurrently. In some embodiments, the server application connects with the triggering device before connecting with the at least one associated device. In some embodiments, the list is a prioritized list having a plurality of associated devices.

In another aspect, provided herein is a method for providing the location of an emergency, by an emergency management system, comprising: (a) receiving, by the emergency management system, an emergency alert from a triggering device, wherein the emergency alert does not include location data; (b) searching, by the emergency management system, one or more databases for the location data for the triggering device, wherein the location data is a physical address or a set of x-y coordinates; (c) requesting, by the emergency management system, current location data from the triggering device or at least one associated device; and (d) making, by the emergency management system, the location data available to one or more dispatch centers for providing emergency assistance. In some embodiments, the method further comprises determining an accuracy and confidence for the location data. In further embodiments, the accuracy of the location data is made available to the one or more dispatch centers. In some embodiments, the method further comprises converting the location data into converted location data, wherein the converted location data is in compatible format for the one or more dispatch centers. In some embodiments, an accuracy of the converted location data is evaluated. In some embodiments, the emergency management system queries one or more databases for location data for the triggering device. In some embodiments, the triggering device is installed within a building and the location data associated with the triggering device is saved in one or more databases in the emergency management system. In some embodiments, the triggering device is a mobile device or hosted within a mobile vehicle and the emergency management system obtains the current location data from the triggering device. In some embodiments, the triggering device is a vehicle console or a vehicle computer. In some embodiments, the triggering device is assigned a token, wherein the emergency alert from the triggering device is tagged with the token and the location of the triggering device is provisioned with the user's phone number. In some embodiments, the emergency alert is triggered by detection of at least one trigger sound. In further embodiments, the at least one trigger sound comprises at least one of a gunshot, explosion, breaking glass, person falling, baby crying, police siren, ambulance siren, fire truck siren, outdoor warning siren, and a crash. In further embodiments, the emergency alert is triggered by detection of at least one trigger sound that exceeds a decibel threshold. In some embodiments, the triggering device transmits the emergency alert indirectly via a communication device. In some embodiments, the emergency is triggered by user interaction, wherein the user interaction comprises at least one of pressing a soft or hard button, a gesture, and a voice command. In some embodiments, the emergency is triggered by a user giving a voice command, wherein the triggering device recognizes the voice command to detect one or more trigger phrases. In some embodiments, the triggering device confirms user identity using voice recognition.

In another aspect, provided herein is an emergency management system comprising at least one processor, a memory, a network element, and a computer program including instructions executable by the at least one processor to create a server software application for connecting a user to at least one dispatch center for facilitating emergency assistance, the application comprising: (a) a software module receiving an emergency alert from a triggering device, wherein the emergency alert does not include location data; and (b) a software module configured to perform steps comprising: (i) searching one or more databases for the location data for the triggering device; (ii) requesting current location data from the triggering device or at least one associated device; and (iii) making the location data available to one or more dispatch centers for providing emergency assistance. In further embodiments, the application further comprises a software module determining an accuracy and confidence for the location data.

In another aspect, provided herein is a non-transitory computer readable storage media encoded with a computer program including instructions executable by at least one processor to create a server application for connecting a user to at least one dispatch center for facilitating emergency assistance, the application comprising: (a) a software module receiving an emergency alert from a triggering device, wherein the emergency alert does not include location data; an (b) a software module configured to perform steps comprising: (i) searching one or more databases for the location data for the triggering device; (ii) requesting current location data from the triggering device or at least one associated device; and (iii) making the location data available to one or more dispatch centers for providing emergency assistance. In some embodiments, the location data is a physical address or a set of x-y coordinates. In some embodiments, the server application queries one or more databases for location data for the triggering device. In some embodiments, the server application queries one or more databases for location data for one or more users associated with the triggering device. In some embodiments, wherein the triggering device is installed within a building and the location data associated with the triggering device is saved in one or more databases in the emergency management system.

In another aspect, provided herein is a method of transmitting an emergency alert and providing data to an emergency management system, comprising: (a) detecting, by a triggering device, an emergency; (b) initiating, by the triggering device, an emergency alert upon detecting the emergency; (c) transmitting, by the triggering device, the emergency alert to an emergency management system when the emergency alert is triggered, wherein the emergency alert comprises information for at least one associated device capable of communicating with the emergency management system; and (d) providing, by the triggering device, data from at least one of the triggering device and the at least one associated device to the emergency management system, wherein the data comprises location information. In some embodiments, a connection is established between the triggering device and at least one dispatch center. In some embodiments, an audio call is established between the triggering device and at least one dispatch center upon determining the triggering device is able to host an audio call. In some embodiments, the emergency alert is triggered autonomously based on sensor data when sensor values exceed a threshold.

In another aspect, a triggering device comprising at least one processor, a memory, a network element, and a computer program including instructions executable by the at least one processor to create an emergency trigger application comprising: (a) a software module detecting an emergency; (b) a software module creating an emergency alert upon detecting an emergency; (c) a software module transmitting the emergency alert to an emergency management system when the emergency alert is triggered, wherein the emergency alert comprises information for at least one associated device capable of communicating with the emergency management system; and (d) a software module providing data from at least one of the triggering device and the at least one associated device to the emergency management system, wherein the data comprises location information. In some embodiments, an audio connection is established between the triggering device and at least one dispatch center. In some embodiments, a user of the triggering device receives a notification when the emergency alert has been triggered and the emergency management system was unable to connect to the user. In some embodiments, the emergency alert is triggered when sensor values exceed a threshold. In some embodiments, the emergency alert is triggered by detection of at least one trigger sound. In further embodiments, the at least one trigger sound comprises at least one of a gunshot, explosion, breaking glass, person falling, baby crying, police siren, ambulance siren, fire truck siren, outdoor warning siren, and a crash. In some embodiments, the emergency alert is triggered by detection of at least one trigger sound that exceeds a decibel threshold. In some embodiments, the emergency is triggered by user interaction with the triggering device. In some embodiments, the user interaction comprises at least one of pressing a soft or hard button, a gesture, and a voice command. In some embodiments, the emergency is triggered by a user giving a voice command, wherein the triggering device recognizes the voice command to detect one or more trigger phrases. In some embodiments, the triggering device confirms user identity using voice recognition.

Electronic Device

In some embodiments, the platforms, media, methods and applications described herein include an electronic device, a processor, or use of the same (also referred to as a digital processing device). In further embodiments, the electronic device includes one or more hardware central processing units (CPU) that carry out the device's functions. In still further embodiments, the electronic device further comprises an operating system configured to perform executable instructions. In some embodiments, the electronic device is optionally connected a computer network. In further embodiments, the electronic device is optionally connected to the Internet such that it accesses the World Wide Web. In still further embodiments, the electronic device is optionally connected to a cloud computing infrastructure. In other embodiments, the electronic device is optionally connected to an intranet. In other embodiments, the electronic device is optionally connected to a data storage device. In accordance with the description herein, suitable electronic devices include, by way of non-limiting examples, server computers, desktop computers, laptop computers, notebook computers, sub-notebook computers, netbook computers, net pad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the electronic device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the electronic device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the electronic device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the electronic device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of an electronic device. In still further embodiments, a computer readable storage medium is optionally removable from an electronic device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the electronic device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Web Application In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile electronic device. In some embodiments, the mobile application is provided to a mobile electronic device at the time it is manufactured. In other embodiments, the mobile application is provided to a mobile electronic device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g. not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object-oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected electronic devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile electronic devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

EXAMPLES

The following illustrative example is representative of embodiments of the inventions described herein and is not meant to be limiting in any way.

Example 1—Wearables+Parallel Flows

John, an elderly man, lives in a nursing home. He suffers from a medical condition that makes him susceptible to falls and is given a smartwatch by the nursing home to provide health monitoring and to allow him to request help in case of an accident. Other residents of the nursing home are also assigned various similar devices (panic buttons, smartphones, etc.). The nursing home administrator has used an emergency flow editor software to create an emergency flow script for handling emergency alerts sent by the various smartwatches and other devices used by the nursing home. The editor software provides a graphic user interface with an interactive space that allows the administrator (an authorized user) to select graphical representations of emergency flow building blocks and drag them over to a desired location within the interactive space. The administrator is easily able to generate the customized emergency flow script by dragging and dropping the building blocks and connecting them. Although the editor software provides some standard premade building block templates, the administrator is able to customize and configure selected building block templates. In this case, the administrator adds a building block that sorts emergency alerts based on the type of device sending the alert. The building block is connected to multiple downstream emergency flows, which are executed based on the device type that is identified. In this case, a downstream emergency flow associated with smartwatches has building blocks that open a text and/or chat-based communication channel with an operator at the nursing home. The downstream emergency flow includes a first parallel emergency flow that obtains data from the smartwatch, including heart rate sensor data and current location data (either received through the emergency alert or by querying the smartwatch). The downstream emergency flow also includes a second parallel emergency flow that has a building block that determines whether the emergency is a personal emergency (e.g. health emergency such as a heart attack) or an environmental emergency (e.g. fire, earthquake), and responsive to detecting an environmental emergency, obtains sensor data from any sensors (e.g. fire alarms and/or temperature sensors) that are in the vicinity of the smartwatch (in this case, within 10 meters). In addition, the administrator sets the second parallel emergency flow to attempt detection of an environmental emergency by obtaining sensor data in vicinity of the smartwatch even in the case of a personal emergency. Once the emergency flow script has been finished, the administrator assigns the script to an emergency flow identifier for the nursing home. This identifier is programmed into the smartwatches and other nursing home devices. Finally, the administrator activates the server software that runs the emergency response server application.

A week later, John is getting out of bed when he falls and breaks his hip. John immediately presses a panic button on his smartwatch, which sends an emergency alert (which contains the emergency flow identifier) over the Wi-Fi network to the emergency response server application. The server application detects the emergency alert, extracts the emergency flow identifier, and queries the identifier against a database storing emergency flow scripts and corresponding emergency flow identifiers to identify the emergency flow script to execute in response to this emergency alert. The server application then executes the emergency flow script setup by the administrator a week earlier. The script executes instructions of the initial emergency flow building block to determine the source of the emergency alert. Upon identifying the smartwatch as the source of the emergency alert, the initial building block then branches off to a smartwatch downstream emergency flow. This downstream emergency flow has a series of building blocks forming a parallel flow for obtaining location and sensor data from the smartwatch (this custom flow takes advantage of the enhanced sensor functionality of smartwatches) by transmitting data requests to the smartwatch over the Wi-Fi network. A second parallel data flow is activated as part of this script that determines whether the emergency alert pertains to a personal or environmental emergency. In this case, the emergency alert is sent when John pressed a panic button for a personal medical emergency. Accordingly, an initial building block of the second parallel data flow determines based on the emergency alert that this is a personal emergency. However, this second parallel data flow includes a building block for assessing sensor data throughout the nursing home to determine the possibility of an environmental emergency. In this case, the building block queries thermometers and smoke/$CO_2$/CO detectors located throughout the nursing home that communicate with the server over the Wi-Fi network. The sensor data from these thermometers and detectors indicate no abnormal readings. This result causes the second parallel data flow to terminate since there is no need to provide environmental sensor data associated with the emergency request when there is no indication of an environmental emergency. In parallel, the main emergency flow calls a smartphone belonging to John and bridges the call with an operator for the nursing home. Although the smartphone is out of John's reach, it is paired with John's smartwatch via Bluetooth. John is able to answer the call by pressing a button on his smartwatch. The operator asks John the nature of his medical emergency, and John indicates that he has fallen and cannot get up. The emergency flow script provides an interactive element that bridges the communication session with a local public safety answering point when the operator interacts with the interactive element. In this case, the operator realizes that John needs urgent medical attention and presses the interactive element. This activates a building block in the emergency flow script that calls the PSAP and bridges the call with the communication session between the nursing home operator and John (e.g. creating a conference call including the PSAP dispatcher, nursing home operator, and John). John is in great pain and is unable to coherently respond to the PSAP dispatcher's questions. Thankfully, the nursing home operator has medical information and sensor data for John and is able to relay this information to the PSAP dispatcher. In addition, the emergency flow script executes a parallel emergency flow that transmits the location data, medical information, and sensor data to the PSAP (since the administrator customized the emergency flow script to take advantage of the fact that this local PSAP is equipped with the technology to receive enhanced data/meta-data). The PSAP dispatcher is able to assign first responders (EMTs from the local hospital) to John's location based on the location data received. In this scenario, the PSAP dispatcher does not have authorization to view John's medical information but has the ability to forward medical and sensor data to the first responders to keep them apprised of John's current medical condition. In the meantime, orderlies working at the nursing home have reached John and kept him stable and still while waiting for the EMTs to arrive.

Finally, the EMTs arrive and transport John to the local hospital for treatment. Upon their arrival, John uses his smartwatch to hang up on the phone call. The nursing home operator and the PSAP dispatcher also terminate their connections to the emergency communication session, thus terminating the session. Meanwhile, the emergency flow script has finished executing and terminates. Fortunately, John makes a full recovery thanks to the prompt emergency response.

Example 2—Social Media Suicide Prevention

Jane, a freshman as a top tier university, is finishing up her first semester. Jane has been struggling to fit in socially on-campus and is experiencing problems with her roommate. Moreover, Jane is double majoring in analytical chemistry and computer science and is feeling overwhelmed by the course load. For the past month, Jane has fallen into a deep depression as finals week approached. She is not alone, and administrators have been cognizant of the rise of mental health problems in the student body. In response, the university has launched a digital campaign to detect and head off mental health crises. The university partnered with a popular social media platform to monitor publicly available user postings for early detection of mental health crises such as suicide attempts. In this case, mental health crises are detected by dynamic web analysis of user postings for all university students using keywords indicative of suicidal thoughts or tendencies. In this case, Jane posts on the social media platform that she is saying farewell to her friends and is ready to end it all tonight. This post is analyzed and leads to detection of a mental health crisis. Next, an emergency alert is sent to an emergency response server along with an emergency flow identifier associated with the emergency flow script for the university's mental health emergency management campaign. The emergency flow identifier is used to determine the customized emergency flow script comprising various building blocks for managing emergency communications between all entities in this particular emergency flow. In this case, the emergency flow script is executed by the emergency response server. A first building block attempts to locate contact information for Jane associated with the mental health crisis by querying the university server database storing student information. The first building block retrieves a cell phone number, which is passed onto a second building block that calls the number. Jane does not pick up. The second building block passes on the "no pickup" output to a third building block that attempts to locate Jane's roommate Mary who does pick up her phone. Upon successfully reaching Mary, a fourth building block initiates a call to a university dispatcher and bridges the calls with Mary and the dispatcher to enable two-way communications. A fifth building block running parallel to the fourth building block provides the emergency alert to the dispatcher via a data connection to the dispatcher's computer console. The dispatcher than speaks with Mary to explain the situation and asks for Jane's whereabouts. Mary has not seen Jane all night. Fortunately, another parallel building block is attempting to locate Jane's whereabouts by searching university Wi-Fi routers to determine if any Jane's cell phone is connected to any of those routers. This building block successfully identifies two routers in the basement of the library as having detected Jane's cell phone Wi-Fi signal in the past 20 minutes and provides this output to the dispatcher. The university dispatcher then connects to campus security and requests a guard to be sent to investigate. Upon connection to the campus security, another building block is activated that transfers all collected information pertaining to this emergency to a cell phone of the security guard (which is running a mobile application in communication with the emergency response server). The guard is able to enter the router location information into a campus map application on his phone and soon finds Jane sleeping on the couch in the library basement. The guard wakes up Jane and assesses her condition. She insists she is okay but agrees to meet with the school counselor for a mental health checkup.

Example 3—Voice-Activated Emergency Call Using Smart TV for Medical Emergency

An elderly man, Harry, lives in an assisted living apartment. He suffers from a medical condition that makes him susceptible to dizzy spells and would like to get emergency assistance through his TV. The TV is particularly useful because Harry spends most of his time in the living room and the TV is on most of the time. Harry has installed an emergency calling app on his mobile phone and registered the TV by inputting user data such as name, address, emergency contacts, medical conditions, etc. The TV includes a Wi-Fi connection (or another connection that supports sufficient bandwidth), physical buttons, a microphone, speakers and a remote control. In addition, the TV has voice recognition software for accepting voice commands such as "change to channel 5" and "call 911." In addition, Harry has installed sound processing software with a library of trigger sounds for triggering an emergency call including the sound of breaking glass.

One day, Harry has a dizzy spell and falls in the living room, dropping a glass of water that breaks upon hitting the floor. Finding it difficult to get up and make an emergency call using his phone, Harry says the voice command "Hey Alex, call 9-1-1" to the TV. The voice-recognition software on the TV recognizes the voice command and activates the App for sending the emergency alert. The voice-recognition software on the TV is able to match the voice to samples that Harry had saved, which provides verification that the registered user Harry is the one making the call. In addition, the voice recognition software is able to distinguish the Harry's voice from the dialogue on the TV and ambient sounds (like people talking on the street). The sound recognition software registers the sound of breaking glass. Harry has not authorized making an emergency call based on such sounds. However, the sound recognition software has alerted the App to be primed to take the voice command after detecting the sound of breaking glass. In addition, the detected sound is part of data regarding the emergency that can be made available to emergence service providers. In addition, the user data regarding Harry's conditions and prescriptions may also be made accessible to emergency service providers with proper authorization.

When Harry gave the voice command, the emergency call is initiated by sending the alert in the form of an API request. An emergency alert is sent to an Emergency Management System (EMS) via the Wi-Fi connection. After receiving the alert, an emergency flow (e.g. FIG. 4), is triggered. First, Harry's son, Barry (an emergency contact) is sent an SMS message that an emergency alert has been triggered associated with his father. Since the TV does not have calling capabilities (e.g. VoIP), the EMS had assigned a token to the TV, which will be used to provision the call and associated with Harry's phone number.

An emergency call is activated, awaiting connection to an appropriate dispatch center and/or emergency responder. The emergency alert from the TV is sent without information about the location of the emergency. After successfully searching its databases for the location for the TV using the MAC address or the assigned token in the meta-data of the alert, the EMS locates the saved address of the home within "NG911 Clearinghouse" database (including floor and apartment number). The EMS processes the address into a current location for the emergency that is compatible with the PSAP for that jurisdiction (based on the location of the emergency). The EMS places the address in a database provisioned with Harry's number so that the PSAP can query the database for the current location. In addition, the PSAP is also provided a link to additional information about Harry to provide additional situational awareness about the emergency.

While the emergency call is on-going, the EMS searches for IoT devices at the emergency location. The EMS identifies a video camera feed from the lobby area of Harry's assisted living center and notes that there is a receptionist at the front desk. After finding the phone number for the center through publicly available sources, the EMS calls the front desk and informs the receptionist regarding the emergency in the user's apartment. The lobby informs the on-call nurse who is able to reduce the blood loss while the first responders (including EMTs) arrive on the scene to take the user to a nearby hospital. Harry makes a quick recovery after a few days in the hospital.

Example 4—Voice-Activated Emergency Call Using Smart Speakers to Report Domestic Violence A domestic violence survivor, Mary, lives in an apartment with her 5-year-old daughter, Cary. Mary is aware that her ex-husband, Barry, might find and abuse her again. As a precaution, she has taught Cary to make an emergency call using a smart speaker (e.g. Amazon Echo®). The smart speaker is able to access the Internet via a Wi-fi connection and is also connected to an intelligent digital assistant service (e.g. Alexa) with voice analysis software. Mary programmed the smart speaker to take Cary's voice command, "Assistant, call 911" to make an emergency call (although the digital assistant does not usually implement a child's voice command, it can be programmed to do so by saving the child's voice command as a trigger phrase). To prevent false triggers, Mary programmed that Alexa would call her friend, Sarah before connecting to 911. Sarah can confirm the emergency by pressing 1 or * to cancel the emergency call.

One evening, Barry is waiting at the front door when Mary arrives home after work. She tells Barry to leave, but he is intent on getting inside. An altercation ensues in the living room. Cary assesses the situation and realizes that she should call 911 for emergency help as her mother has taught her. Cary goes near the smart speakers and says "Alexa, call 911." The smart speaker connects to the EMS and sends an emergency alert (including the registered address of the smart speaker device, user information). Since Mary had updated the address on the smart speaker with their new address, that address gets provisioned with an assigned 10-digit phone number (the CBN) in the NG911 Clearinghouse (as she is the registered user of the smart speaker). In this case, the EMS will assign a 10-digit phone number to the emergency alert and maintain it for the duration of the emergency.

Based on Mary's programmed emergency flow, the EMS establishes a call to her emergency contact, Sarah, to confirm the emergency. Once connected, Cary explains to her grandmother, Sarah, that her mom is in danger. The EMS prompts Sarah to confirm the emergency or cancel the call. Sarah presses 1 to confirm that a three-way conference call to an appropriate PSAP should be established.

Once connected to the local PSAP, Sarah explains the emergency, but is not able to confirm the exact location of the apartment (as they had recently moved into a new place). Cary also cannot remember her street address. The dispatcher is able to query the NG911 Clearinghouse for the emergency location using the assigned CBN and divert a police patrol to that location. The police arrive and arrest Barry. Fortunately, Mary is taken to the local hospital and receives treatment for minor injuries.

Example 5—Emergency Calling Using On-Board Console in a Smart Vehicle

Lisa, while driving home during a snowstorm, gets hit from behind by a truck. Lisa is badly injured and is not able to move her hands to make an call for emergency help. Lisa is in a smart car with an intelligent on-board console capable of receiving voice command and making cellular calls. Lisa does not remember the trigger words, but saysm "Please call emergency . . . Hmmm . . . Please help . . . ". Because Lisa's voice instructions were not clear and her voice was low, the console prompts Lisa to confirm that she would like to make an emergency call, but she has become unresponsive.

Fortunately, the event data recorder in the smart vehicle has been activated due to the crash. The event data recorder system in the on-board console includes four components: various sensors (camera, RADARs and LIDARs), the SDM (which includes the event data recorder), the DCIM and the cellular antenna. When Lisa's car got hit, the air bags deploy and the sensors are activated. The sensors transmit the data to the SDM, which measures the severity of the accident using an accelerometer. The SDM's assessment is sent to the DCIM, which uses the cellular antenna to send an alert (attaching Lisa's voice command and the assessment of the severity of the accident) to a private call center.

When a customer service representative at the call center receives the call, she uses the built-in GPS to find the vehicle's location (or get a location through the cellular network) and calls the car to check-in with Lisa. Since Lisa is unresponsive and reviewing the severity of the accident, the representative calls 9-1-1 makes a proxy call on behalf of Lisa using the Lisa's location. Fortunately, paramedics are sent to the scene immediately and Lisa is taken to the hospital for treating her injuries.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An emergency management system comprising at least one processor, a memory, a network element, and a computer program including computer-executable instructions that, when executed by the at least one processor, cause the emergency management system to:
   (a) provide an emergency trigger program or emergency trigger script configured to be integrated within an application installed on a triggering device, wherein the emergency trigger program or emergency trigger script comprises an emergency flow identifier linked to an emergency flow script configured for an organization and is configured to cause the triggering device to generate and send an emergency alert comprising the emergency flow identifier, a user identifier, and an emergency location in response to detecting an indication of an emergency, wherein the organization is not an emergency service provider, and wherein the emergency flow identifier is not a type of emergency;
   (b) receive the emergency alert comprising the emergency flow identifier, the user identifier, and the emergency location sent from the triggering device in response to the triggering device detecting the indication of the emergency;
   (c) identify, using the emergency flow identifier, the emergency flow script linked to the emergency flow identifier from an emergency flow database comprising a plurality of emergency flow scripts associated with a plurality of organizations, wherein the emergency flow script is a compilation of programming commands and defines one or more emergency response functions; and
   (d) execute the emergency flow script associated with the emergency flow identifier to perform the one or more emergency response functions comprising providing emergency data comprising the user identifier and the emergency location associated with the triggering device to one or more output services.

2. The system of claim 1, wherein the emergency alert is an application programming interface (API) call comprising the emergency flow identifier within a payload of the API call.

3. The system of claim 1, wherein execution of the emergency flow script associated with the emergency flow identifier in step (d) further comprises delivering a text-based message to one or more recipients.

4. The system of claim 1, wherein the indication of the emergency is a selection of a soft or physical button on the triggering device by a user.

5. The system of claim 1, wherein the indication of the emergency is a voice command.

6. The system of claim 1, wherein the indication of the emergency comprises sensor data generated by a sensor communicatively coupled to the triggering device.

7. The system of claim 1, wherein the one or more output services comprises a call center or a public safety answering point (PSAP).

8. The system of claim 1, wherein the emergency alert comprises a list of emergency contacts for a user associated with the triggering device.

9. The system of claim 1, wherein the triggering device is a communication device, a wearable device, or an internet of things (IoT) device.

10. The system of claim 1, wherein the emergency trigger script is an application programming interface (API) script.

11. The system of claim 1, wherein the organization is a provider of the application installed on the triggering device or a manufacturer of the triggering device.

12. A computer-implemented method for managing emergency flows, the method comprising:
   (a) providing an emergency trigger program or emergency trigger script configured to be integrated within an application installed on a triggering device, wherein the emergency trigger program or emergency trigger script comprises an emergency flow identifier linked to an emergency flow script configured for an organization and is configured to cause the triggering device to generate and send an emergency alert comprising the emergency flow identifier, a user identifier, and an emergency location in response to detecting an indication of an emergency, wherein the organization is not an emergency service provider, and wherein the emergency flow identifier is not a type of emergency;
   (b) receiving the emergency alert comprising the emergency flow identifier, the user identifier, and the emergency location sent from the triggering device in response to the triggering device detecting the indication of the emergency;

(c) identifying, using the emergency flow identifier, the emergency flow script linked to the emergency flow identifier from an emergency flow database comprising a plurality of emergency flow scripts associated with a plurality of organizations, wherein the emergency flow script is a compilation of programming commands and defines one or more emergency response functions; and (d) executing the emergency flow script associated with the emergency flow identifier to perform the one or more emergency response functions comprising providing emergency data comprising the user identifier and the emergency location associated with the triggering device to one or more output services.

13. The method of claim 12, wherein the emergency alert is an application programming interface (API) call comprising the emergency flow identifier within a payload of the API call.

14. The method of claim 12, wherein executing the emergency flow script associated with the emergency flow identifier in step (d) further comprises delivering a text-based message to one or more recipients.

15. The method of claim 12, wherein the indication of the emergency is a selection of a soft or physical button on the triggering device by a user.

16. The method of claim 12, wherein the indication of the emergency is a voice command.

17. The method of claim 12, wherein the indication of the emergency comprises sensor data generated by a sensor communicatively coupled to the triggering device.

18. The method of claim 12, wherein the one or more output services comprises a call center or a public safety answering point (PSAP).

19. The method of claim 12, wherein the emergency alert comprises a list of emergency contacts for a user associated with the triggering device.

20. The method of claim 12, wherein the triggering device is a communication device, a wearable device, or an internet of things (IoT) device.

* * * * *